US008849056B2

(12) United States Patent
Wakazono

(10) Patent No.: US 8,849,056 B2
(45) **Date of Patent: *Sep. 30, 2014**

(54) APPARATUS AND METHOD FOR IMAGE EDGE-PRESERVING SMOOTHING

(75) Inventor: Masafumi Wakazono, Kanagawa (JP)

(73) Assignee: Sony Corporation, Tokyo (JP)

( * ) Notice: Subject to any disclaimer, the term of this patent is extended or adjusted under 35 U.S.C. 154(b) by 276 days.

This patent is subject to a terminal disclaimer.

(21) Appl. No.: 13/221,218

(22) Filed: Aug. 30, 2011

(65) Prior Publication Data

US 2012/0057803 A1 Mar. 8, 2012

(30) Foreign Application Priority Data

Sep. 6, 2010 (JP) ................................ 2010-199224

(51) Int. Cl.

| | |
|---|---|
| ***G06K 9/00*** | (2006.01) |
| ***G06K 9/34*** | (2006.01) |
| ***G06K 9/40*** | (2006.01) |
| ***G06T 5/00*** | (2006.01) |
| *G06T 5/40* | (2006.01) |

(52) U.S. Cl.

CPC ....... *G06T 5/002* (2013.01); *G06T 2207/20028* (2013.01); *G06T 5/40* (2013.01); *G06T 2207/20192* (2013.01)

USPC ........... 382/261; 382/260; 382/266; 382/168; 382/171

(58) Field of Classification Search

CPC ............................. G06T 5/40; H04N 5/23229

See application file for complete search history.

(56) References Cited

U.S. PATENT DOCUMENTS

| | | | | |
|---|---|---|---|---|
| 2006/0187490 | A1* | 8/2006 | Sartor et al. | 358/3.13 |
| 2009/0317015 | A1 | 12/2009 | Porikli | |
| 2010/0322509 | A1* | 12/2010 | Shimizu et al. | 382/162 |
| 2011/0050934 | A1* | 3/2011 | Mitsunaga | 348/222.1 |

FOREIGN PATENT DOCUMENTS

| | | |
|---|---|---|
| JP | 2009-177558 A | 8/2009 |
| JP | 2010-003297 A | 1/2010 |

OTHER PUBLICATIONS

"Binary-coded decimal", Jul. 27, 2010, Wikipedia.org, p. 1-8.*
"Downsampling", Apr. 15, 2010, Wikipedia.org, p. 1-3.*
Lev, Amos et al., "Iterative Enhancement of Noisy Images", IEEE Transaction on Systems, Man, and Cybernetics, Jun. 1977, pp. 435-442, vol. SMC-7, No. 6, Maryland, USA.

(Continued)

*Primary Examiner* — Stephen R Koziol
*Assistant Examiner* — Timothy Choi
(74) *Attorney, Agent, or Firm* — Sony Corporation

(57) ABSTRACT

Provided is an image processing apparatus including: a frequency value calculation section that allocates each pixel of an input image to any of respective partial regions obtained by dividing the entirety of a possible range of a luminance value into units in a luminance direction on the basis of the luminance value thereof, and allocates one pixel of the input image to partial regions when calculating frequency values representing the number of pixels allocated to the partial regions with respect to the respective partial regions, to update the frequency values of the partial regions; a characteristic value calculation section that calculates a characteristic value representing a characteristic of the partial region; and a weighted product-sum section that performs edge-preserving smoothing on the input image by weighting and averaging the characteristic values in accordance with a distance in the luminance direction, using the calculated frequency value and the calculated characteristic value.

9 Claims, 39 Drawing Sheets

(56) References Cited

OTHER PUBLICATIONS

Wang, David C.C., et al., "Gradient Inverse Weighted Smoothing Scheme and the Evaluation of its Performance", Computer Graphics and Image Processing, 1981, pp. 167-181, vol. 15, Pennsylvania, USA.
Nagao, Makoto et al., "Edge Preserving Smoothing", Computer Graphics and Image Processing, pp. 394-407, vol. 9, Academic Press, Inc., Kyoto, Japan, 1979.
Durand, Fredo et al., "Fast Bilateral Filtering for the Display of High-Dynamic-Range Images", Proc. of ACM SIGGRAPH, 2002, pp. 257-266, Association for Computing Machinery, Inc., Mass. Institute of Technology, USA.
Pattanaik, Sumanta, et al., "Adaptive Gain Control for High Dynamic Range Image Display", Proc. of Spring Conference in Computer Graphics, 2002, USA.
Weiss, Ben, "Fast Median and Bilateral Filtering", Proc. of ACM SIGGRAPH, 2006, pp. 519-526, Association for Computing Machinery, Inc.
Paris, Sylvain et al., "A Fast Approximation of the Bilateral Filter using a Signal Processing Approach", 2006, pp. 1-12, Massachusetts Institute of Technology, USA.

* cited by examiner

FIG. 8

| | | | |
|---|---|---|---|
| G | B | G | B |
| R | G | R | G |
| G | B | G | B |
| R | G | R | G |

FIG. 27

| SPATIAL PATTERN | THINNING-OUT RATE | DECIMAL PRECISION OF WEIGHTING FUNCTION |
|---|---|---|
| FINE | 1 | 0 BIT |
| INTERMEDIATE | 4 | 2 BIT |
| ROUGH | 16 | 4 BIT |

APPARATUS AND METHOD FOR IMAGE EDGE-PRESERVING SMOOTHING

BACKGROUND

The present disclosure relates to an image processing apparatus and a method of the same, and a program, and particularly, relates to an image processing apparatus, a method of the same, and a program which are capable of improving quality performance of image signal processing while suppressing an increase in the load.

As one of image processing techniques, edge-preserving smoothing is generally used. The edge-preserving smoothing is a nonlinear filtering process of smoothing a grayscale while the noticeable luminance level difference of the object boundary and the like in an image remains. Edge-preserving smoothing has been used in noise reduction processing or grayscale correction processing (see, for example, A. Lev, S. W. Zucker, A. Rosenfeld, "Iterative enhancement of noise images", IEEE Trans. Systems, Man, and Cybernetics, Vol. SMC-7, 1977; D. C. C. Wang, A. H. Vagnucci, C. C. Li, "Gradient inverse weighted smoothing scheme and the evaluation of its performance", CVGIP, Vol. 15, pp. 167-181, 1981; M. Nagao, T. Matsuyama, "Edge preserving smoothing", CGIP, Vol. 9, pp. 394-407, 1978; F. Durand, J. Dorsey, "Fast bilateral filtering for the display of high-dynamic-range images", Proc. of ACM SIGGRAPH 2002, 2002; and S. N. Pattanaik, H. Yee, "Adaptive gain control for high dynamic range image display", Proc. of Spring Conference in Computer Graphics 2002, 2002).

In such edge-preserving smoothing, in recent years, a technique called a bilateral filter has been often used. In the bilateral filter, the size of the operation is much larger than that in a normal linear FIR (Finite Impulse Response) filter and the like. For this reason, methods of speeding up bilateral filter calculation are proposed (see, for example, F. Durand, J. Dorsey, "Fast bilateral filtering for the display of high-dynamic-range images", Proc. of ACM SIGGRAPH 2002, 2002 and Weiss, "Fast median and bilateral filtering", Proc. of ACM SIGGRAPH 2006, 2006).

In addition, high-speed calculation methods of the bilateral filter through decimation of a signal are also proposed (see, for example, S. Paris et al. "A Fast Approximation of the Bilateral Filter using a Signal Processing Approach", eccv 2006; Japanese Unexamined Patent Application Publication No. 2009-177558 (US2011/0050934); and Japanese Unexamined Patent Application Publication No. 2010-003297 (US2009/0317015)).

In the above-mentioned processing, a decimation signal by which the resolution of an input signal is lowered has been created by using the occurrence frequency (local histogram) of signals for each region and level of an image, and the calculation amount of the bilateral filter has been reduced by the convolution and then extension of a filter kernel with respect to the decimation signal. In addition, the sum total of the luminance values of pixels (hereinafter, referred to as a characteristic value) corresponding to each bin of the local histogram has been used for filter calculation.

SUMMARY

However, in the above-mentioned methods, there has been a concern that when the resolution of the local histogram is lowered in order to suppress the processing costs, calculation precision of the bilateral filter is lowered.

In addition, there has been a concern that an error particularly easily occurs with respect to a flat input image.

Such a problem can be alleviated by setting the resolution (the number of bins) of the local histogram to a large extent. However, since the double number of bins is necessary to improve the calculation precision by one bit through the resolution, there has been a concern that the load of filtering such as the calculation amount or the storage capacity is increased.

It is desirable to improve quality performance of image signal processing while suppressing an increase in the load.

According to an embodiment of the present disclosure, there is provided an image processing apparatus including: a frequency value calculation section that allocates each pixel of an input image to any of respective partial regions obtained by dividing the entirety of a possible range of a luminance value into a plurality of units in a luminance direction on the basis of the luminance value thereof, and allocates one pixel of the input image to a plurality of partial regions at the time of calculating frequency values representing the number of pixels allocated to the partial regions with respect to the respective partial regions, to update the frequency values of the partial regions; a characteristic value calculation section that calculates a characteristic value representing a characteristic of the partial region; and a weighted product-sum section that performs edge-preserving smoothing on the input image by weighting and averaging the characteristic values in accordance with a distance in the luminance direction, using the frequency value calculated by the frequency value calculation section and the characteristic value calculated by the characteristic value calculation section.

The frequency value calculation section may include a weight calculation section that calculates a weight for extending a count value at the time of allocating the pixel of the input image with decimal precision, and a frequency value updating section that updates the frequency values of a plurality of partial regions using the weight calculated by the weight calculation section, and the characteristic value calculation section may include a weight multiplication section that multiplies the luminance value of the input image by the weight calculated by the weight calculation section, and a characteristic value updating section that updates the characteristic values of a plurality of partial regions using the luminance value of the input image multiplied by the weight by the weight multiplication section.

The weight calculation section may calculate weights of the respective partial regions in accordance with a predetermined weighting function.

The frequency value calculation section may further include a decimation section that decimates the pixel of the input image, and the weight calculation section may calculate weights of the respective partial regions with respect to the pixel of the input image decimated by the decimation section.

The decimation section may decimate the pixel of the input image at a decimation rate corresponding to decimal precision of the weight calculated by the weight calculation section.

The image processing apparatus may further include a spatial pattern determination section that determines a spatial pattern representing contents of the input image, and the decimation section may decimate the pixel of the input image at a decimation rate in accordance with an analysis result of the spatial pattern performed through the spatial pattern determination section.

The spatial pattern determination section may determine the spatial pattern for each partial region of the input image, and the decimation section may decimate the pixel of the input image, for each partial region, at a decimation rate in accordance with the analysis result of the spatial pattern performed through the spatial pattern determination section.

According to another embodiment of the present disclosure, there is an image processing method of an image processing apparatus, including causing a frequency value calculation section to allocate each pixel of an input image to any of respective partial regions obtained by dividing the entirety of a possible range of a luminance value into a plurality of units in a luminance direction on the basis of the luminance value thereof, and allocates one pixel of the input image to a plurality of partial regions at the time of calculating frequency values representing the number of pixels allocated to the partial regions with respect to the respective partial regions, to update the frequency values of the partial regions; causing a characteristic value calculation section to calculate a characteristic value representing a characteristic of the partial region; and causing a weighted product-sum section to perform edge-preserving smoothing on the input image by weighting and averaging the characteristic values in accordance with a distance in the luminance direction, using the frequency value calculated by the frequency value calculation section and the characteristic value calculated by the characteristic value calculation section.

According to another embodiment of the present disclosure, there is provided a program causing a computer to function as: a frequency value calculation section that allocates each pixel of an input image to any of respective partial regions obtained by dividing the entirety of a possible range of a luminance value into a plurality of units in a luminance direction on the basis of the luminance value thereof, and allocates one pixel of the input image to a plurality of partial regions at the time of calculating frequency values representing the number of pixels allocated to the partial regions with respect to the respective partial regions, to update the frequency values of the partial regions; a characteristic value calculation section that calculates a characteristic value representing a characteristic of the partial region; and a weighted product-sum section that performs edge-preserving smoothing on the input image by weighting and averaging the characteristic values in accordance with a distance in the luminance direction, using the frequency value calculated by the frequency value calculation section and the characteristic value calculated by the characteristic value calculation section.

According to another embodiment of the present disclosure, each pixel of an input image is allocated to any of respective partial regions obtained by dividing the entirety of a possible range of a luminance value into a plurality of units in a luminance direction on the basis of the luminance value thereof, and one pixel of the input image is allocated to a plurality of partial regions at the time of calculating frequency values representing the number of pixels allocated to the partial regions with respect to the respective partial regions, to update the frequency values of the partial regions; a characteristic value representing a characteristic of the partial region is calculated; and edge-preserving smoothing is performed on the input image by weighting and averaging the characteristic values in accordance with a distance in the luminance direction, using the calculated frequency value and the calculated characteristic value.

According to the embodiments of the present disclosure, it is possible to process an image. Particularly, it is possible to improve quality performance of image signal processing while suppressing an increase in the load.

BRIEF DESCRIPTION OF THE DRAWINGS

FIG. 8 is a diagram illustrating a Bayer array.

FIG. 27 is a diagram illustrating an example of the weighting function in accordance with a spatial pattern.

DETAILED DESCRIPTION OF EMBODIMENTS

Hereinafter, embodiments for carrying out the present disclosure (hereinafter, referred to as an embodiment) will be described. Meanwhile, the description thereof will be made in the following order.

1. First Embodiment (Bilateral Filter)
2. Second Embodiment (Bilateral Filter)
3. Third Embodiment (Bilateral Filter)
4. Fourth Embodiment (Bilateral Filter)
5. Fifth Embodiment (Personal Computer)

1. First Embodiment

Outline of Bilateral Filter

As one of image processing techniques, edge-preserving smoothing is known. The edge-preserving smoothing is a nonlinear filtering process of smoothing a grayscale while the noticeable luminance level difference of the object boundary and the like in an image remains.

Figure 1A:
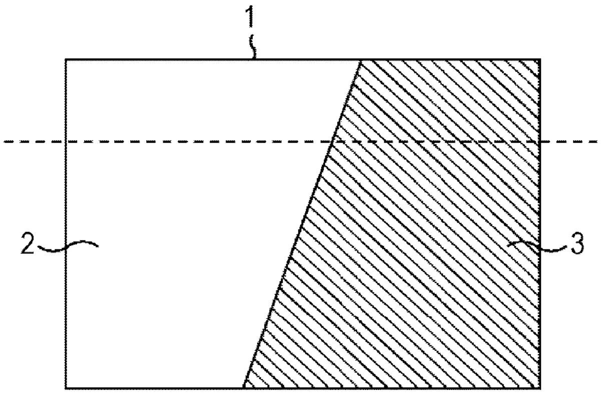
FIGS. 1A to 1C are diagrams illustrating an outline of a bilateral filter.
Figure 1B:
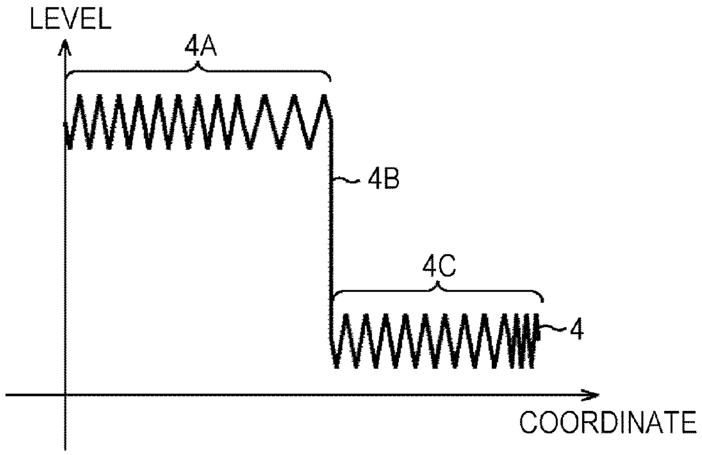

For example, as shown in FIG. 1A, a region 2 having a high (bright) luminance and a region 3 having a (dark) low luminance are included in one image 1. The pixel value (luminance value) on a dotted line of such an image 1 is equal to, for example, a curved line 4 shown in a graph of FIG. 1B. In FIG. 1B, the horizontal axis denotes a location in the horizontal direction of the image 1, and the vertical axis denotes a pixel value (luminance value) for each pixel.

As shown by the curved line 4 in FIG. 1B, the pixel value of a pixel on the dotted line of FIG. 1A drastically changes (4B) near the boundary between the portion (4A) of the region 2 and the portion (4C) of the region 3. In addition, in the portion (4A) of the region 2 and the portion (4C) of the region 3, respectively, the pixel values minutely change due to, for example, noise components and the like.

Figure 1C:
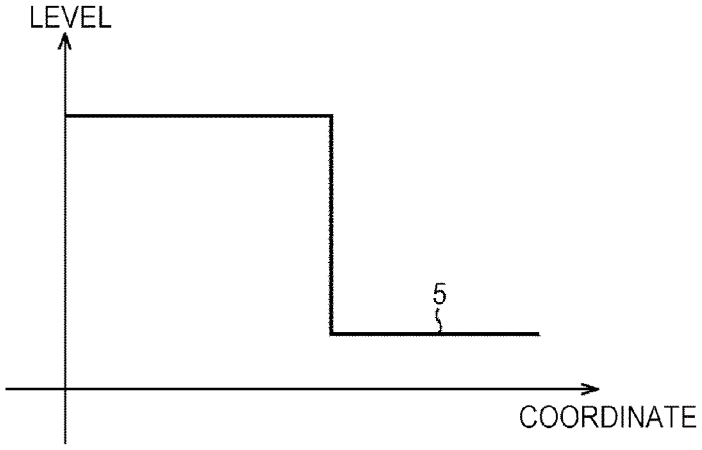

The edge-preserving smoothing leaves the portion (4B), having a drastic change, of the curved line 4 indicating a change in such luminance values as it is, and removes (reduces) only the minute changes in the portion (4A) of the region 2 and the portion (4C) of the region 3 due to a noise and the like. That is, the luminance values change from the curved line 4 shown in FIG. 1B to a curved line 5 shown in FIG. 1C by the edge-preserving smoothing.

The edge-preserving smoothing removes minute luminance variation while the object contour influencing visibility is maintained, and thus has been used in noise reduction processing for some time.

In addition, the edge-preserving smoothing does not change a detail component represented by texture with a characteristic capable of separating the minute luminance variation in the texture within an object and the noticeable luminance level difference of the object contour, and is also used in grayscale correction processing for compressing the luminance difference of the other components.

In such edge-preserving smoothing, in recent years, a technique called a bilateral filter has been often used. Generally, in a bilateral filter BLF (pc) for an image, as shown in the following Expression (1), an arithmetic operation is performed in which a pixel value I(p) of a pixel around a pixel location pc which is weighted by a weighting function ω (p-pc) in the spatial direction and a weighting function φ (I(p)−I(pc)) in the luminance value direction is added.

$$BLF(pc) = \frac{\sum_{p\in\Omega} \omega(p-pc)\cdot\phi(I(p)-I(pc))\cdot I(p)}{\sum_{p\in\Omega} \omega(p-pc)\cdot\phi(I(p)-I(pc))} \tag{1}$$

Meanwhile, in Expression (1), a denominator on the right-hand side denotes a normalized coefficient of a weight value. F. Durand, J. Dorsey, "Fast bilateral filtering for the display of high-dynamic-range images", Proc. of ACM SIGGRAPH 2002, 2002 discloses a technique for grayscale correction processing in which such a bilateral filter is used.

As shown in Expression (1), in the bilateral filter, weighting for each pixel p in a local region changes depending on the luminance value of the central pixel pc. For this reason, it is necessary to recalculate the weight value for each pixel, and thus the size of the operation is much larger than that in a normal linear FIR (Finite Impulse Response) filter and the like. F. Durand, J. Dorsey, "Fast bilateral filtering for the display of high-dynamic-range images", Proc. of ACM SIGGRAPH 2002, 2002 and Weiss, "Fast median and bilateral filtering", Proc. of ACM SIGGRAPH 2006, 2006 disclose methods of speeding up the bilateral filter calculation in order to overcome defects of such a bilateral filter. In these methods, a high-speed operation is performed by using a local histogram of luminance (hereinafter, referred to as a block histogram) which is defined for each partial region (block) of an image.

Figure 2A:
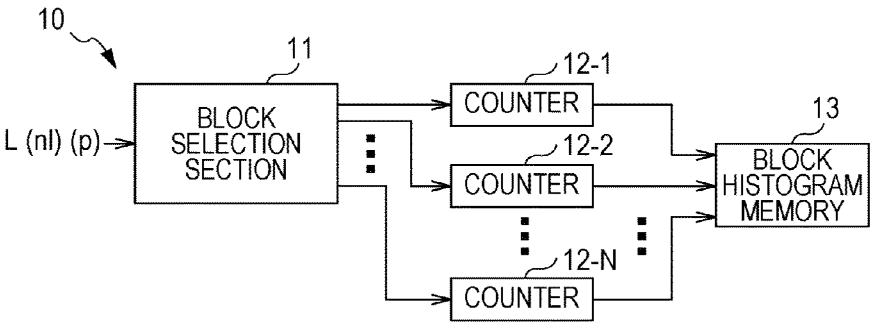
FIGS. 2A and 2B are block diagrams illustrating a main configuration example of a block histogram calculation section and a block integral value calculation section of a bilateral filter in related art.

FIG. 2A shows a main configuration example of an internal block histogram calculation section of high-speed bilateral filter processing. A block histogram calculation section 10 shown in FIG. 2A is a processing section that calculates frequency, including a pixel value of each pixel, of each bin, and includes a block selection section 11, counters 12-1 to 12-N, and a block histogram memory 13.

The block selection section 11 specifies a luminance block to which a pixel to be processed belongs from a luminance value L(nl)(p) of the supplied pixel to be processed and a location p of the pixel to be processed, and increases a value of a counter corresponding to a specified luminance block, by 1, out of the counters 12-1 to 12-N corresponding to each luminance block.

The luminance block indicates each partial region obtained by dividing the entirety of the possible ranges of the location and the luminance value of each pixel of the image into a plurality of units in the spatial direction and the luminance direction. For example, when the possible range of the location of each pixel of a luminance image is divided into W units in the width direction and divided into H units in the height direction, and the possible range of the luminance value of each pixel is divided into D units in the luminance direction, the number of luminance blocks (partial regions) N is W×H×D.

In this case, the block histogram calculation section 10 is provided with N counters 12-1 to 12-N corresponding to each of these N luminance blocks. When the luminance block is specified, the block selection section 11 increments a value of the counter corresponding to the luminance block.

Each of the counters 12-1 to 12-N maintains a frequency value of a pixel in the corresponding luminance block, that is, a value indicating the number of pixels belonging to the luminance block, and increments a value maintained in accordance with the instructions of the block selection section 11. In addition, when the pixel count of a one-frame luminance image is terminated, each of the counters 12-1 to 12-N supplies the maintained value to the block histogram memory 13 as a block histogram. Meanwhile, hereinafter, when it is not necessary to individually distinguish the counters 12-1 to 12-N from each other, they are simply referred to as the counter 12.

Figure 2B:
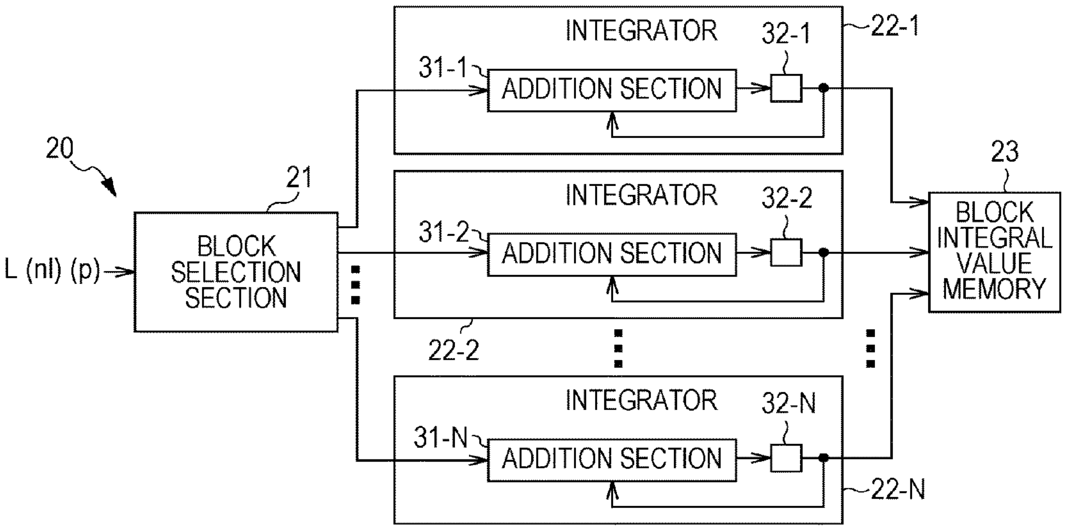

FIG. 2B shows a main configuration example of a block integral value calculation section located inside the bilateral filter. The block integral value is equivalent to the above-mentioned characteristic value. A block integral value calculation section 20 shown in FIG. 2B is a processing section that calculates an integral value obtained by multiplying the frequency of each bin by a central value of each bin, and includes a block selection section 21, integrators 22-1 to 22-N, and a block integral value memory 23.

The block selection section 21 specifies a luminance block to which a pixel to be processed belongs from a luminance value L(nl)(p) of the supplied pixel to be processed and a location p of the pixel to be processed, and supplies the luminance value L(nl)(p) to an integrator corresponding to a specified luminance block, out of the integrators 22-1 to 22-N corresponding to each luminance block.

Each of the integrators 22-1 to 22-N integrates the luminance value L(nl)(p) supplied from the block selection section 21, and evaluates a block integral value of the corresponding luminance block. In addition, when the sum of pixel values of pixels of a one-frame luminance image is evaluated and a block integral value is evaluated, each of the integrators 22-1 to 22-N supplies the block integral value to the block integral value memory 23.

Each of the integrators 22-1 to 22-N is provided with addition sections 31-1 to 31-N and registers 32-1 to 32-N, respectively. Each of the addition sections 31-1 to 31-N adds the luminance value L(nl)(p) supplied from the block selection section 21 to values recorded in each of the registers 32-1 to 32-N, and records the resultant values in each of the registers 32-1 to 32-N. That is, the sum total of the supplied luminance values L(nl)(p) is recorded in each of the registers 32-1 to 32-N.

Each of the registers 32-1 to 32-N records values supplied from the addition sections 31-1 to 31-N, and supplies the recorded values to each of the addition sections 31-1 to 31-N and the block integral value memory 23.

Meanwhile, hereinafter, when it is not necessary to individually distinguish the integrators 22-1 to 22-N from each other, they are simply referred to as the integrator 22. In addition, hereinafter, when it is not necessary to individually distinguish the addition sections 31-1 to 31-N from each other, they are simply referred to as the addition section 31, and when it is not necessary to individually distinguish the registers 32-1 to 32-N from each other, they are simply referred to as the register 32.

Similar high-speed calculation methods of the bilateral filter through decimation of a signal are proposed in S. Paris et al. "A Fast Approximation of the Bilateral Filter using a Signal Processing Approach", eccv 2006, Japanese Unexamined Patent Application Publication No. 2009-177558 (US2011/0050934), and Japanese Unexamined Patent Application Publication No. 2010-003297 (US2009/0317015). In the above-mentioned processing, a decimation signal by which the resolution of an input signal is lowered is created by using the occurrence frequency (local histogram) of signals for each region and level of an image, and the calculation amount of the bilateral filter is reduced by the convolution and then extension of a filter kernel with respect to the decimation signal. In these methods, lowness of the spatial resolution of the decimation signal or lowness (smallness of the number of bins) of the resolution of the histogram is important to suppress the processing costs.

However, in the above-mentioned methods, there is a problem that when the resolution of the local histogram is lowered in order to suppress the processing costs, calculation precision of the bilateral filter easily lowers. Particularly, when the input signal is a smooth gradation signal, a lowering of the precision easily occurs.

Figure 3A:
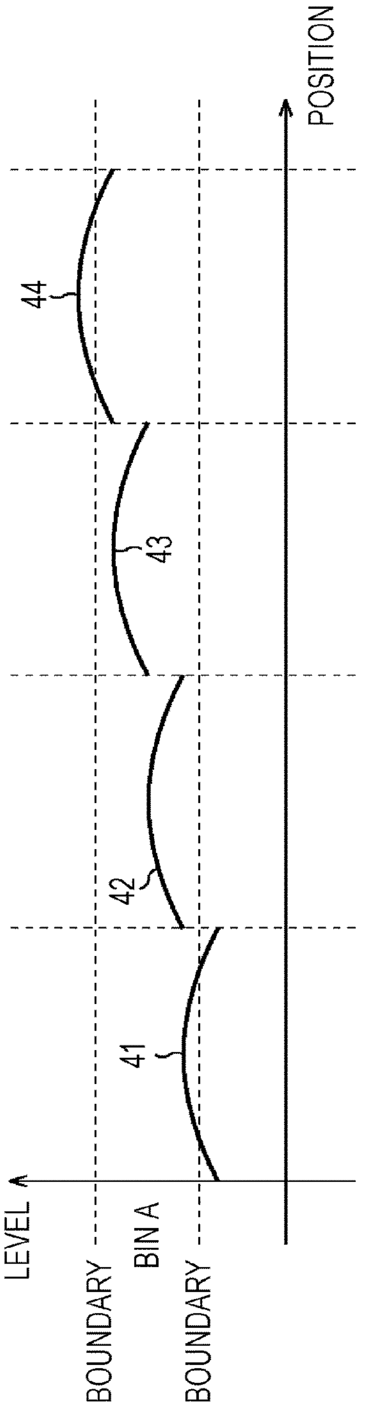
FIGS. 3A and 3B are diagrams illustrating a state of processing of the bilateral filter in related art.
Figure 3B:
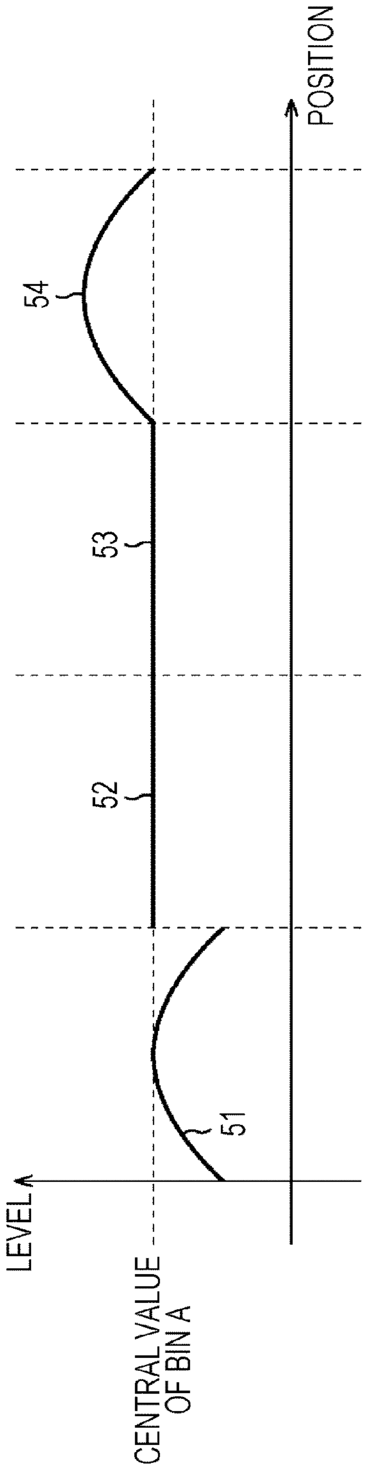

For example, even in the input signals (signals 41 to 44) having the same form shown in FIG. 3A, characteristics of filter outputs change as shown in FIG. 3B due to a difference in the levels thereof (signals 51 to 54).

This shows that the characteristics of the bilateral filter become unstable due to a lowering of the calculation precision. Such a problem is caused by a loss of gradation information when the level of the input signal is concentrated on a single bin in the local histogram.

Figure 4A:
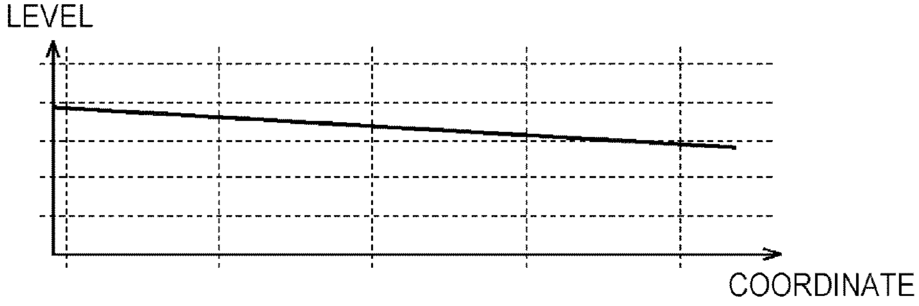
FIGS. 4A to 4C are diagrams illustrating a state of processing of the bilateral filter in related art.
Figure 4B:
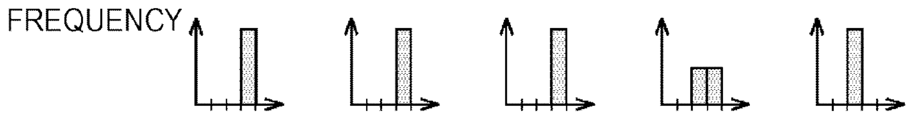
Figure 4C:
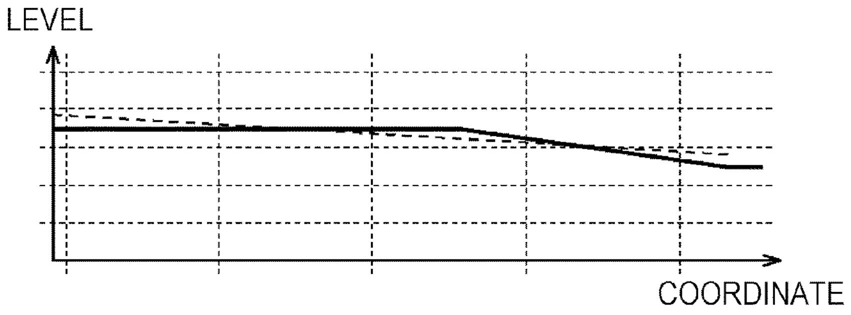

For example, a case is considered in which fluctuation in the luminance is small as the input image and a smooth gradation pattern is given, as shown in FIG. 4A. Then, as shown in FIG. 4B, from the relationship between the bin range and the input luminance, the calculation result is concentrated on a single bin for each local histogram, or is dispersed to a plurality of bins. As a result, as shown in FIG. 4C, there occurs a problem that the final filter result becomes non-uniform (non-uniform: a gradation gradient is uneven).

In addition, in the above-mentioned methods, the sum total of the luminance values of pixels (hereinafter, referred to as a characteristic value) corresponding to each bin of the local histogram is used for filter calculation. As a method of efficiently calculating the characteristic value, a method is proposed in which the characteristic value is evaluated, for each bin, from the frequency thereof and the level of the bin center. However, when this method is used, there is a problem that an error particularly easily occurs with respect to a flat input image.

Figure 5A:
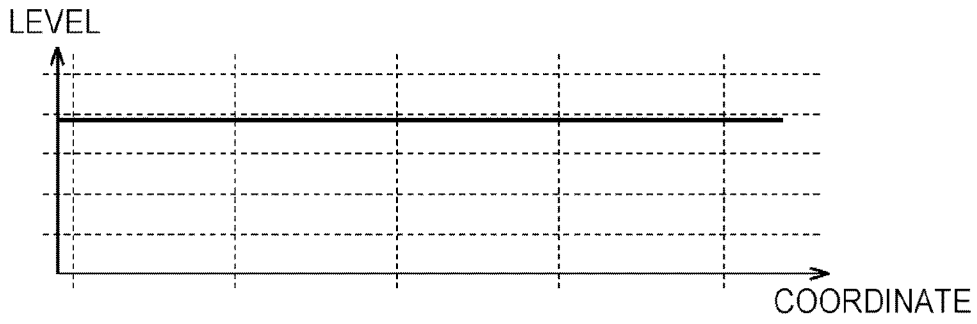
FIGS. 5A to 5D are diagrams illustrating a state of processing of the bilateral filter in related art.
Figure 5B:
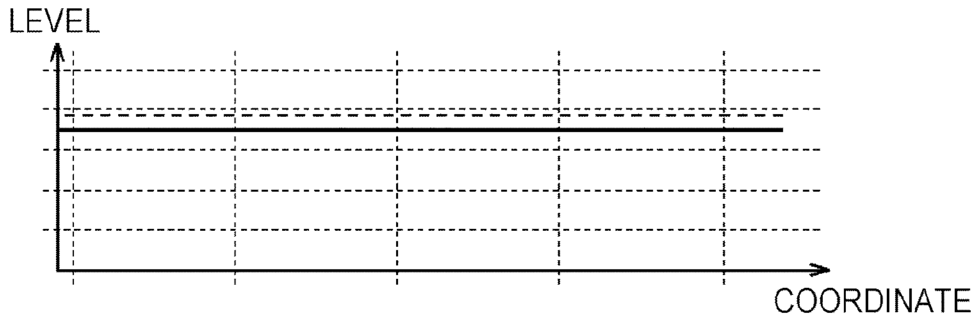
Figure 5C:
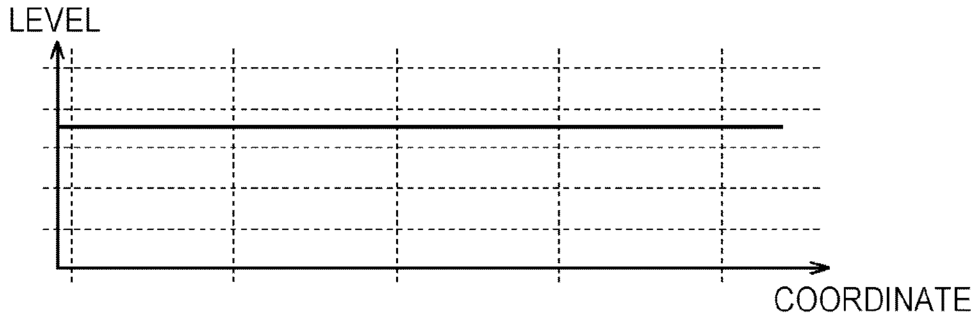
Figure 5D:
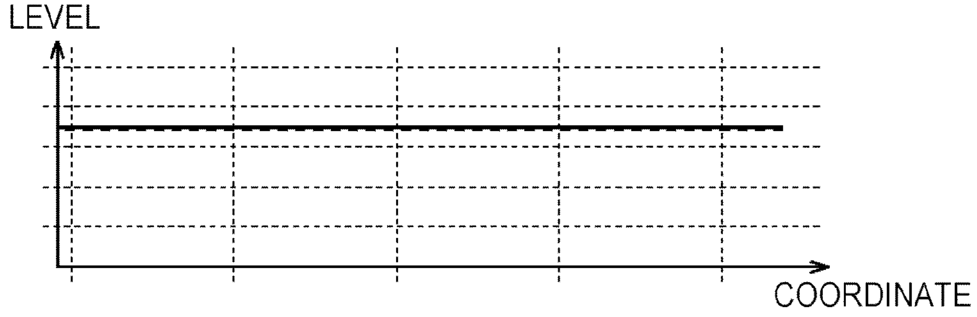

An input signal (FIG. 5A) of a level corresponding to the end of any bin of the histogram is now considered. The local histogram is calculated with respect to the input. In this stage, information of the level in the bin center is lost. For this reason, the characteristic value is evaluated from the local histogram, and the bin central value is output at the time of calculating a filter output from this, whereby an error occurs (FIG. 5B). There is level dependence in this error, and thus the error is minimized in the bin central level (FIGS. 5C and 5D) and the error is maximized in the level of the bin end.

Such a problem is alleviated by setting the resolution (the number of bins) of the local histogram on a large scale. However, since the double number of bins is necessary to improve the calculation precision by one bit through the resolution, there is a problem that the calculation amount or the memory amount becomes huge. Such a problem occurs due to the fact that information of the level in the bin center is not reflected in the calculation of the local histogram. Consequently, the calculation of the local histogram is improved, thereby allowing information of the level in the bin center to be reflected. Specifically, the count of the histogram is performed on a plurality of bins.

[Configuration Example of Digital Video Camera]

Figure 6:
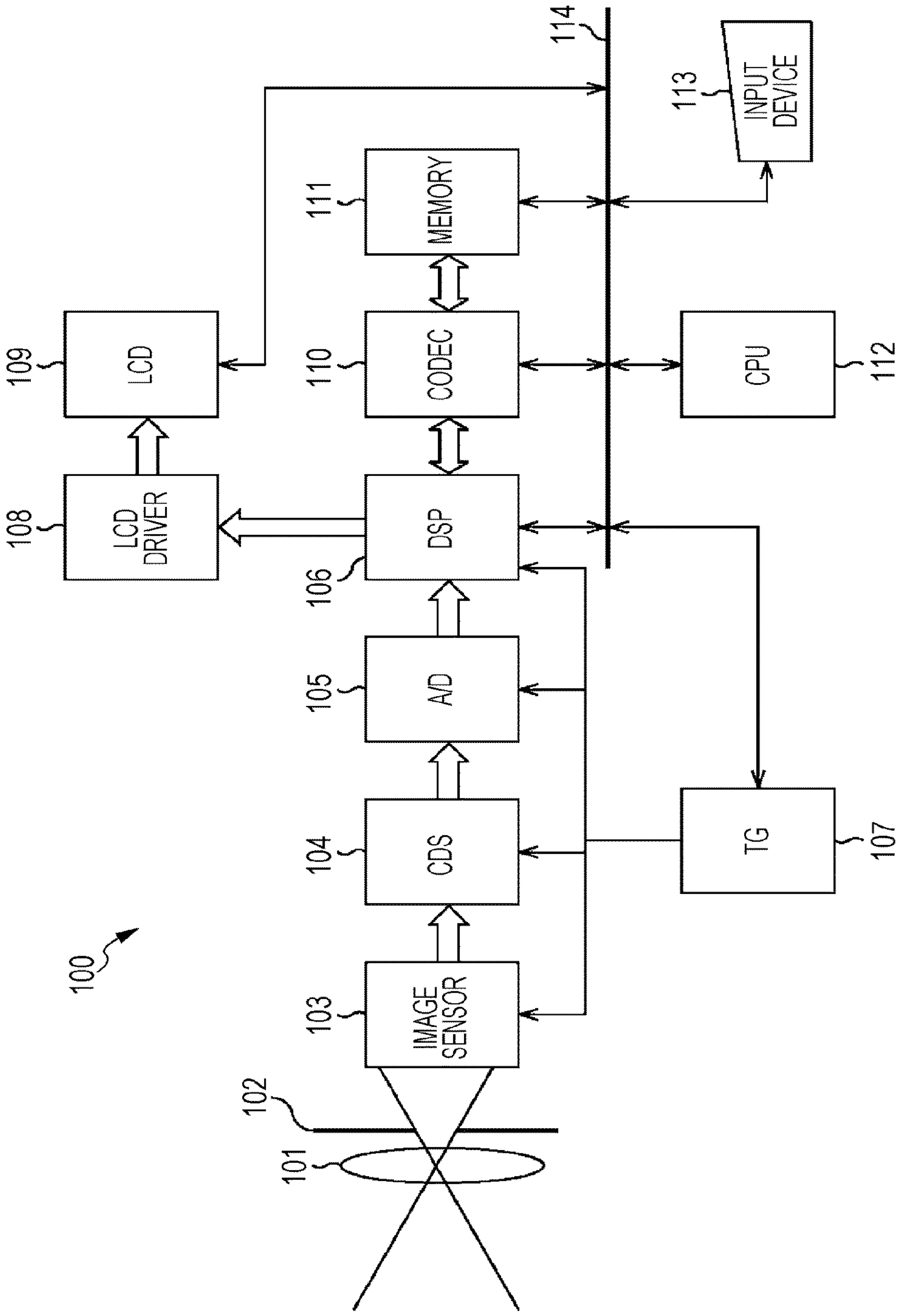
FIG. 6 is a block diagram illustrating a main configuration example of a digital video camera to which an embodiment of the present disclosure is applied.

FIG. 6 is a block diagram illustrating an embodiment of a digital video camera to which the present disclosure is applied. A digital video camera 100 shown in FIG. 6 captures an image of a subject, and displays an image of the subject or records image data.

The digital video camera 100 includes a lens 101, a diaphragm 102, an image sensor 103, a correlated double sampling circuit (CDS) 104, a DSP (Digital Signal Processor) block 106, a timing generator (TG) 107, an LCD (Liquid Crystal Display) driver 108, and a LCD 109. Further, the digital video camera 100 includes a CODEC (coder/decoder) 110, a memory 111, a CPU (Central Processing Unit) 112, an input device 113, and a bus 114.

Meanwhile, the DSP block 106 is a block constituted by a signal processing processor (for example DSP) and a memory such as a RAM (Random Access Memory) that maintains image data, or the like, and performs image processing described later by executing a predetermined program by the processor. In addition, hereinafter, the DSP block 106 is simply referred to as the DSP 106.

Incident light from a subject passing through an optical system constituted by the lens 101, the diaphragm 102 and the like first reaches the image sensor 103. The image sensor 103 includes, for example, an arbitrary imaging element such as a CCD (Charge Coupled Device) or a CMOS (Complementary Metal Oxide Semiconductor) image sensor, and photoelectrically converts incident light into an electrical signal.

Although the image sensor 103 may be any type insofar as it can perform photoelectric conversion, the image sensor is preferably a sensor which has a wider dynamic range, and can capture images from the dark portion of a subject to the bright portion thereof without being saturated or generating a noise.

A noise is removed from an electrical signal which is output from the image sensor 103 by the correlated double sampling circuit 104, and the electrical signal is digitized by the A/D converter 105. Although the A/D converter 105 may be any type, it is preferably a converter capable of converting the electrical signal into digital data having the larger number of grayscales. For example, the A/D converter 105 may convert the input electrical signal into image data having the number of grayscales (for example, the number of grayscales that can be represented by data of 14 to 16 bits or so) larger than the number of grayscales (for example, the number of grayscales that can be represented by data of 10 to 12 bits or so) of a normal digital video camera.

The image data digitized by the A/D converter 105 is temporarily stored in a memory within the DSP 106. The timing generator 107 controls a signal processing system constituted by the correlated double sampling circuit 104, the A/D converter 105, and the DSP 106 so that image data is fetched at a constant frame rate. That is, a stream of image data is supplied to the DSP 106 at a constant frame rate.

The DSP 106 performs image processing described later on image data so that the dynamic range of image data becomes, for example, a dynamic range capable of being displayed by the LCD 109, and then supplies image data on which image processing is performed, as necessary, to the LCD driver 108 or the CODEC 110.

The LCD driver 108 converts image data supplied from the DSP 106 into an analog image signal. The LCD driver 108 supplies the analog image signal to the LCD 109 which is a viewfinder of the digital video camera, and displays an image based on the image signal.

The CODEC 110 encodes image data supplied from the DSP 106 through a predetermined method, and records the encoded image data in the memory 111 of, for example, an arbitrary recording medium such as a semiconductor, a magnetic recording medium, a magneto-optical recording medium, or an optical recording medium.

The CPU 112 controls processing of the entire digital video camera 100, for example, on the basis of a command or the like which is input by causing a user to operate the input device 113 constituted by operation buttons or the like such as a shutter button. In addition, the DSP 106, the timing generator 107, the CODEC 110, the memory 111, the LCD 109, the CPU 112, and the input device 113 are interconnected through the bus 114.

[Configuration Example of DSP]

Figure 7:
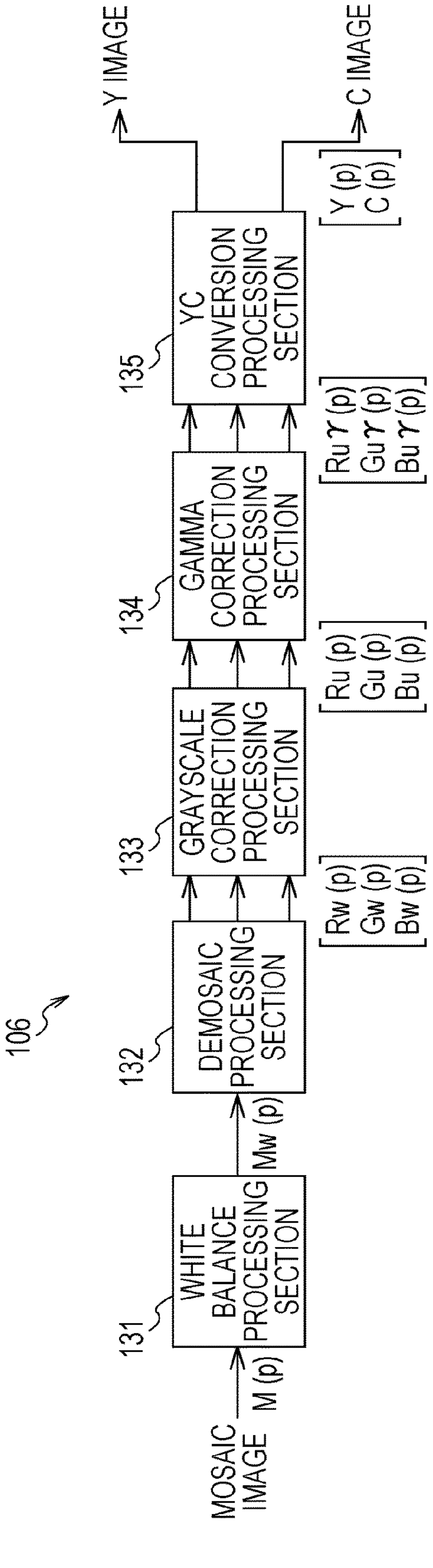
FIG. 7 is a block diagram illustrating a main configuration example of a DSP.

FIG. 7 is a block diagram illustrating an example of a configuration having a function implemented by causing an internal processor (arithmetic operation unit) of the DSP 106 to execute a predetermined program. The internal processor of the DSP 106 executes a predetermined program, to thereby cause functions including a white balance processing section 131, a demosaic processing section 132, a grayscale correction processing section 133, a gamma correction processing section 134, and a YC conversion processing section 135 to be implemented.

The white balance processing section 131 acquires a mosaic image which is image data such as a moving image A/D converted by the A/D converter 105. The mosaic image is an image in which data corresponding to any color component of R, G, and B is stored in one pixel and each pixel is arranged in accordance with a color array called a Bayer array, for example, shown in FIG. 8, and is also referred to as RAW data.

Figure 8:
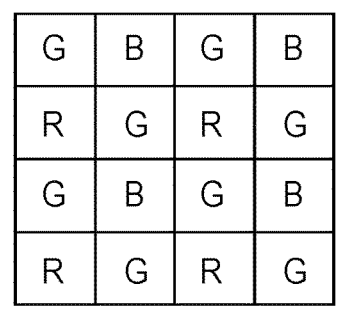

In FIG. 8, one square represents one pixel, and characters R, G, and B within the square represent a pixel of R, a pixel of G, and a pixel of B, respectively. The pixels of G are arranged in a checkered form, and the pixels of R and the pixels of B are alternately arranged for each row in the remaining portions.

Referring back to the description of FIG. 7, the white balance processing section 131 adjusts the white balance of the mosaic image so that the color balance of the achromatic color portion of the subject becomes actually an achromatic color by adding an appropriate coefficient to the pixel value of each pixel of the acquired mosaic image. The white balance processing section 131 supplies the mosaic image of which the white balance is adjusted to the demosaic processing section 132. Meanwhile, hereinafter, the mosaic image of which the white balance is adjusted is set to Mw.

The demosaic processing section 132 performs demosaic processing that causes one pixel to have all the components of R, G, and B with respect to the mosaic image Mw supplied from the white balance processing section 131. Thereby, three image data sets of an R image, a G image, and a B image corresponding to three color components of R, G, and B, respectively, are generated. The demosaic processing section 132 supplies three image data sets of the generated R image, G image, and B image to the grayscale correction processing section 133.

Meanwhile, in what follows, three image data sets of the R image, the G image, and the B image are referred to as the RGB image collectively. In addition, hereinafter, the pixel value in the pixel location p of the mosaic image is set to M(p). Further, hereinafter, the pixel value in the pixel location p of image data performed in demosaic processing is set to [Rw(p), Gw(p), Bw(p)]. Here, Rw(p) is a pixel value of the R component, Gw(p) is a pixel value of the G component, and Bw(p) is a pixel value of the B component.

The grayscale correction processing section 133 performs grayscale correction processing on the RGB image, and supplies the RGB image on which the grayscale correction processing is performed to the gamma correction processing section 134. Meanwhile, hereinafter, the pixel value in the pixel location p of image data on which the grayscale correction processing is performed is set to [Ru(p), Gu(p), Bu(p)]. Here, Ru(p) is a pixel value of the R component, Gu(p) is a pixel value of the G component, and Bu(p) is a pixel value of the B component.

The gamma correction processing section 134 performs gamma correction on the grayscale-converted RGB image. The gamma correction processing section 134 supplies the RGB image on which the gamma correction is performed to the YC conversion processing section 135. Meanwhile, hereinafter, the pixel value in the pixel location p of image data on which the gamma correction is performed is set to [Ruγ(p), Guγ(p), Buγ(p)]. Here, Ruγ(p) is a pixel value of the R component, Guγ(p) is a pixel value of the G component, and Buγ(p) is a pixel value of the B component.

The YC conversion processing section 135 performs YC matrix processing and band limitation for a chroma component on the RGB image on which the gamma correction is performed, to thereby generate a Y image including a luminance component (Y component) and a C image including a color difference component (Cb or Cr component). The YC conversion processing section 135 supplies the generated Y image and C image, as necessary, to the LCD driver 108 or the CODEC 110. Meanwhile, hereinafter, the pixel value in the pixel location p of image data which is output from the YC conversion processing section 135 is set to [Y(p), C(p)]. Here, Y(p) is a value of the luminance component in the Y image, and C(p) is a value of the color difference component in the C image. In addition, hereinafter, the Cb component of the C image is referred to as Cb(p), and the Cr component of the C image is referred to as Cr(p).

[Configuration Example of Grayscale Correction Processing Section]

Figure 9:
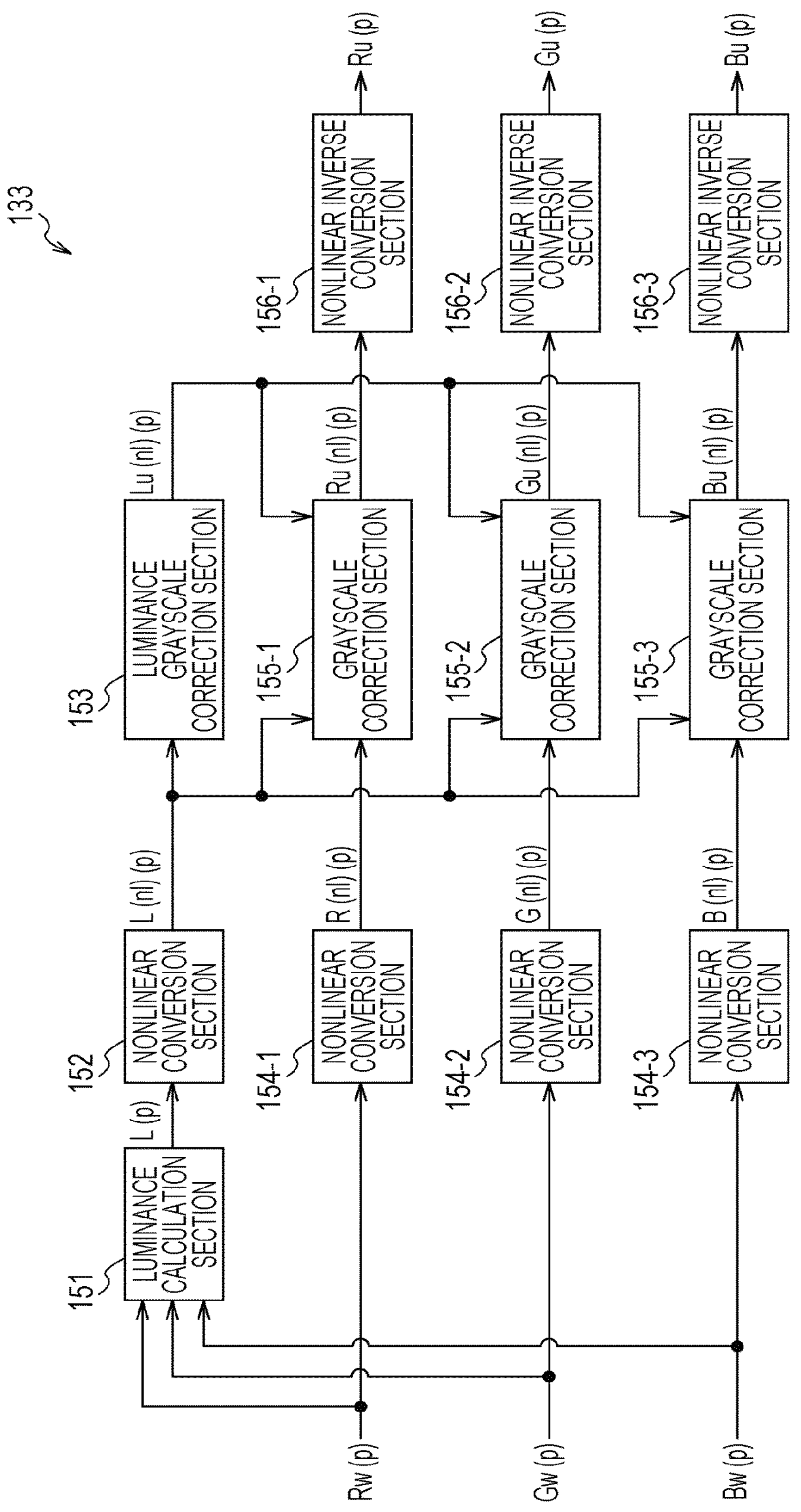
FIG. 9 is a block diagram illustrating a main configuration example of a grayscale correction processing section.

FIG. 9 is a block diagram illustrating a configuration example of a function of the grayscale correction processing section 133. The grayscale correction processing section 133 includes a luminance calculation section 151, a nonlinear conversion section 152, a luminance grayscale correction section 153, nonlinear conversion sections 154-1 to 154-3, grayscale correction sections 155-1 to 155-3, and nonlinear inverse conversion sections 156-1 to 156-3.

Luminance calculation section 151 calculates a value (luminance value L(p)) of the luminance component corresponding to the pixel location, from the pixel values Rw(p), Gw(p), and Bw(p) of the RGB image supplied from the demosaic processing section 132, and supplies the value to the nonlinear conversion section 152. The nonlinear conversion section 152 nonlinearly converts the luminance value L(p) supplied from the luminance calculation section 151, and supplies a luminance value L(nl)(p) obtained as a result to the luminance grayscale correction section 153 and the grayscale correction sections 155-1 to 155-3.

The luminance grayscale correction section 153 performs grayscale correction on the luminance value L(nl)(p) by compressing the grayscale of the luminance value L(nl)(p) supplied from the nonlinear conversion section 152, and supplies a luminance value Lu(nl)(p) obtained through the grayscale correction to the grayscale correction sections 155-1 to 155-3.

Each of the nonlinear conversion sections 154-1 to 154-3 nonlinearly converts each of the pixel values Rw(p), Gw(p), and Bw(p) of the RGB image supplied from the demosaic processing section 132. In addition, each of the nonlinear conversion sections 154-1 to 154-3 supplies each of the pixel values R(nl)(p), G(nl)(p), and B(nl)(p) obtained through the nonlinear conversion to the grayscale correction sections 155-1 to 155-3. Meanwhile, hereinafter, when it is not necessary to individually distinguish the nonlinear conversion sections 154-1 to 154-3 from each other, they are simply referred to as the nonlinear conversion section 154.

Each of the grayscale correction sections 155-1 to 155-3 performs grayscale correction on each of the pixel values R(nl)(p), G(nl)(p), and B(nl)(p) supplied from the nonlinear conversion sections 154-1 to 154-3, using the luminance value L(nl)(p) supplied from the nonlinear conversion section 152 and the luminance value Lu(nl)(p) supplied from the luminance grayscale correction section 153. Each of the grayscale correction sections 155-1 to 155-3 supplies each of the pixel values Ru(nl)(p), Gu(nl)(p), and Bu(nl)(p) obtained through the grayscale correction to each of the nonlinear inverse conversion sections 156-1 to 156-3.

Each of the nonlinear inverse conversion sections 156-1 to 156-3 performs nonlinear inverse conversion, which is inverse conversion of the nonlinear conversion performed by the nonlinear conversion section 154, on each of the pixel values Ru(nl)(p), Gu(nl)(p), and Bu(nl)(p) supplied from the grayscale correction sections 155-1 to 155-3. Each of the nonlinear inverse conversion sections 156-1 to 156-3 supplies each of the pixel values Ru(p), Gu(p), and Bu(p) obtained through the nonlinear inverse conversion to the gamma correction processing section 134.

Meanwhile, hereinafter, when it is not necessary to individually distinguish the grayscale correction sections 155-1 to 155-3 from each other, they are simply referred to as the grayscale correction section 155. In addition, hereinafter, when it is not necessary to individually distinguish the nonlinear inverse conversion sections 156-1 to 156-3 from each other, they are simply referred to as the nonlinear inverse conversion section 156.

[Configuration Example of Luminance Grayscale Correction Section]

Figure 10:
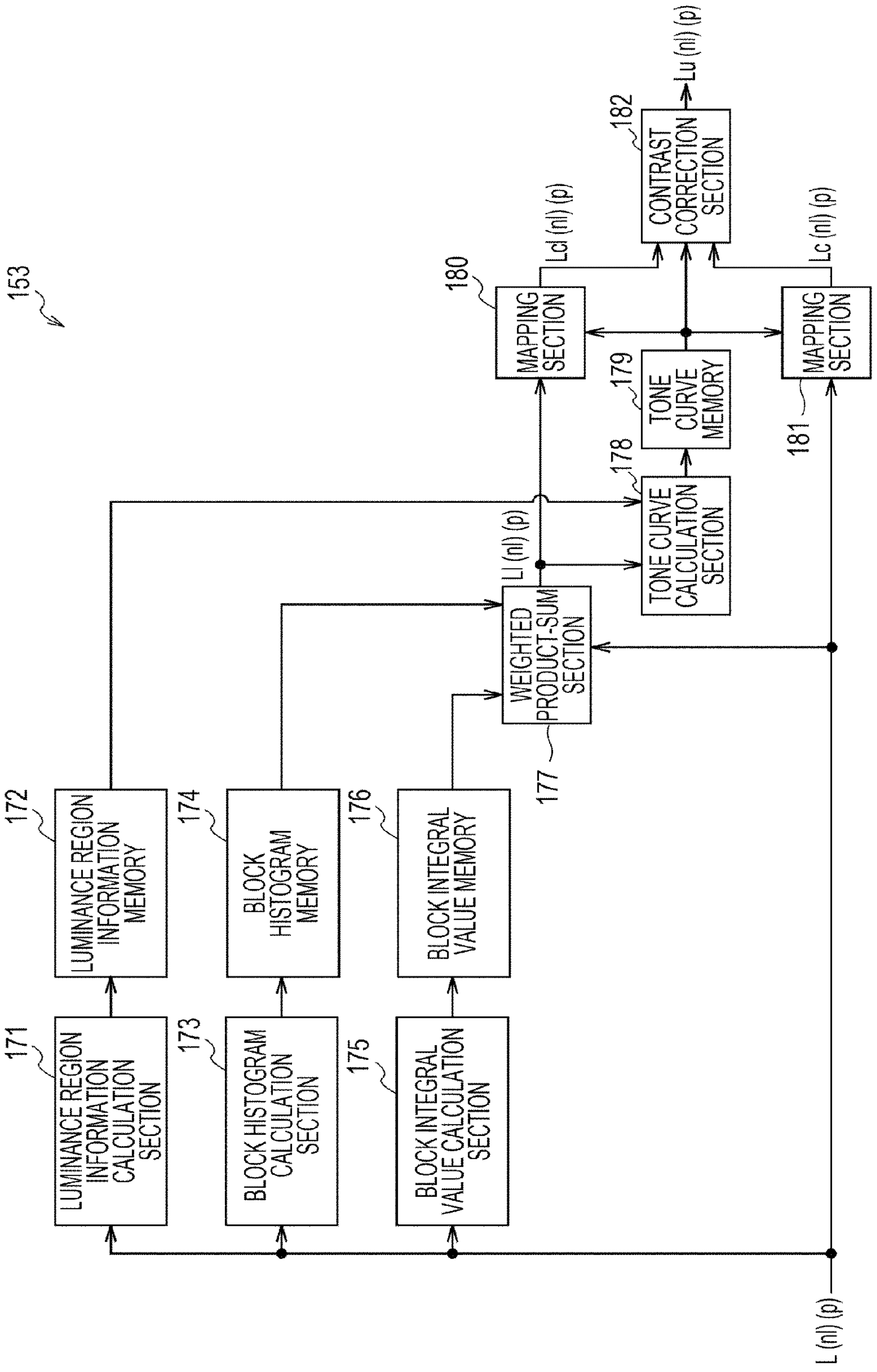
FIG. 10 is a block diagram illustrating a main configuration example of a luminance grayscale correction section.

FIG. 10 is a block diagram illustrating an example of a configuration having a function of the luminance grayscale correction section 153 of FIG. 9. As shown in FIG. 10, the luminance grayscale correction section 153 includes a luminance region information calculation section 171, a luminance region information memory 172, a block histogram calculation section 173, a block histogram memory 174, a block integral value calculation section 175, and a block integral value memory 176. In addition, the luminance grayscale correction section 153 includes a weighted product-sum section 177, a tone curve calculation section 178, a tone curve memory 179, a mapping section 180, a mapping section 181, and a contrast correction section 182.

The luminance region information calculation section 171, the block histogram calculation section 173, and the block integral value calculation section 175 calculate broad-based information of the RGB image, and perform processing for updating the information for each frame.

That is, the luminance region information calculation section 171 evaluates skirt values which are luminance values of the skirt portions on the dark luminance side and the bright luminance side in the histogram of the luminance values of pixels of a one-frame image (hereinafter, referred to as a luminance image) having the luminance value L(nl)(p) supplied from the nonlinear conversion section 152, and stores the skirt values in the luminance region information memory 172 as luminance region information. The luminance region information memory 172 temporarily records the luminance region information supplied from the luminance region information calculation section 171, and supplies the luminance region information to the tone curve calculation section 178.

The block histogram calculation section 173 divides the one-frame luminance image having the luminance value L(nl)(p) supplied from the nonlinear conversion section 152 into a plurality of spatial blocks (regions) in the spatial direction, and further divides the spatial blocks in the luminance direction, to form luminance blocks.

Here, the luminance block is constituted by pixels having luminance values within a luminance range previously determined for the luminance block, among pixels within the spatial block. Therefore, for example, when the spatial block is divided into D luminance blocks, the possible range of the luminance value previously divided into D ranges, and the pixels within the spatial block are classified into any of D luminance blocks depending on whether the luminance value thereof is a value within any range of the D ranges.

In addition, the block histogram calculation section 173 evaluates a frequency value of the pixels of each luminance block obtained by dividing the luminance image, and supplies the frequency value to the block histogram memory 174 as a block histogram. That is, the block histogram indicates the number of pixels (classified) belonging to each luminance block. The block histogram memory 174 temporarily records the block histogram supplied from the block histogram calculation section 173, and supplies the block histogram to the weighted product-sum section 177.

The block integral value calculation section 175 calculates an integral value (sum total) of the luminance values of the pixels belonging to the luminance block, for each luminance block, from the one-frame luminance image having the luminance value L(nl)(p) supplied from the nonlinear conversion section 152, and supplies the calculated integral value to the block integral value memory 176 as a block integral value. The block integral value memory 176 temporarily records the block integral value supplied from the block integral value calculation section 175, and supplies the block integral value to the weighted product-sum section 177.

Meanwhile, hereinafter, the luminance region information, the block histogram, and the block integral value are also referred to as intermediate data. The luminance region information, the block histogram, and the block integral value serving as the intermediate data are maintained in the luminance region information memory 172, the block histogram memory 174, and the block integral value memory 176, for only one-frame time of the luminance image (RGB image), and are updated for each frame.

In addition, since nearly one-frame time is necessary to calculate the intermediate data, in the related art technique, the generated intermediate data is actually used when image information of the next frame is input. However, in the grayscale correction processing section 133, since processing for calculating the intermediate data and processing for performing grayscale correction of the RGB image using the intermediate data are concurrently performed, it is possible to perform processing even on moving image data in real time.

The weighted product-sum section 177 calculates a general luminance value Ll(nl)(p) which is a luminance value of an image (hereinafter, referred to as a general luminance image) including very low frequency components of the luminance image having the luminance value L(nl)(p), from the luminance value L(nl)(p) supplied from the nonlinear conversion section 152, the block histogram supplied from the block histogram memory 174, and the block integral value supplied from the block integral value memory 176.

That is, using the block histogram and the block integral value evaluated from the luminance image (RGB image) of a frame immediately prior to the frame to be processed in terms of time, the general luminance value Ll(nl)(p) of the pixels having the supplied luminance value L(nl)(p) is calculated. Here, the general luminance value is, in other words, information equivalent to the average luminance of the object region to which the pixels on the RGB image belong, that is, a luminance value indicating average brightness of the object region including the pixels.

Meanwhile, hereinafter, the pixel to be processed, for example, the pixel having the luminance value L(nl)(p) supplied to the luminance grayscale correction section 153 is also a pixel to be processed.

In addition, the weighted product-sum section 177 supplies the calculated general luminance value Ll(nl)(p) to the tone curve calculation section 178 and the mapping section 180.

The tone curve calculation section 178 calculates a shape of the tone curve applied in order to compress the grayscale of the luminance value, from the luminance region information supplied from the luminance region information memory 172 and the general luminance value Ll(nl)(p) supplied from the weighted product-sum section 177, and supplies a result of the calculation to the tone curve memory 179. The tone curve memory 179 records the tone curve supplied from the tone curve calculation section 178, and supplies the recorded tone curve to the mapping section 180, the mapping section 181, and the contrast correction section 182.

The mapping section 180 compresses (corrects) the grayscale of the general luminance value Ll(nl)(p) supplied from the weighted product-sum section 177 on the basis of the tone curve recorded in the tone curve memory 179, and supplies a general luminance value Lcl(nl)(p) obtained through the grayscale correction to the contrast correction section 182. The mapping section 181 compresses (corrects) the grayscale of the luminance value L(nl)(p) supplied from the nonlinear conversion section 152 on the basis of the tone curve recorded in the tone curve memory 179, and supplies a luminance value Lc(nl)(p) obtained through the grayscale correction to the contrast correction section 182.

The contrast correction section 182 corrects a contrast of the luminance image having the luminance value Lc(nl)(p) obtained by the grayscale compression, on the basis of the general luminance value Lcl(nl)(p) supplied from the mapping section 180, the luminance value Lc(nl)(p) supplied from the mapping section 181, and the tone curve recorded in the tone curve memory 179. In addition, the contrast correction section 182 supplies the luminance value Lu(nl)(p) obtained by correcting the contrast to the grayscale correction section 155.

[Configuration Example of Block Histogram Calculation Section]

Figure 11A:
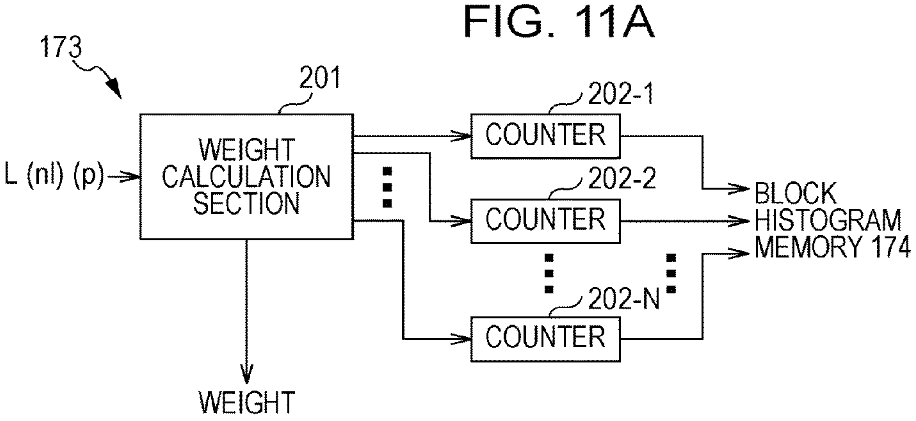
FIGS. 11A to 11C are block diagrams illustrating a main configuration example of a block histogram calculation section and a block integral value calculation section.

FIG. 11A is a diagram illustrating a configuration example of a function of the block histogram calculation section 173 of FIG. 10. The block histogram calculation section 173 shown in FIG. 11A corresponds to the block histogram calculation section 10 of FIG. 2A. However, in the case of the example shown in FIG. 11A, the block histogram calculation section

173 improves calculation of the local histogram, thereby allowing information of the level in the bin center to be reflected.

More specifically, the count of the histogram is performed on a plurality of bins. For this reason, the block histogram calculation section 173 extends a unit of the count in the decimal direction.

The block histogram calculation section 173 includes a weight calculation section 201, and counters 202-1 to 202-N.

The weight calculation section 201 specifies the luminance block to which the pixel to be processed belongs, from the luminance value L(nl)(p) of the pixel to be processed supplied from the nonlinear conversion section 152 and the location p of the pixel to be processed, and calculates a weight corresponding to the supplied luminance value. The weight calculation section 201 supplies the calculated weight to the counter corresponding to the specified luminance block out of the counters 202-1 to 202-N corresponding to each of the luminance blocks.

Here, the luminance image is divided into W spatial blocks in the width direction and divided into H spatial blocks in the height direction. Further, each of the spatial blocks is divided into D luminance blocks, and the luminance image is divided into N (=W×H×D) luminance blocks in total. In this case, the block histogram calculation section 173 is provided with N counters 202-1 to 202-N corresponding to each of the N luminance blocks.

Hereinafter, when it is not necessary to distinguish the counters 202-1 to 202-N from each other, they are simply referred to as the counter 202.

The counter 202 to which the weight is supplied from the weight calculation section 201 adds the weight to a maintained value. When the count of a one-frame weight is terminated, the counter 202 supplies and stores the maintained value (the sum total of the weights supplied from the weight calculation section 201) to and in the block histogram memory 174 as a block histogram of the block. The counter 202 initializes a value maintained thereafter.

Meanwhile, the weight calculation section 201 supplies the calculated weight to the counter 202, and also supplies the weight to the block integral value calculation section 175.

[Configuration Example of Block Integral Value Calculation Section]

Figure 11B:
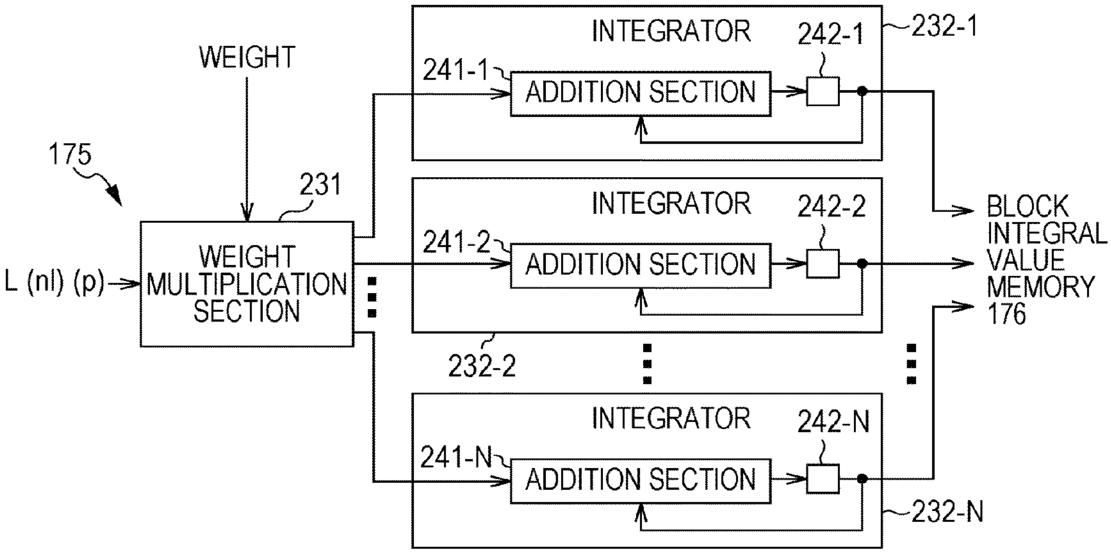

FIG. 11B is a diagram illustrating a configuration example of a function of the block integral value calculation section 175 of FIG. 10. The block integral value calculation section 175 shown in FIG. 11B corresponds to the block integral value calculation section 20 of FIG. 2B. However, in the case of the example shown in FIG. 11B, the block integral value calculation section 175 improves calculation of the local histogram, thereby allowing information of the level in the bin (luminance block) center to be reflected.

The block integral value calculation section 175 includes a weight multiplication section 231 and integrators 232-1 to 232-N. Hereinafter, when it is not necessary to distinguish the integrators 232-1 to 232-N from each other, they are simply referred to as the integrator 232.

The weight multiplication section 231 specifies the luminance block to which the pixel to be processed belongs from the luminance value L(nl)(p) of the pixel to be processed supplied from the nonlinear conversion section 152 and the location p of the pixel to be processed, multiplies the input signal L(nl)(p) by the weight supplied from the weight calculation section 201, and supplies a result of the multiplication to the integrator 232 corresponding to the specified luminance block out of the integrators 232-1 to 232-N corresponding to each of the luminance blocks.

The integrator 232 adds the result of the multiplication to the maintained value supplied from the weight multiplication section 231. In this way, when the sum of the results of the multiplication is calculated by one frame, the integrator 232 supplies and stores the sum of the results of the multiplication to and in the block integral value memory 176 as a block integral value. The integrator 232 initializes a value maintained thereafter.

Each of the integrators 232-1 to 232-N includes addition sections 241-1 to 241-N and registers 242-1 to 242-N, respectively. Hereinafter, when it is not necessary to distinguish the addition sections 241-1 to 241-N from each other, they are simply referred to as the addition section 241. In addition, hereinafter, when it is not necessary to distinguish the registers 242-1 to 242-N from each other, they are simply referred to as the register 242.

The addition section 241 adds a result of multiplication supplied from the weight multiplication section 231 to a value recorded in the register 242, and stores a result of the addition in the register 242. The register 242 stores the sum total of the supplied results of the multiplication. The register 242 stores a value supplied from the addition section 241, and appropriately supplies the stored value to the addition section 241 or the block integral value memory 176.

Figure 11C:
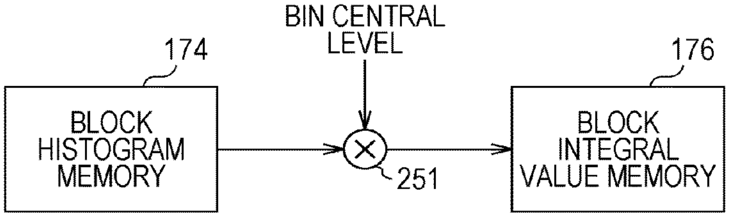

Meanwhile, an addition section 251 may be provided in place of the block integral value calculation section 175, as shown in FIG. 11C. The addition section 251 multiplies a frequency value (the sum of the weights) of the block histogram stored in the block histogram memory 174 by a central value of bin (luminance block), and supplies and stores a result of the multiplication to and in the block integral value memory 176 as a block integral value.

That is, in the case of the example shown in FIG. 11B, the characteristic value (block integral value) is evaluated from the sum total of the luminance values. On the other hand, in the case of FIG. 11C, the characteristic value (block integral value) is evaluated from the frequency value of the block histogram and the central value of bin.

[Weighting Function]

Figure 12A:
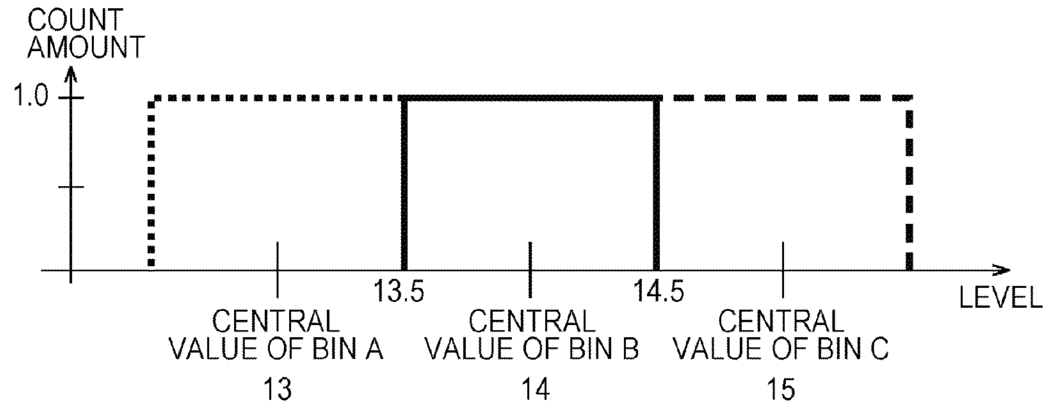
FIGS. 12A to 12C are diagrams illustrating an example of a weight.

As mentioned above, the count of the histogram is performed on a plurality of bins, and for this reason, the unit of the count is extended in the decimal direction. For example, as shown in FIG. 12A, the central value of bin (luminance block) A is set to 13, the central value of bin B next thereto is set to 14, and the central value of bin C next thereto is set to 15. In such a luminance block, for example, as shown in FIG. 12A, the block histogram calculation section 10 of FIG. 2A counts only bin A when the luminance value is less than 13.5, counts only bin B when the luminance value is equal to or more than 13.5 and less than 14.5, and counts only bin C when the luminance value is equal to or more than 14.5.

Figure 12B:
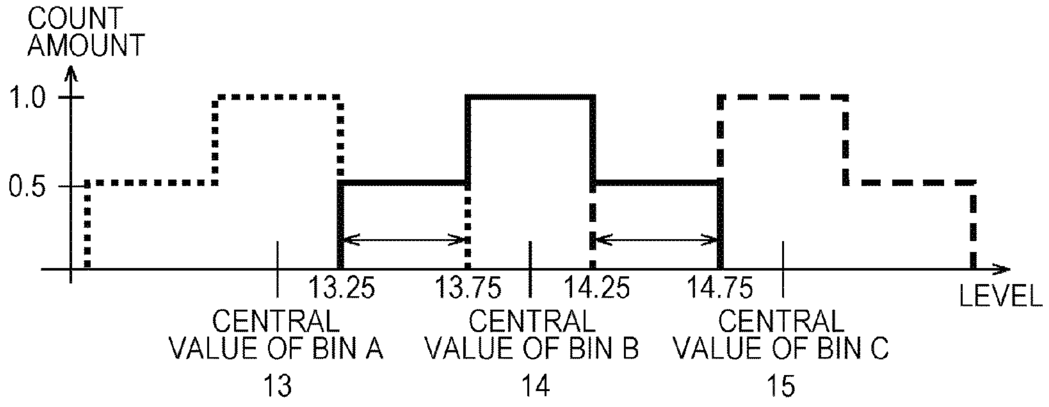
Figure 12C:
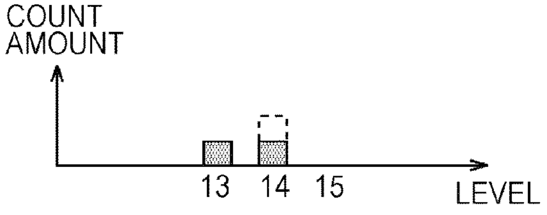

On the other hand, the block histogram calculation section 173 of FIG. 11A extends the unit of the count by one bit in the decimal direction, and, for example, as shown in FIG. 12B, counts both bins when the luminance value is equal to or more than 13.25 and less than 13.75, that is, when a flat image of an intermediate level between bin A and bin B is input. That is, for example, as shown in FIG. 12C, bin A is counted by 0.5, and bin B is counted by 0.5. In this way, the block histogram calculation section 173 resolves a bias of the count of bin, thereby allowing the output error to be reduced as a result.

The extended number of bits may be 2 bits or more. That is, the extended width is further increased, and a weighting function for determining the count amount (weight) for each bin may be defined.

Figure 13A:
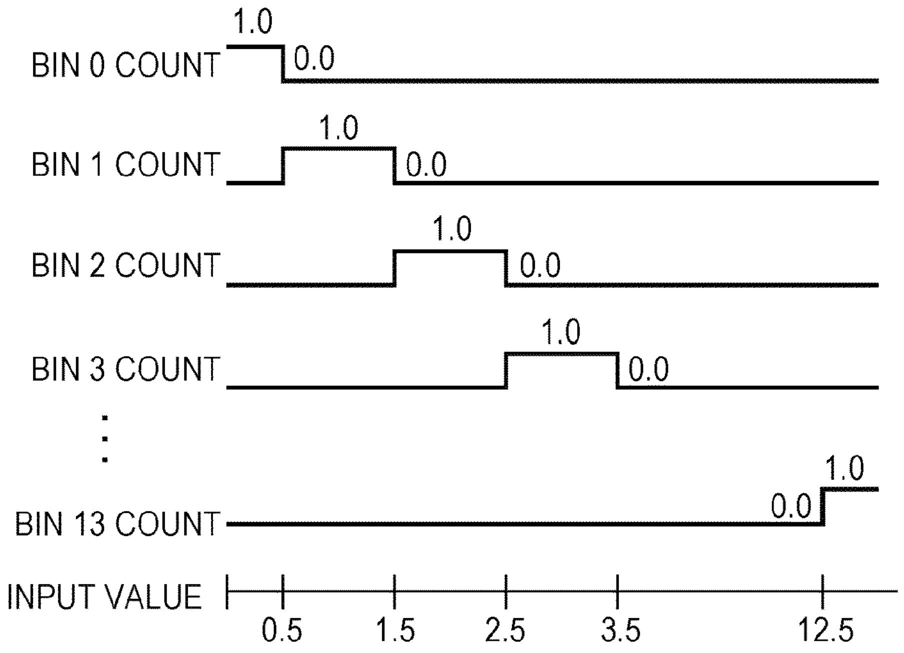
FIGS. 13A and 13B are diagrams illustrating an example of the weight.

The state of this weighting function is shown in FIG. 13. FIG. 13A is a diagram in which the state of the count performed by the block histogram calculation section 10 is expressed as a weighting function. As shown in FIG. 13A, in the weighting function of each bin in this case, the entire range of values equivalent to each bin is set to "1" and the range other than that is set to "0".

Figure 13B:
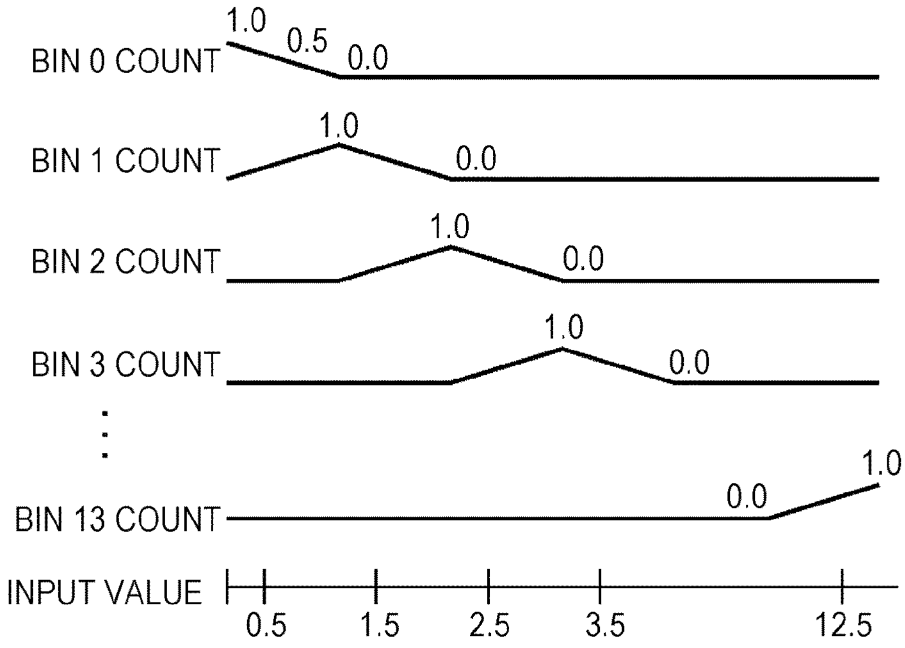

On the other hand, for example, as shown in FIG. 13B, the block histogram calculation section 173 extends the unit of the count, in the decimal direction, to more values than those in the example of FIG. 12, and defines the weighting function. In this case, the weighting function is defined so that the sum total of the weights of all bins is set to 1.0 with respect to a certain input value. In this way, similarly to the case in related art (example of FIG. 13A), the count value can be handled as a statistic. That is, the count value of each bin indicates a frequency.

Meanwhile, the block integral value calculation section 175 multiplies the weights calculated by the block histogram calculation section 173. That is, the weighting function defined in the block histogram calculation section 173 is also applied to the block integral value calculation section 175.

Figure 14:
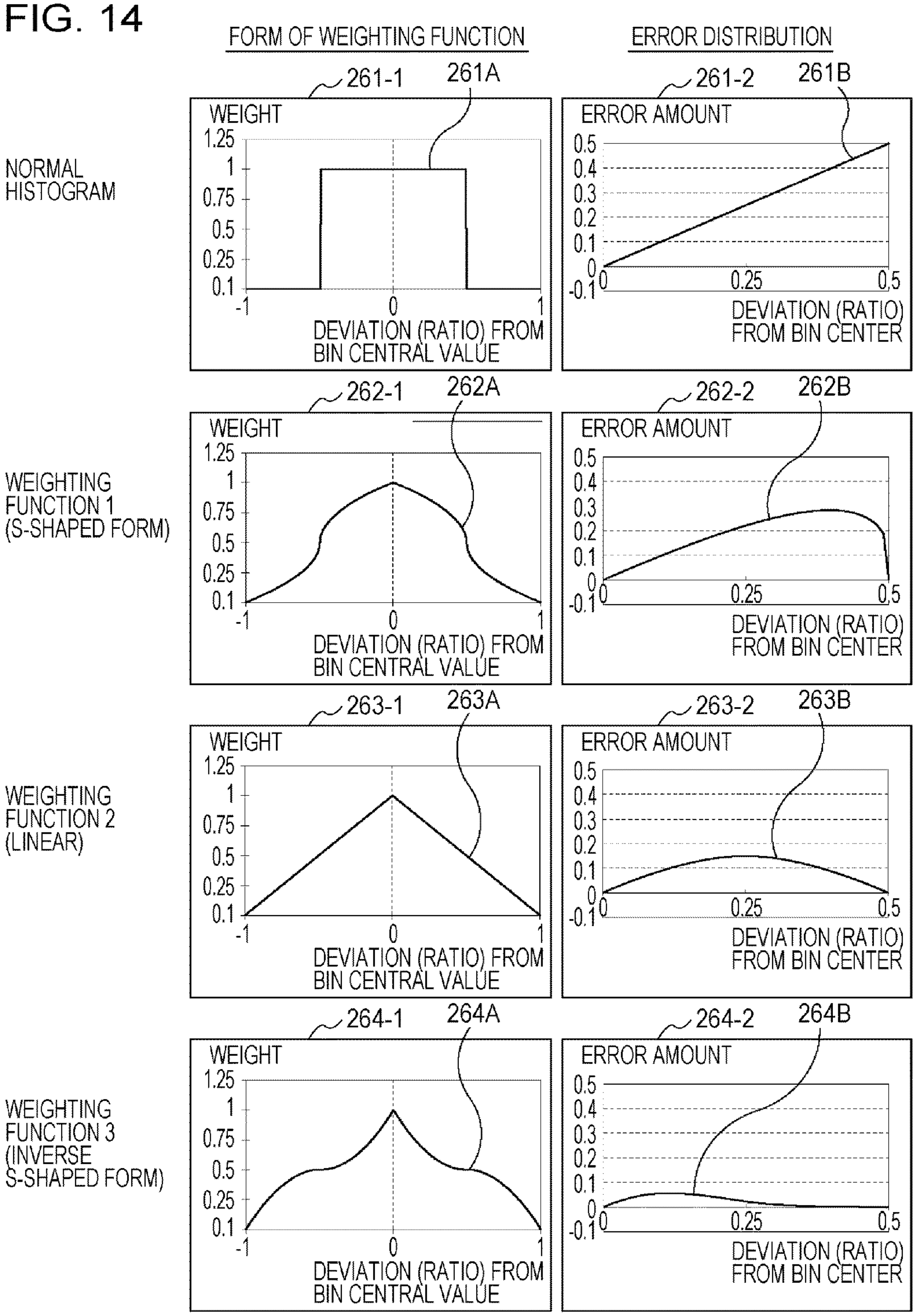
FIG. 14 is a diagram illustrating an example of a weighting function.

This weighting function is discretionary. FIG. 14 shows an example of the weighting function and error distribution, in that case, when the input is a DC signal.

For example, a curved line 261A of a graph 261-1 expresses a normal histogram as a weighting function. The error distribution in this case is as shown by a straight line 261B of a graph 261-2. A curved line 262A of a graph 262-1 shows an example in the case where the weighting function is formed in an S shape. The error distribution in this case is as shown by a curved line 262B of a graph 262-2. A curved line 263A of a graph 263-1 shows an example in the case where the weighting function is formed in a straight line (linear). The error distribution in this case is shown by a curved line 263B of a graph 263-2. A curved line 264A of a graph 264-1 shows an example in the case where the weighting function is formed in a reverse S shape. The error distribution in this case is as shown by a curved line 264B of a graph 264-2.

Of course, the weighting function may assume functions other than these. It is preferable that the weighting function is set depending on the intended use. As the weighting function in a reverse S shape is used, the error is further reduced in an input of the DC signal. However, at the same time, the edge preserving characteristics of the bilateral filter are deteriorated due to an action that causes the distribution of the histogram to be smoothed. Consequently, for example, the reverse S-shaped weighting function may be used when the error of the DC signal becomes a problem, and the S-shaped weighting function may be used when the edge preserving characteristics of the filter are important. In addition, when it is difficult for the use to be specified, or when ease of mounting is important, the weighting function of the linear characteristics is preferable.

Figure 15:
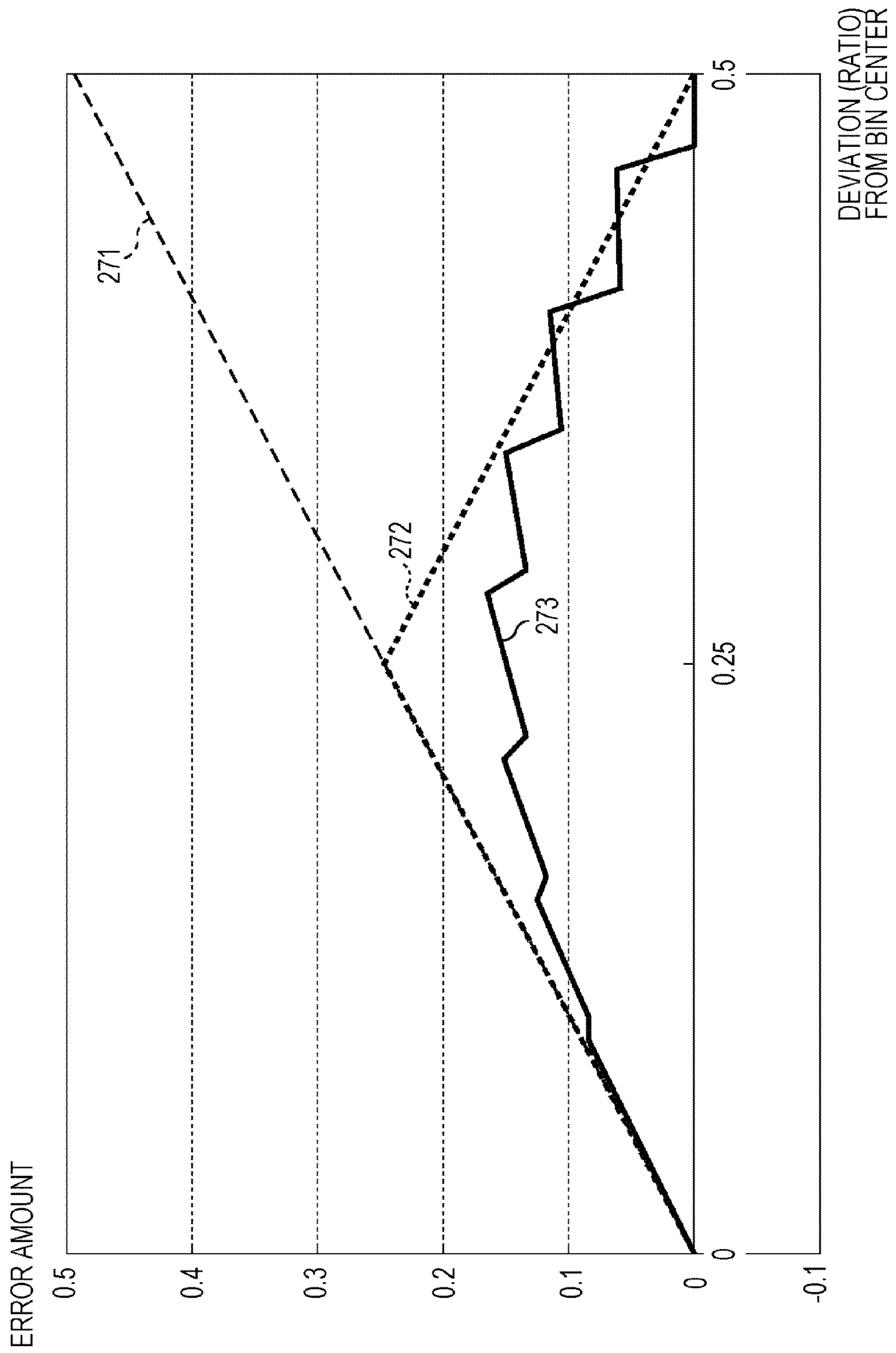
FIG. 15 is a diagram illustrating a difference in error characteristics.

FIG. 15 shows an example of the difference in the error characteristics due to the difference between the histogram calculation methods. A straight line 271 shows an example of the error characteristics of the normal method (case in the example of FIG. 2). A curved line 272 shows an example of the error characteristics when the number of bins is set to double in the normal method. A curved line 273 shows an example of the error characteristics when the example of the weighting function 2 shown in FIG. 14 is applied with a decimal precision of 4 bits.

As shown in FIG. 15, an improvement effect in precision to the same extent as that in the case where the number of bins is increased is obtained by applying the weighting function 2. That is, precision is improved on the same extent as that in the case where the number of bins is set to double in the normal method, simply by addition of a 4-bit memory of the decimal precision and the weighting function of the linear characteristics. In other words, when bit precision of the histogram of the normal method is 4 bits or more, it is possible to reduce the calculation amount or the memory amount further than the case where the number of bins is set to double in the normal method, by using a method of the decimal precision.

Figure 16A:
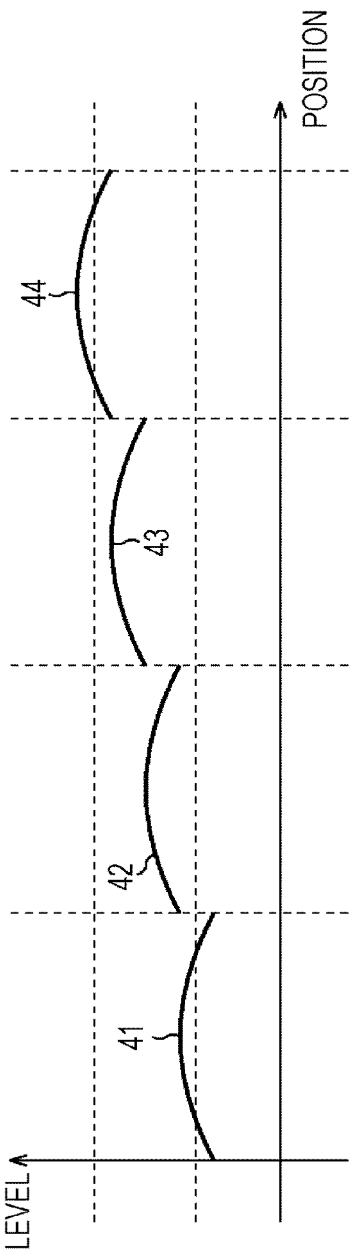
FIGS. 16A and 16B are diagrams illustrating a state of processing of the bilateral filter.
Figure 16B:
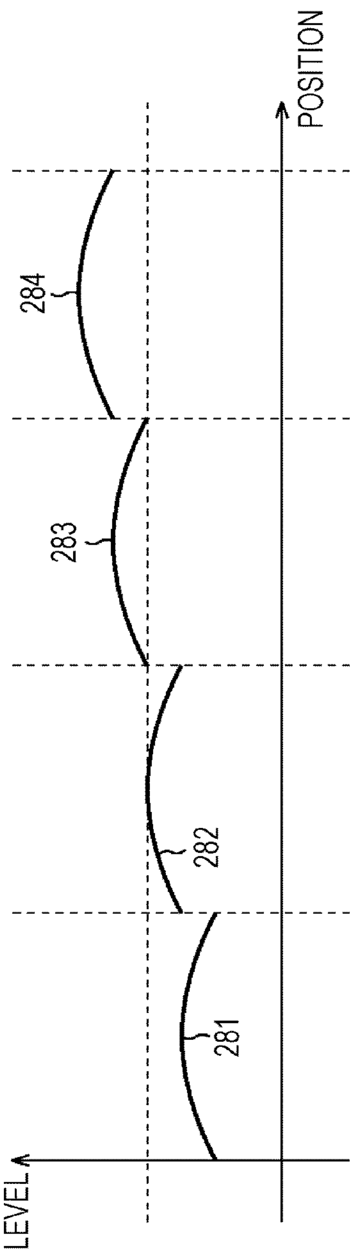

FIGS. 16A and 16B show filter outputs when the decimal precision is added by 3 bits. In this case, the precision is improved, and thus stable filter outputs (signals 281 to 284) are obtained without depending on the input luminance, as shown in FIG. 16B, with respect to the same input signals (signals 41 to 44) as those in FIG. 3A which are shown in FIG. 16A.

[Configuration Example of Weighted Product-Sum Section]

Figure 17:
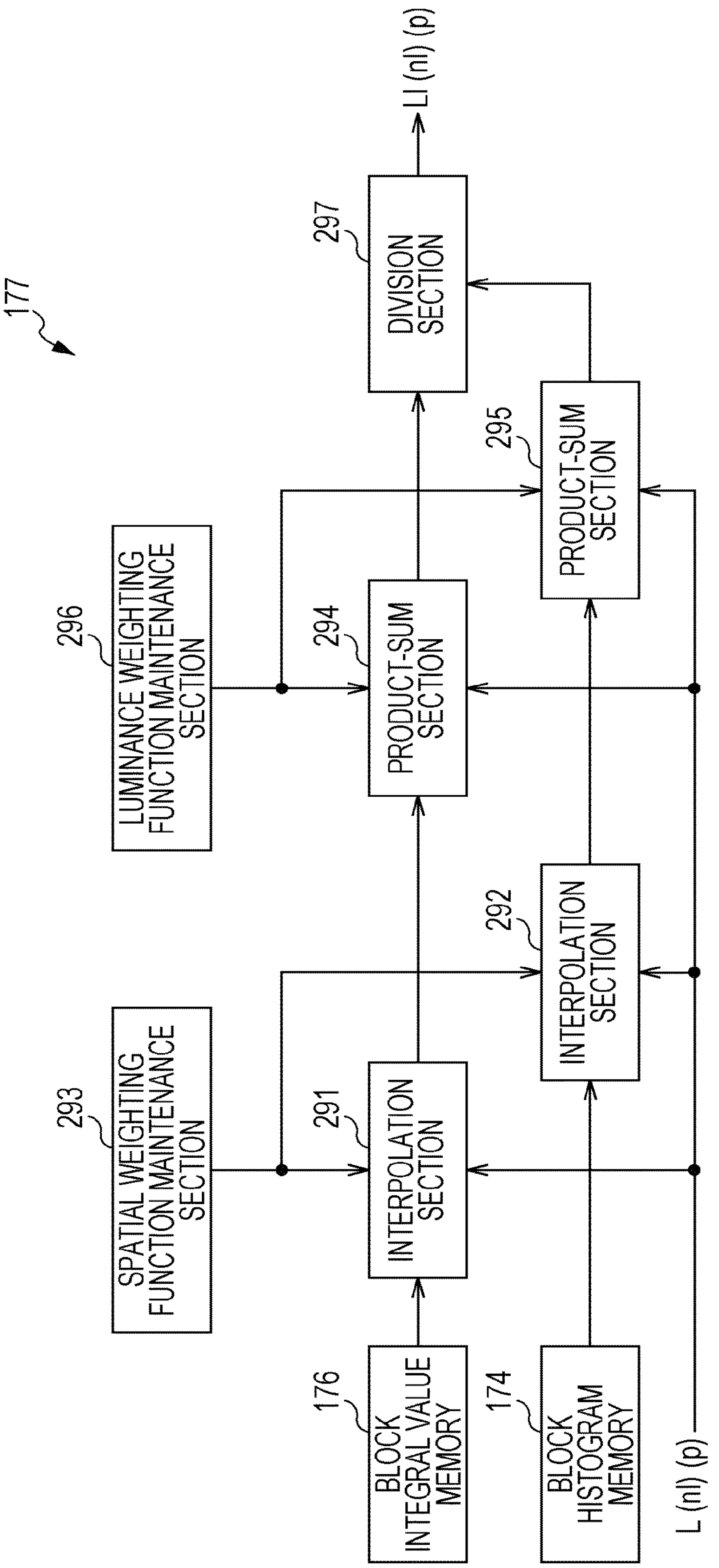
FIG. 17 is a block diagram illustrating a main configuration example of a weighted product-sum section.

FIG. 17 is a diagram illustrating a configuration example of a function of the weighted product-sum section 177 of FIG. 10. As shown in FIG. 17, the weighted product-sum section 177 includes an interpolation section 291, an interpolation section 292, a spatial weighting function maintenance section 293, a product-sum section 294, a product-sum section 295, a luminance weighting function maintenance section 296, and a division section 297.

The interpolation section 291 evaluates a block integral value interpolated for each central value of the luminance range of the luminance block, for the location of the pixel having the luminance value L(nl)(p) supplied from the nonlinear conversion section 152 on the luminance image, that is, the pixel to be processed, to thereby set the block integral value to a luminance integral value, and supplies the luminance integral value to the product-sum section 294. That is, when the central value in the possible range of the luminance value of the pixel within the luminance block is set to λ, the interpolation section 291 multiplies each of the block integral values of 16 luminance blocks of which the central value is λ, by an interpolation coefficient, out of each of the luminance blocks divided from 4×4 spatial blocks in the vicinity of the spatial direction of the pixel to be processed, and evaluates the luminance integral value for the central value of λ by evaluating the sum of the block integral values multiplied by the interpolation coefficient.

In other words, the interpolation section 291 evaluates the luminance integral values for each of the central values of λ by performing interpolation processing in which the block integral values of the luminance blocks in the vicinity of the pixels to be processed are used. Thereby, D luminance integral values for each central value of λ are evaluated. Here, the interpolation coefficient by which each of the block integral values is multiplied is read out from a spatial weighting function look-up table maintained in the spatial weighting function maintenance section 293, on the basis of the relative position relationship between the location of the pixel to be processed and the spatial block in the vicinity of the pixel to be processed.

The interpolation section 292 evaluates a block histogram interpolated for each central value of the luminance range of the luminance block, for the location of the pixel having the luminance value L(nl)(p) supplied from the nonlinear conversion section 152 on the luminance image, that is, the pixel to be processed, to thereby set the block histogram to a luminance histogram, and supplies the luminance histogram to the product-sum section 295. That is, the interpolation section 292 multiplies each of the block histograms of 16 luminance blocks of which the central value is λ, by an interpolation coefficient, out of each of the luminance blocks divided from 4×4 spatial blocks in the vicinity of the spatial direction of the pixel to be processed, and evaluates the luminance histogram for the central value of λ by evaluating the sum of the block histograms multiplied by the interpolation coefficient.

In other words, the interpolation section 292 evaluates the luminance histograms for each of the central values of λ by performing interpolation processing in which the block histograms of the luminance blocks in the vicinity of the pixels to be processed. Thereby, D luminance histograms for each central value of λ are evaluated. Here, the interpolation coefficient by which each of the block histograms is multiplied is read out from the spatial weighting function look-up table maintained in the spatial weighting function maintenance section 293, on the basis of the relative position relationship between the location of the pixel to be processed and the spatial block in the vicinity of the pixel to be processed.

The product-sum section 294 performs calculation for summing the product of the luminance weight values on D luminance integral values supplied from the interpolation section 291, and supplies the product-summed luminance integral values to the division section 297. That is, the sum of the luminance integral values multiplied by the luminance weight values is evaluated. Here, the luminance weight values by which the luminance integral values are multiplied are calculated from the luminance weighting function of the luminance weighting function look-up table maintained in the luminance weighting function maintenance section 296, on the basis of the luminance value L(nl)(p) supplied from the nonlinear conversion section 152 to the product-sum section 294 and the central value of λ.

The product-sum section 295 performs calculation for summing the product of the luminance weight values on D luminance histograms supplied from the interpolation section 292, and supplies the product-summed luminance histograms to the division section 297. That is, the sum of the luminance histograms multiplied by the luminance weight values is evaluated. Here, the luminance weight value by which the luminance histograms are multiplied are calculated from the luminance weighting function of the luminance weighting function look-up table maintained in the luminance weighting function maintenance section 296, on the basis of the luminance value L(nl)(p) supplied from the nonlinear conversion section 152 to the product-sum section 295 and the central value of λ.

The division section 297 divides a luminance product-sum value supplied from the product-sum section 294 by the luminance histogram supplied from the product-sum section 295, to calculate the general luminance value Ll(nl)(p) of the pixel to be processed and supply the general luminance value to the tone curve calculation section 178 and the mapping section 180.

[Flow of Image Processing]

Next, reference will be made to a flow diagram of FIG. 18 to describe image processing executed by the DSP 106. Meanwhile, the processing starts, for example, when image capturing performed by the digital video camera 100 of FIG. 6 starts and supply of a stream of image data (mosaic image) from the A/D converter 105 to the DSP 106 starts. In addition, the image data supplied to the DSP 106 is stored in a internal memory, not shown, of the sequentially DSP 106.

In step S101, the white balance processing section 131 reads a mosaic image. Specifically, the white balance processing section 131 reads the mosaic image of leading frames stored in the internal memory, not shown, of the DSP 106.

In step S102, the white balance processing section 131 adjusts white balance of the acquired mosaic image, and supplies the white balance to the demosaic processing section 132.

In step S103, the demosaic processing section 132 performs demosaic processing. That is, the demosaic processing section 132 performs the demosaic processing on the mosaic image supplied from the white balance processing section 131 to generate an RGB image, and supplies the RGB image to the grayscale correction processing section 133.

In step S104, the grayscale correction processing section 133 performs grayscale correction processing, and corrects the grayscale of the RGB image supplied from the demosaic processing section 132. The grayscale correction processing section 133 supplies the RGB image of which the grayscale is corrected to the gamma correction processing section 134. Meanwhile, the details of the grayscale correction processing will be described later.

In step S105, the gamma correction processing section 134 performs gamma correction on the RGB image supplied from the grayscale correction processing section 133 and supplies the resultant image to the YC conversion processing section 135.

In step S106, the YC conversion processing section 135 performs YC conversion processing. For example, the YC conversion processing section 135 performs YC matrix processing and band limitation for a chroma component on the RGB image supplied from the gamma correction processing section 134, to thereby generate a Y image and a C image from the RGB image.

In step S107, the YC conversion processing section 135 outputs the Y image and the C image. For example, the YC conversion processing section 135 outputs the Y image and the C image, as necessary, to the LCD driver 108 or the CODEC 110.

In step S108, the white balance processing section 131 determines whether the subsequent frame exists. For example, when the mosaic image of the subsequent frame is accumulated in an internal memory, not shown, of the DSP 106, it is determined that the subsequent frame exists.

In step S108, when it is determined that the subsequent frame exists, the processing returns to step S101, and the mosaic image of the next frame to be processed is read. On the other hand, in step S108, when it is determined that the subsequent frame does not exist, the image processing is terminated.

[Flow of Grayscale Correction Processing]

Next, reference will be made to flow diagrams of FIGS. 19 and 20 to describe grayscale correction processing corresponding to processing of step S104 of FIG. 18.

In step S121, the weighted product-sum section 177 and the tone curve calculation section 178 read intermediate data. That is, the interpolation section 291 of the weighted product-sum section 177 reads the block integral value serving as intermediate data from the block integral value memory 176, and the interpolation section 292 of the weighted product-sum section 177 reads the block histogram serving as intermediate data from the block histogram memory 174. In addition, the tone curve calculation section 178 reads the luminance region information serving as intermediate data from the luminance region information memory 172.

In step S122, the luminance region information calculation section 171 reads noise Level(nl) and saturation Level(nl) from an internal memory, not shown, of the DSP 106.

In step S123, the grayscale correction processing section 133 reads a pixel value of the pixel to be processed of the RGB image from the demosaic processing section 132. That is, the nonlinear conversion sections 154-1 to 154-3 read the pixel value Rw(p) of the R component, the pixel value Gw(p) of the G component, and the pixel value Bw(p) of the B component of the pixel to be processed, and the luminance calculation section 151 reads the pixel value of the components R, G, and B of the pixel to be processed.

In step S124, the luminance calculation section 151 calculates the luminance value L(p) of the pixel to be processed on the basis of the read pixel value, and supplies the resultant value to the nonlinear conversion section 152. For example, the luminance calculation section 151 multiplies the read pixel values of the components R, G, and B by a predetermined coefficient and evaluates the linear sum, to set the resultant value to the luminance value or set the maximum value of the pixel values of the components of R, G, and B to the luminance value.

In step S125, the nonlinear conversion section 152 nonlinearly converts the luminance value L(p) supplied from the luminance calculation section 151, and supplies the luminance value L(nl)(p) obtained through the conversion to the luminance grayscale correction section 153 and the grayscale correction section 155. For example, the nonlinear conversion section 152 nonlinearly converts the luminance value L(p) using a function having upward-convex monotonic increase characteristics such as multiplication characteristics or logarithmic characteristics according to an index number smaller than 1.

In step S126, the luminance grayscale correction section 153 and the grayscale correction section 155 read the luminance value L(nl)(p) of the pixel to be processed from the nonlinear conversion section 152.

In step S127, the luminance region information calculation section 171 of the luminance grayscale correction section 153 performs pixel processing for calculating luminance region information. In the pixel processing for calculating the luminance region information, the luminance value of the pixel of the luminance image which has supplied so far and the luminance value L(nl)(p) read from the nonlinear conversion section 152 are compared from each other, and sorting is performed.

In step S128, the block histogram calculation section 173 performs pixel processing for block histogram calculation.

In step S129, the block integral value calculation section 175 performs pixel processing for block integral value calculation.

In step S130, the weighted product-sum section 177 calculates the general luminance value Ll(nl)(p) of the pixel to be processed by performing general luminance value calculation processing, and supplies the general luminance value to the tone curve calculation section 178 and the mapping section 180.

In step S131, the tone curve calculation section 178 evaluates a tone curve from the luminance region information read from the luminance region information memory 172 and the general luminance value Ll(nl)(p) supplied from the weighted product-sum section 177.

In step S132, the mapping section 180 corrects the general luminance value Ll(nl)(p) supplied from the weighted product-sum section 177 on the basis of the tone curve recorded in the tone curve memory 179, and supplies the resultant value to the contrast correction section 182. That is, the mapping section 180 evaluates the tone curve through B-Spline interpolation processing using a control point recorded in the tone curve memory 179, and corrects the grayscale of the general luminance value Ll(nl)(p) by converting the general luminance value Ll(nl)(p) into the general luminance value Lcl (nl)(p) using the evaluated tone curve.

In step S133, the mapping section 181 corrects the read luminance value L(nl)(p) of the pixel to be processed on the basis of the tone curve recorded in the tone curve memory 179, and supplies the resultant value to the contrast correction section 182. That is, the mapping section 181 evaluates the tone curve through the B-Spline interpolation processing using the control point recorded in the tone curve memory 179, and corrects the grayscale of the luminance value L(nl)(p) by converting the luminance value L(nl)(p) into the luminance value Lc(nl)(p) using the evaluated tone curve.

In step S134, the contrast correction section 182 performs contrast correction processing, and compensates the luminance image having the luminance value Lc(nl)(p) on which the grayscale correction is performed by the tone curve and which has a deteriorated contrast with the same contrast as that of an original image. The contrast correction section 182 supplies the luminance value Lu(nl)(p) on which the contrast correction is performed to the grayscale correction section 155.

Figure 20:
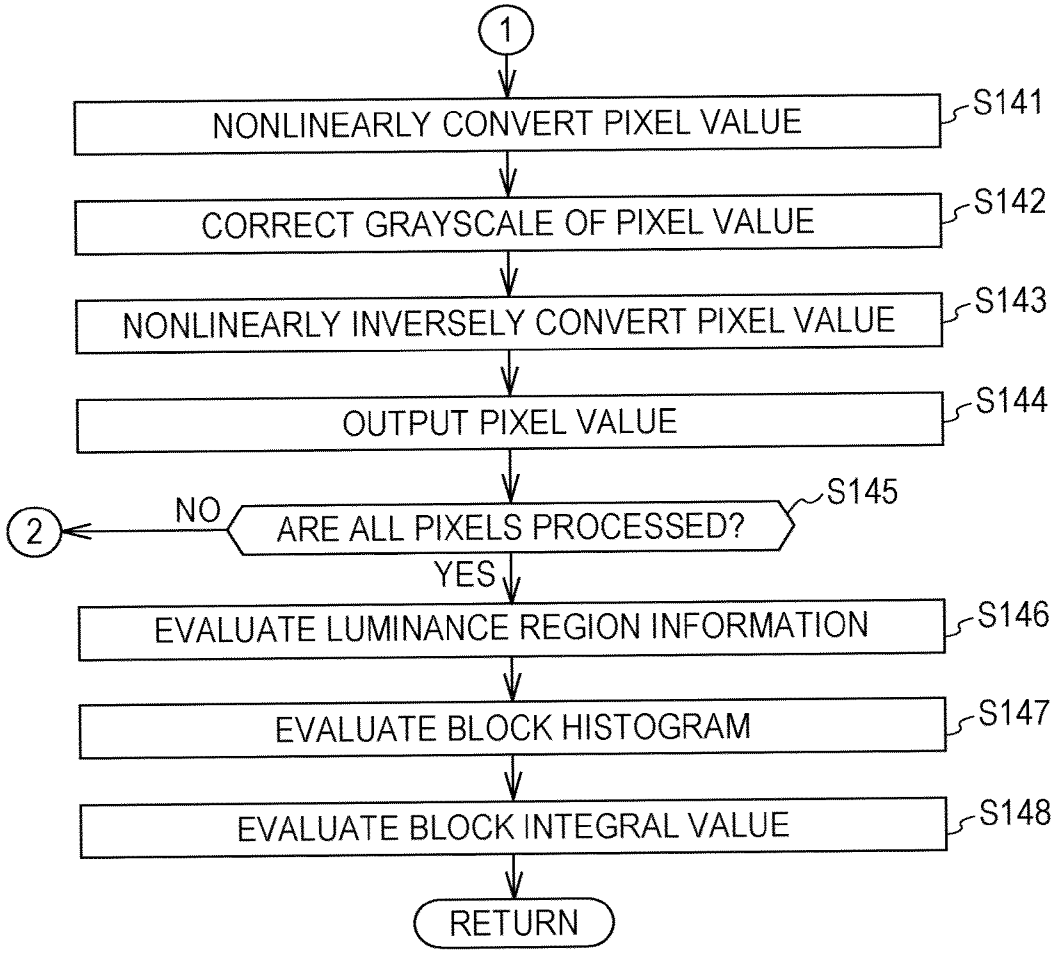
FIG. 20 is a flow diagram continuous with FIG. 19 illustrating an example of the flow of grayscale correction processing.

In step S141 of FIG. 20, the nonlinear conversion section 154 nonlinearly converts the read pixel value of the pixel to be processed, and supplies the resultant value to the grayscale correction section 155. That is, the nonlinear conversion sections 154-1 to 154-3 performs the same nonlinear conversion as the nonlinear conversion performed in processing of step S141 on each of the pixel values Rw(p), Gw(p), and Bw(p) of the RGB image.

In step S142, the grayscale correction sections 155-1 to 155-3 performs grayscale correction on the pixel value supplied from the nonlinear conversion section 154 using the luminance value L(nl)(p) supplied from the nonlinear conversion section 152 and the luminance value Lu(nl)(p) supplied from the luminance grayscale correction section 153. The grayscale correction section 155 supplies the pixel value on which the grayscale correction is performed to the nonlinear inverse conversion section 156.

For example, the grayscale correction section 155 multiplies the pixel value of each color component by the ratio of the luminance value L(nl)(p) to the luminance value Lu(nl)(p) on which the grayscale correction is performed. More specifically, for example, the grayscale correction section 155-1 evaluates the pixel value Ru(nl)(p) on which the grayscale correction is performed by calculating the following Expression (2).

$$Ru(nl)(p) = \left(\frac{R(nl)(p)}{L(nl)(p)}\right) \cdot Lu(nl)(p) \tag{2}$$

In Expression (2), the ratio of the luminance values before and after the grayscale correction, that is, the value obtained by dividing the luminance value Lu(nl)(p) on which the grayscale correction is performed by the luminance value L(nl)(p) before the grayscale correction is multiplied by the nonlinearly converted pixel value R(nl)(p). Similarly, in the grayscale correction sections 155-2 and 155-3, the same calculation as the above-mentioned Expression (2) is performed, and the grayscale correction is performed on the pixel value.

Meanwhile, when the nonlinear conversion performed in the nonlinear conversion sections 152 and 154 is logarithmic conversion, the grayscale correction may be performed on the pixel value by performing calculation represented by Expression (3).

$$Ru(nl)(p)=(R(nl)(p)-L(nl)(p))+Lu(nl)(p) \tag{3}$$

In Expression (3), the difference value between the luminance value Lu(nl)(p) on which the grayscale correction is performed and the luminance value L(nl)(p) before the grayscale correction is added to the pixel value R(nl)(p), and becomes the pixel value Ru(nl)(p) on which the grayscale correction is performed.

In step S143, the nonlinear inverse conversion sections 156-1 to 156-3 performs nonlinear inverse conversion, which is inverse conversion of nonlinear conversion performed by the nonlinear conversion section 154, on the pixel value supplied from the grayscale correction section 155. In step S144, the nonlinear inverse conversion sections 156-1 to 156-3 output the pixel values Ru(p), Gu(p), and Bu(p) obtained through the nonlinear inverse conversion to the gamma correction processing section 134.

In step S145, the grayscale correction processing section 133 determines whether to process all the pixels on the RGB image of the frame to be processed. In step S145, when it is determined that all the pixels are not yet processed, that is, all the pixels are not pixels to be processed, the processing returns to step S123, and the above-mentioned processing is repeated.

On the other hand, in step S145, when it is determined that all the pixels are processed, in step S146, the luminance region information calculation section 171 (FIG. 10) evaluates luminance region information.

In step S147, the block histogram calculation section 173 evaluates the block histogram. That is, the block histogram calculation section 173 supplies and records the values maintained in each of the counters 202-1 to 202-N to and in the block histogram memory 174 as a block histogram of each luminance block.

Figure 18:
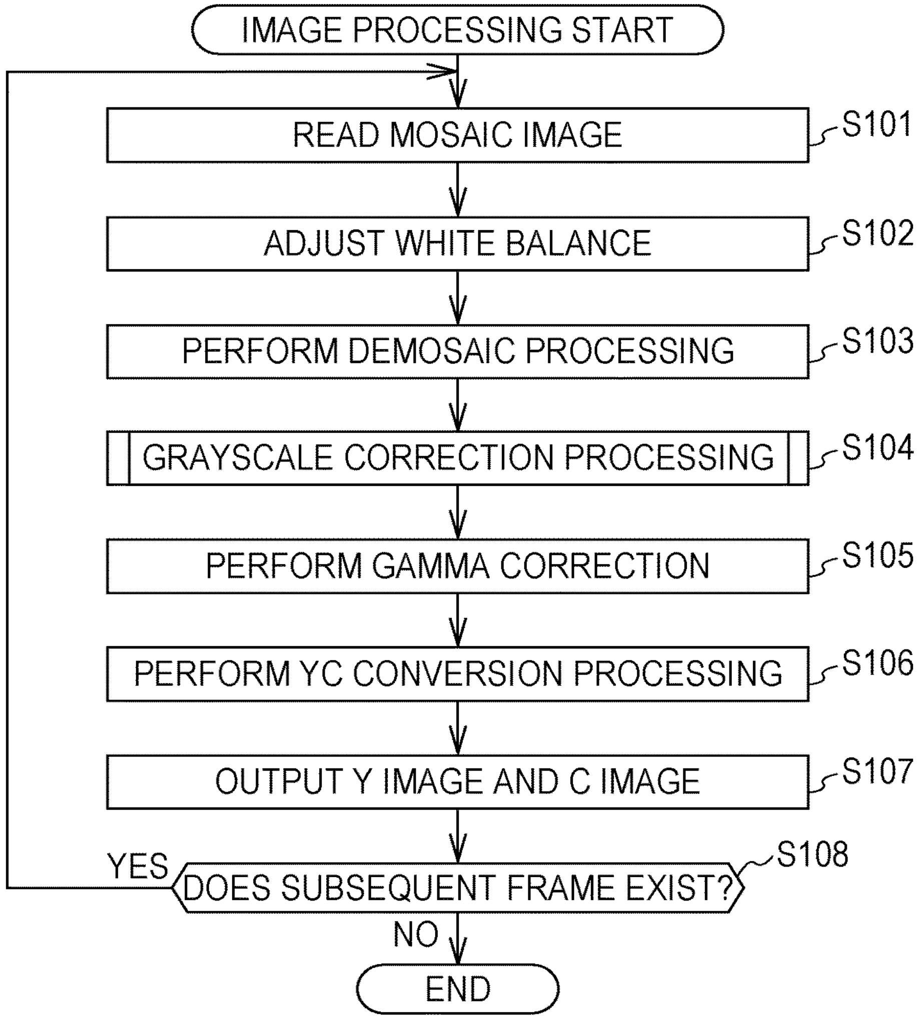
FIG. 18 is a flow diagram illustrating an example of a flow of image processing.

In step S148, the block integral value calculation section 175 evaluates the block integral value, grayscale correction processing is terminated, and the processing returns to step S104 of FIG. 18 and proceeds to step S105. That is, the block integral value calculation section 175 supplies and records the sum total of the luminance values L(nl)(p) recorded in each of the registers 242-1 to 242-N to and in the block integral value memory 176 as a block integral value.

As mentioned above, in the grayscale correction processing, intermediate data is evaluated on the basis of the one-frame luminance image. When the intermediate data is evaluated, the luminance region information serving as intermediate data, the block histogram, and the block integral value are stored in the luminance region information memory 172, the block histogram memory 174, and the block integral value memory 176. In the luminance grayscale correction section 153, using the intermediate data evaluated from a frame immediately prior to the presently processed frame in terms of time, the general luminance value of the pixel to be processed or the tone curve is calculated (edge-preserving smoothing is performed). Therefore, even when the image to be processed is a moving image, it is possible to perform large operator-sized edge-preserving smoothing using a small working memory without scanning all the pixels of the image twice.

[Flow of Pixel Processing for Block Histogram Calculation]

Figure 21:
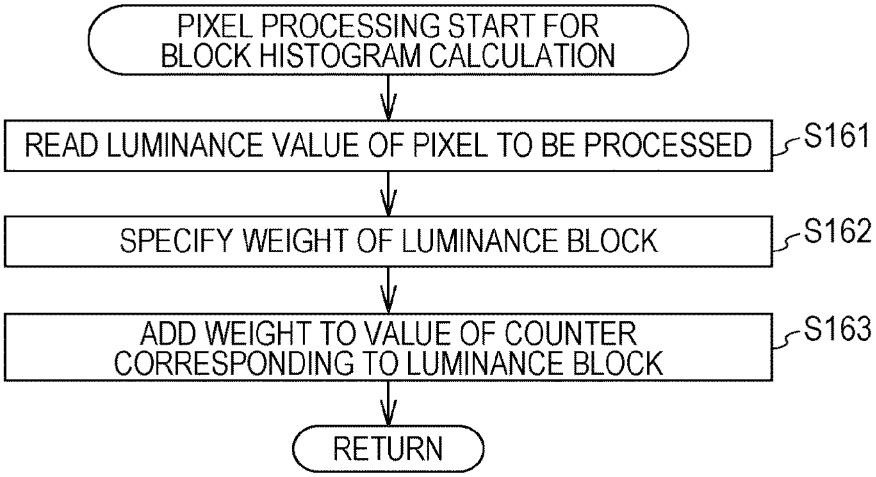
FIG. 21 is a flow diagram illustrating an example of pixel processing for block histogram calculation.

Next, reference will be made to a flow diagram of FIG. 21 to describe an example of a flow of pixel processing for block histogram calculation executed in step S128 of FIG. 19.

When the pixel processing for block histogram calculation starts, in step S161, the weight calculation section 201 reads the luminance value L(nl)(p) of the pixel to be processed, and specifies a luminance block corresponding to the luminance value thereof. In step S162, the weight calculation section 201 specifies a weight of each luminance block corresponding to the luminance value in accordance with the applied weighting function.

In step S163, the counter 202 of the luminance block to which the luminance value corresponds adds the weight calculated in step S162 to a value maintained by itself.

Figure 19:
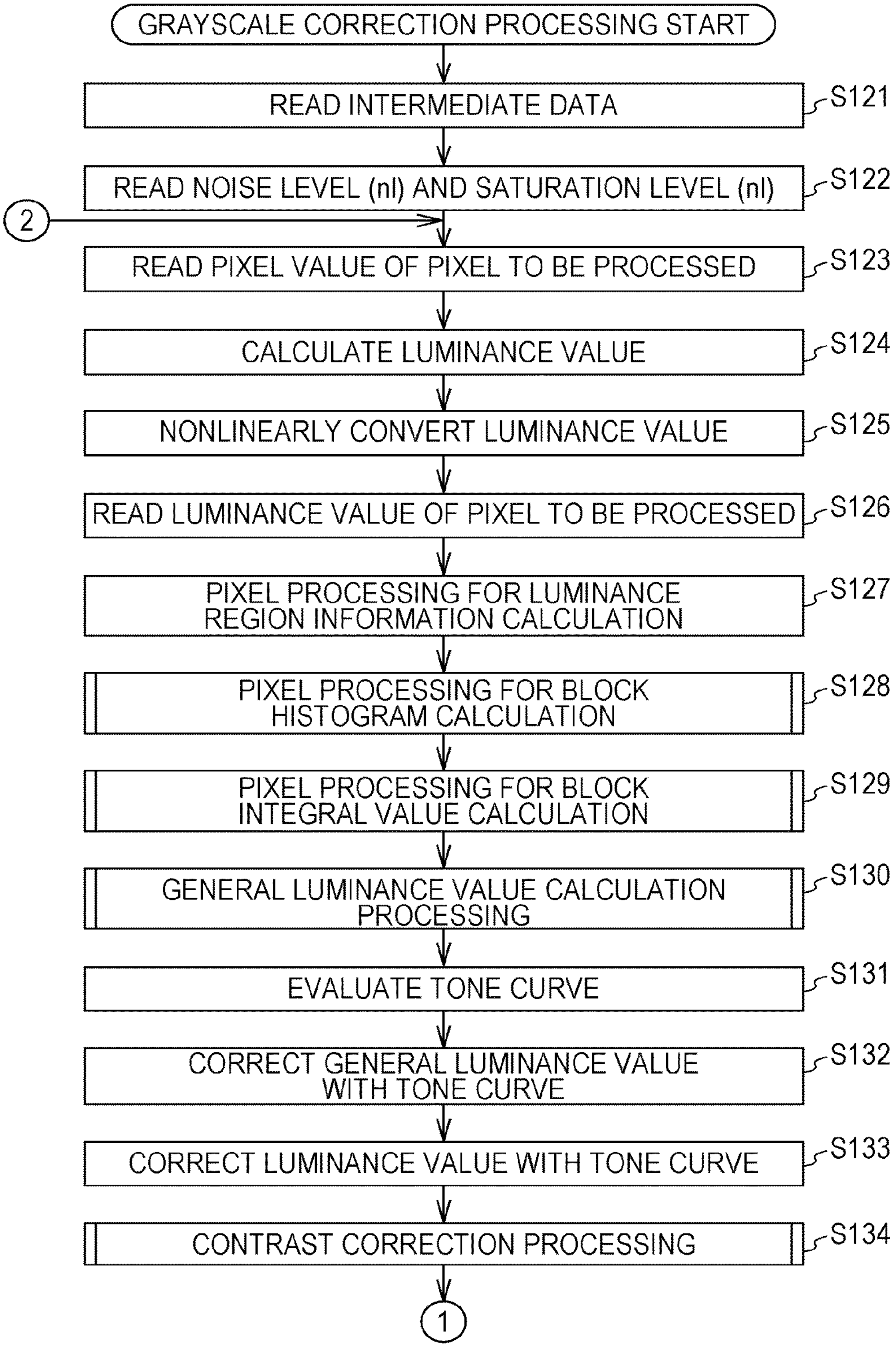
FIG. 19 is a flow diagram illustrating an example of a flow of grayscale correction processing.

When the processing of step S163 is terminated, the counter 202 terminates the pixel processing for block histogram calculation, returns the processing to step S128 of FIG. 19, and performs processing subsequent to step S129.

[Flow of Pixel Processing for Block Integral Value Calculation]

Figure 22:
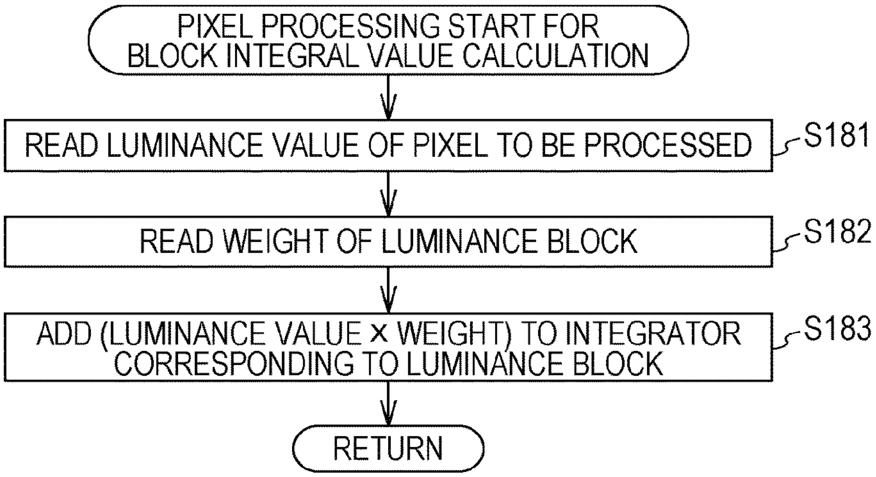
FIG. 22 is a flow diagram illustrating an example of pixel processing for block integral value calculation.

Next, reference will be made to a flow diagram of FIG. 22 to describe an example of a flow of pixel processing for block integral value calculation executed in step S129 of FIG. 19.

When the pixel processing for block integral value calculation starts, in step S181, the weight multiplication section 231 reads the luminance value L(nl)(p) of the pixel to be processed, and specifies a luminance block corresponding to the luminance value thereof. In step S182, the weight multiplication section 231 reads a weight of the weight luminance block corresponding to the luminance value supplied from the calculation section 201, and multiplies the luminance value L(nl)(p) by the weight.

In step S183, the integrator 232 of the luminance block to which the luminance value corresponds adds a multiplication result calculated in step S182 to a value maintained by itself.

When the processing of step S183 is terminated, the integrator 232 terminates the pixel processing for block histogram calculation, returns the processing to step S129 of FIG. 19, and performs processing subsequent to step S130.

Figure 23:
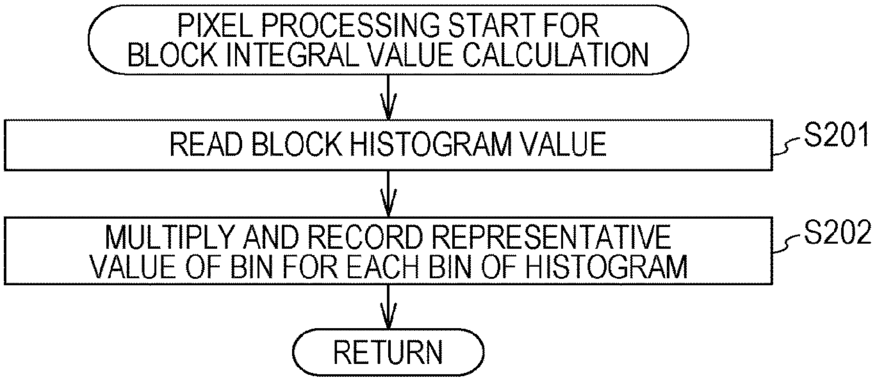
FIG. 23 is a flow diagram illustrating an example of pixel processing for block integral value calculation.

In the case of the example of FIG. 11C, the flow of the pixel processing for block integral value calculation is as shown in a flow diagram of FIG. 23.

In this case, when the pixel processing for block integral value calculation starts, the addition section 251 acquires a value of the block histogram from the block histogram memory 174 in step S201, and multiplies a representative value of bin for each bin of the histogram to record the resultant value in the block integral value memory 176 in step S202.

When the processing of step S202 is terminated, the addition section 251 terminates the pixel processing for block histogram calculation, returns the processing to step S129 of FIG. 19, and performs processing subsequent to step S130.

As mentioned above, the DSP 106 can improve the calculation precision of the bilateral filter while suppressing an increase in the load, by performing each processing. Thereby, it is possible to improve quality performance of image signal processing such as, for example, noise reduction (NR processing) or grayscale correction processing. That is, the DSP 106 can improve quality performance of image signal processing while suppressing an increase in the load.

2. Second Embodiment

Outline of Bilateral Filter

When the method described in the first embodiment is used, the bit length increases due to an arithmetic operation of decimal precision. Consequently, the bit length may be fixed by using the decimation processing together.

For example, in the case of N-bit decimal precision, the number of samples is decimated 0.5N times through the decimation processing (hereinafter, the inverse number of this multiple is referred to as a decimation rate). As the decimated sample increases, the decimation rate increases further. This will cause the maximum value of the frequency to be reduced by N bits, resulting in an offset to N-bit increments in the decimal precision, and thus the final bit length is fixed.

In the processing, an analysis is also possible in which the weight value is converted into an integer by estimating the sum total of the weights of 2N pixels in the vicinity of a sample point from a single sample. A certain weight value of N-bit decimal precision is counted by 2N at one time, resulting in integer precision.

[Configuration of Block Histogram Calculation Section]

Figure 24A:
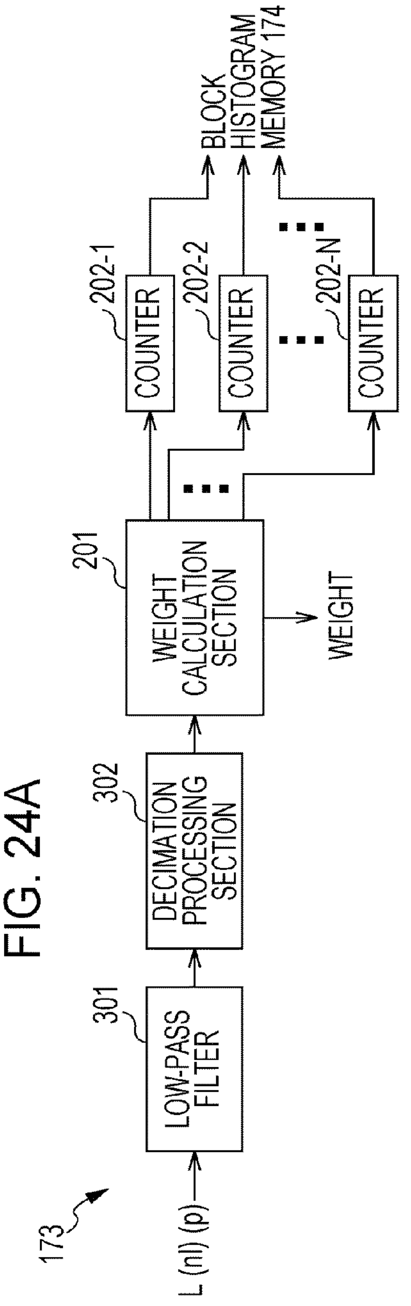
FIGS. 24A and 24B are block diagrams illustrating a main configuration example of the block histogram calculation section and the block integral value calculation section.

FIG. 24A is a block diagram illustrating a main configuration example of the block histogram calculation section 173 in that case.

In the case of the example of FIG. 24A, the block histogram calculation section 173 includes a low-pass filter 301 and a decimation processing section 302 in addition to the configuration in the case of the example of FIG. 11.

The low-pass filter 301 smoothes a luminance value of the input in order to prevent aliasing. The decimation processing section 302 decimates the smoothed luminance value, and evaluates a representative luminance value. The weight calculation section 201 calculates a weight with respect to the representative luminance value which is output from the decimation processing section 302.

[Configuration of Block Integral Value Calculation Section]

Figure 24B:
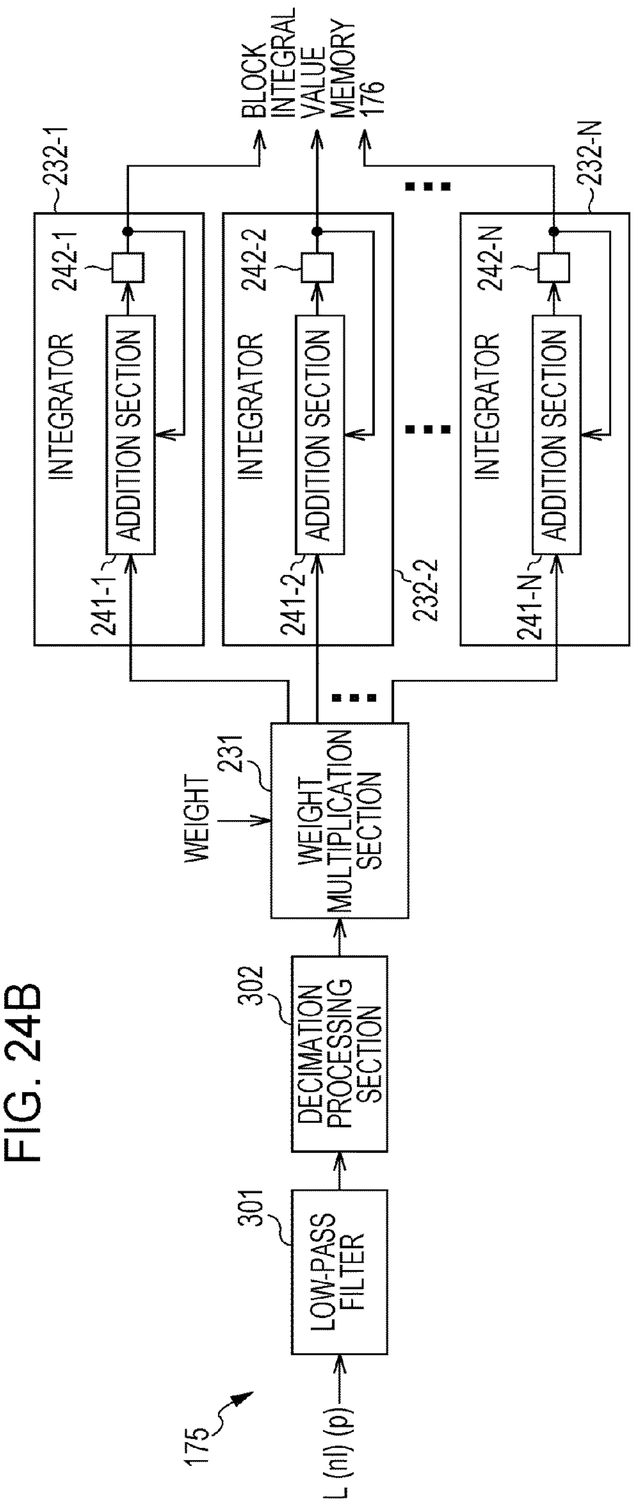

FIG. 24B is a block diagram illustrating a main configuration example of the block integral value calculation section 175 in that case.

In the case of the example of FIG. 24B, the block integral value calculation section 175 also includes the low-pass filter 301 and the decimation processing section 302 in addition to the configuration in the case of the example of FIG. 11. That is, the block integral value calculation section 175 shares the low-pass filter 301 and the decimation processing section 302 with the block histogram calculation section 173.

The weight multiplication section 231 multiplies the representative luminance value which is output from the decimation processing section 302 by the weight supplied from the block histogram calculation section 173, and supplies a result of the multiplication to the integrator 232 of the luminance block corresponding to the representative luminance value.

Meanwhile, even in this case, the addition section 251 as shown in FIG. 11C may be applied in place of the block integral value calculation section 175.

In addition, the block integral value calculation section 175 may include the low-pass filter 301 and the decimation processing section 302 separately from the low-pass filter 301 and the decimation processing section 302 of the block histogram calculation section 173.

[Pixel Processing for Block Histogram Calculation]

Figure 25:
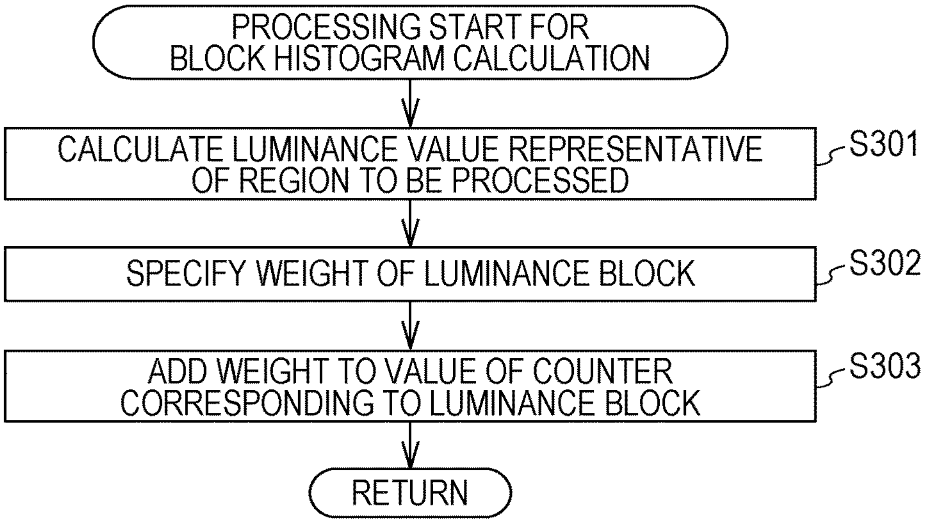
FIG. 25 is a flow diagram illustrating an example of pixel processing for block histogram calculation.

Reference will be made to a flow diagram of FIG. 25 to describe an example of a flow of pixel processing for block histogram calculation in this case.

When the pixel processing for block histogram calculation starts, in step S301, the low-pass filter 301 smoothes the luminance value of the input, and the decimation processing section 302 decimates the smoothed luminance value and calculates the luminance value representative of a region to be processed.

In step S302, the weight calculation section 201 specifies a weight of each luminance block corresponding to the representative luminance value in accordance with the applied weighting function.

In step S303, the counter 202 of the luminance block to which the luminance value corresponds adds the weight calculated in step S302 to a value maintained by itself.

When the processing of step S303 is terminated, the counter 202 terminates the pixel processing for block histogram calculation, returns the processing to step S128 of FIG. 19, and performs processing subsequent to step S129.

[Flow of Pixel Processing for Block Integral Value Calculation]

Figure 26:
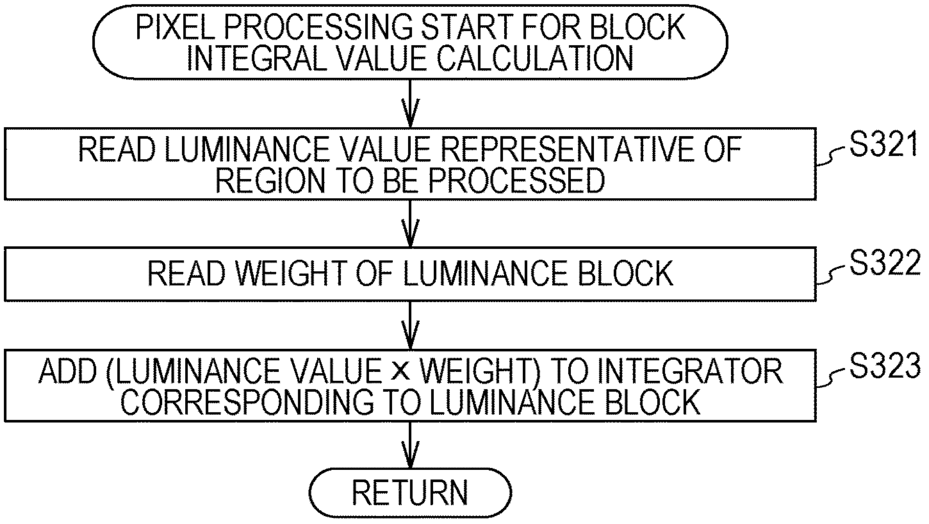
FIG. 26 is a flow diagram illustrating an example of pixel processing for block integral value calculation.

Next, reference will be made to a flow diagram of FIG. 26 to describe an example of a flow of pixel processing for block integral value calculation executed in step S129 of FIG. 19.

When the pixel processing for block integral value calculation starts, in step S321, the low-pass filter 301 smoothes the luminance value of the input, and the decimation processing section 302 decimates the smoothed luminance value and calculates the luminance value representative of a region to be processed. The weight multiplication section 231 reads the luminance value thereof.

In step S322, the weight multiplication section 231 reads a weight of the luminance block corresponding to the luminance value supplied from the weight calculation section 201, and multiplies the luminance value representative of the region to be processed by the weight.

In step S323, integrator 232 of the luminance block to which the luminance value representative of the region to be processed corresponds adds a result of the multiplication calculated in step S322 to a value maintained by itself.

When the processing of step S323 is terminated, the integrator 232 terminates the pixel processing for block histogram calculation, returns the processing to step S129 of FIG. 19, and performs processing subsequent to step S130.

As mentioned above, the DSP 106 can improve calculation precision of the bilateral filter without increasing the bit length, by performing each processing. Thereby, it is possible to more easily improve quality performance of image signal processing such as, for example, noise reduction (NR processing) or grayscale correction processing. That is, the DSP 106 can improve quality performance of image signal processing while suppressing an increase in the load.

3. Third Embodiment

Outline of Bilateral Filter

In the method of decimating the luminance value as described in the second embodiment, as the decimation rate of sampling becomes larger, there is a tendency to a further decrease in edge preserving performance for the fine spatial pattern. Consequently, in order not to decrease the edge preserving performance unnecessarily, for example, as a table shown in FIG. 27, the decimation rate and the decimal precision may be set in accordance with the input image.

For example, an image may be analyzed prior to processing of the filter, and as the table shown in FIG. 27, the decimal precision and the decimation rate may be determined in accordance with the spatial pattern (main frequency component) included in the image.

In the example of FIG. 27, the spatial pattern of the image is classified into three stages. When there are a lot of fine spatial patterns in the image (when there are a lot of high-frequency components), the decimal precision and the decimation rate are set to a small value (the decimation rate is set to 1, and the decimal precision is set to 0 bit). In addition, when there is an intermediate number of fine spatial patterns included in the image (when there are a lot of intermediate-frequency components), the decimal precision and the decimation rate are set to an intermediate value (the decimation rate is set to ¼, and the decimal precision is set to 2 bits). Further, there are few fine spatial patterns in the image (when there are a lot of low-frequency components), the decimal precision and the decimation rate are set to a large value (the decimation rate is set to 1/16, and the decimal precision is set to 4 bits).

[Configuration Example of Luminance Grayscale Correction Section]

Figure 28:
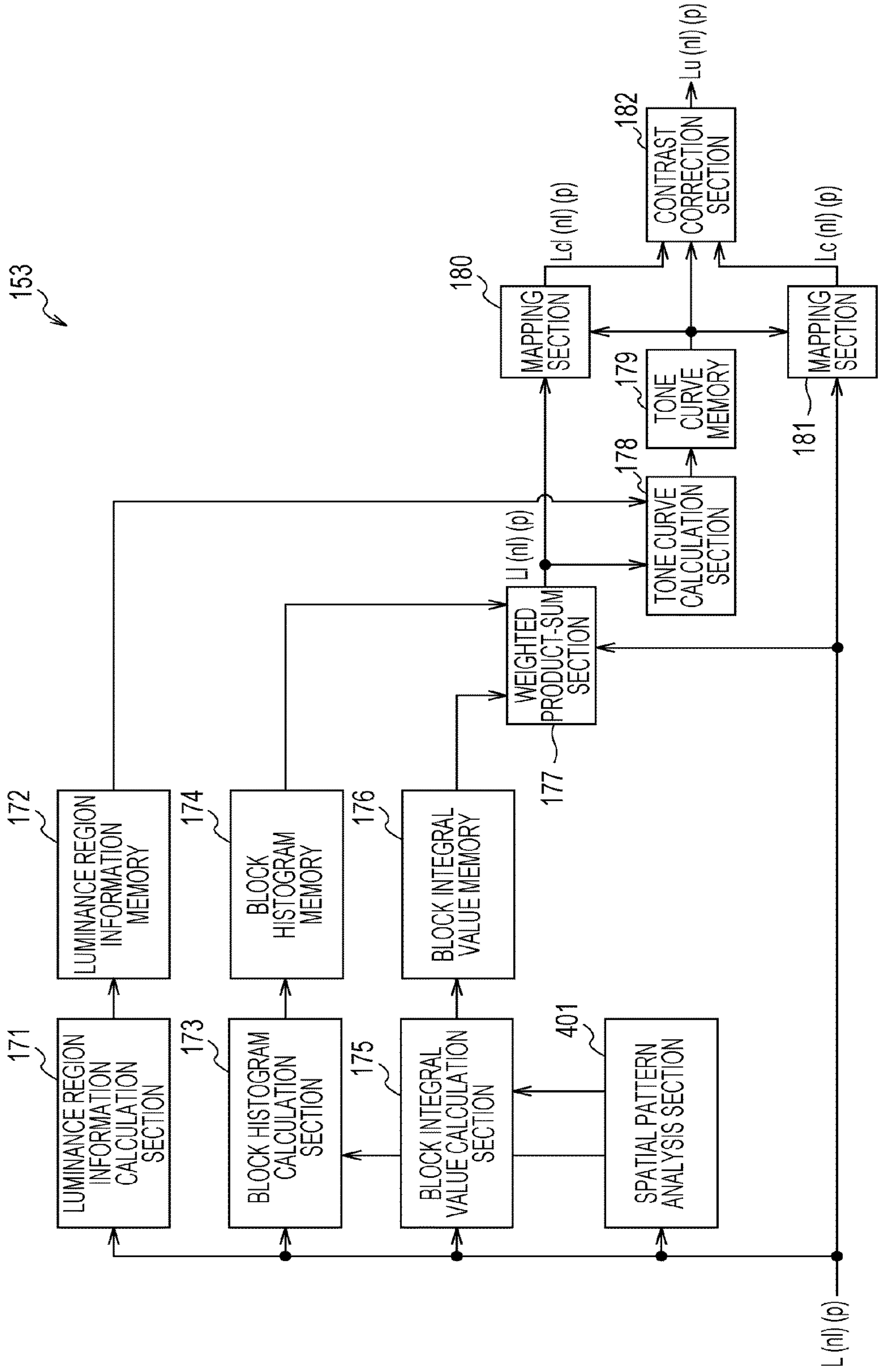
FIG. 28 is a block diagram illustrating a main configuration example of the luminance grayscale correction section.

FIG. 28 is a block diagram illustrating a main configuration example of the luminance grayscale correction section 153 in this case. FIG. 28 corresponds to FIG. 10. In the case of the example of FIG. 28, the luminance grayscale correction section 153 includes a spatial pattern analysis section 401 in addition to the configuration in the case of the example of FIG. 10.

The spatial pattern analysis section 401 determines fineness of the spatial pattern. Although the determination method is arbitrary, for example, the spatial pattern analysis section 401 determines the fineness of the spatial pattern by evaluating energy in each frequency band of the image. For example, the spatial pattern analysis section 401 includes determination reference (determination logic) like the table shown in FIG. 27, analyzes the luminance value L(nl)(p) of the pixel to be processed which is supplied from the nonlinear conversion section 152, performs determination of the analysis result in accordance with the reference, determines to be a fine pattern as the energy is biased toward the high-frequency component, and determines to be a rough pattern, reversely, as the energy is biased toward the low-frequency component.

The spatial pattern analysis section 401 supplies a result of the determination to the block histogram calculation section 173 and the block integral value calculation section 175.

[Configuration Example of Spatial Pattern Analysis Section]

Figure 29:
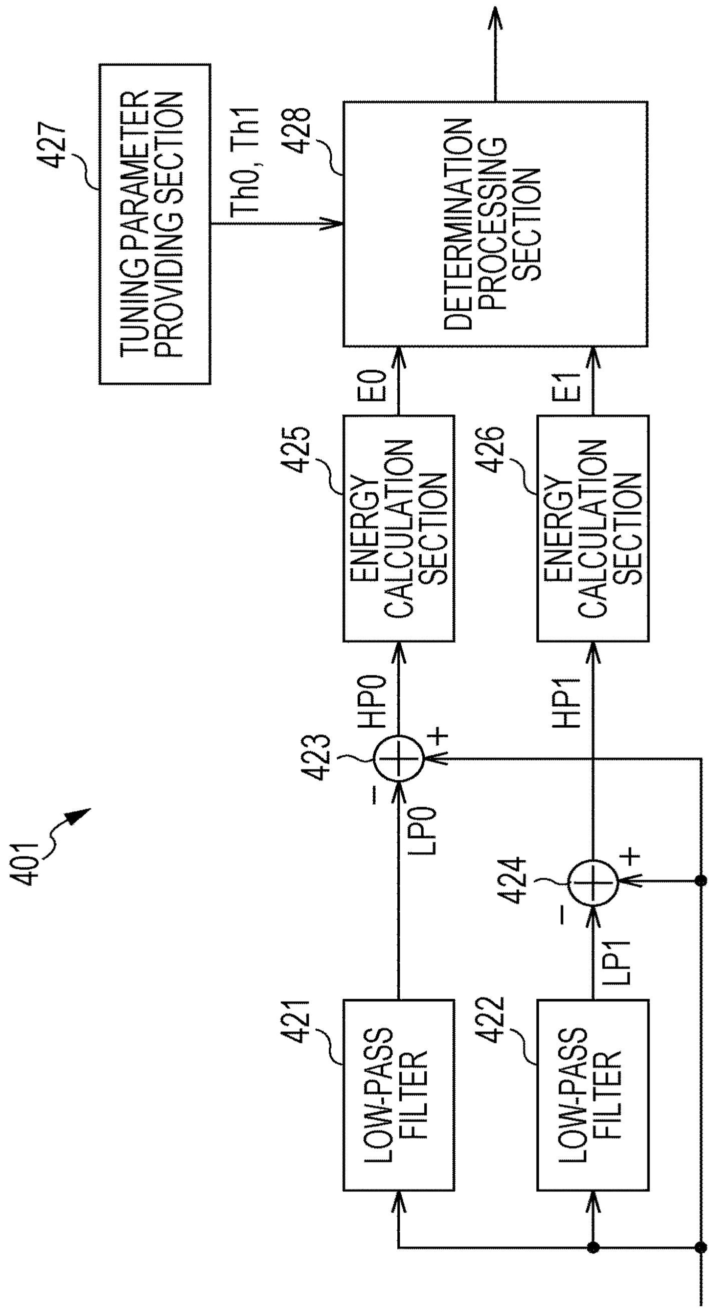
FIG. 29 is a block diagram illustrating a main configuration example of a spatial pattern analysis section.

FIG. 29 is a block diagram illustrating a main configuration example of the spatial pattern analysis section 401. As shown in FIG. 29, the spatial pattern analysis section 401 includes a low-pass filter 421, a low-pass filter 422, an arithmetic operation section 423, an arithmetic operation section 424, an energy calculation section 425, an energy calculation section 426, a tuning parameter providing section 427, and a determination processing section 428.

The low-pass filter 421 and the low-pass filter 422, respectively, perform low-pass filtering on the luminance value L(nl)(p) of the pixel to be processed which is supplied from the nonlinear conversion section 152, and pass relatively low-frequency components.

The low-pass filter 421 and the low-pass filter 422 have a different pass band. The low-pass filter 422 has a pass band wider than that of the low-pass filter 421, and can also pass higher-frequency components.

In the following, to simplify the description, while the frequency component is divided into three stages of a high-frequency component, an intermediate-frequency component, and a low frequency component, the low-pass filter 422 passes the intermediate-frequency component and the low frequency component, and the low-pass filter 421 passes only the low frequency component.

The arithmetic operation section 423 subtracts an output LP0 of the low-pass filter 421 from the luminance value L(nl)(p) of the pixel to be processed supplied from the nonlinear conversion section 152, and generates a difference value (high-pass signal) HP0. Since the output LP0 of the low-pass filter 421 includes only the low frequency component, the high-pass signal HP0 includes the high-frequency component and the intermediate-frequency component. The arithmetic operation section 423 supplies the high-pass signal HP0 to the energy calculation section 425.

The arithmetic operation section 424 subtracts an output LP1 of the low-pass filter 422 from the luminance value L(nl)(p) of the pixel to be processed supplied from the nonlinear conversion section 152, and generates a difference value (high-pass signal) HP1. Since the output LP1 of the low-pass filter 422 includes the low frequency component and the intermediate-frequency component, the high-pass signal HP1 includes only the high-frequency component. The arithmetic operation section 424 supplies the high-pass signal HP1 to the energy calculation section 426.

The energy calculation section 425 calculates energy of the high-pass signal HP0 by performing square integration on the supplied high-pass signal HP0 within the region to be determined. The energy calculation section 425 supplies calculated energy E0 to the determination processing section 428.

The energy calculation section 426 calculates energy of the high-pass signal HP1 by performing square integration on the supplied high-pass signal HP1 within the region to be determined. The energy calculation section 426 supplies calculated energy E1 to the determination processing section 428.

Figure 30:
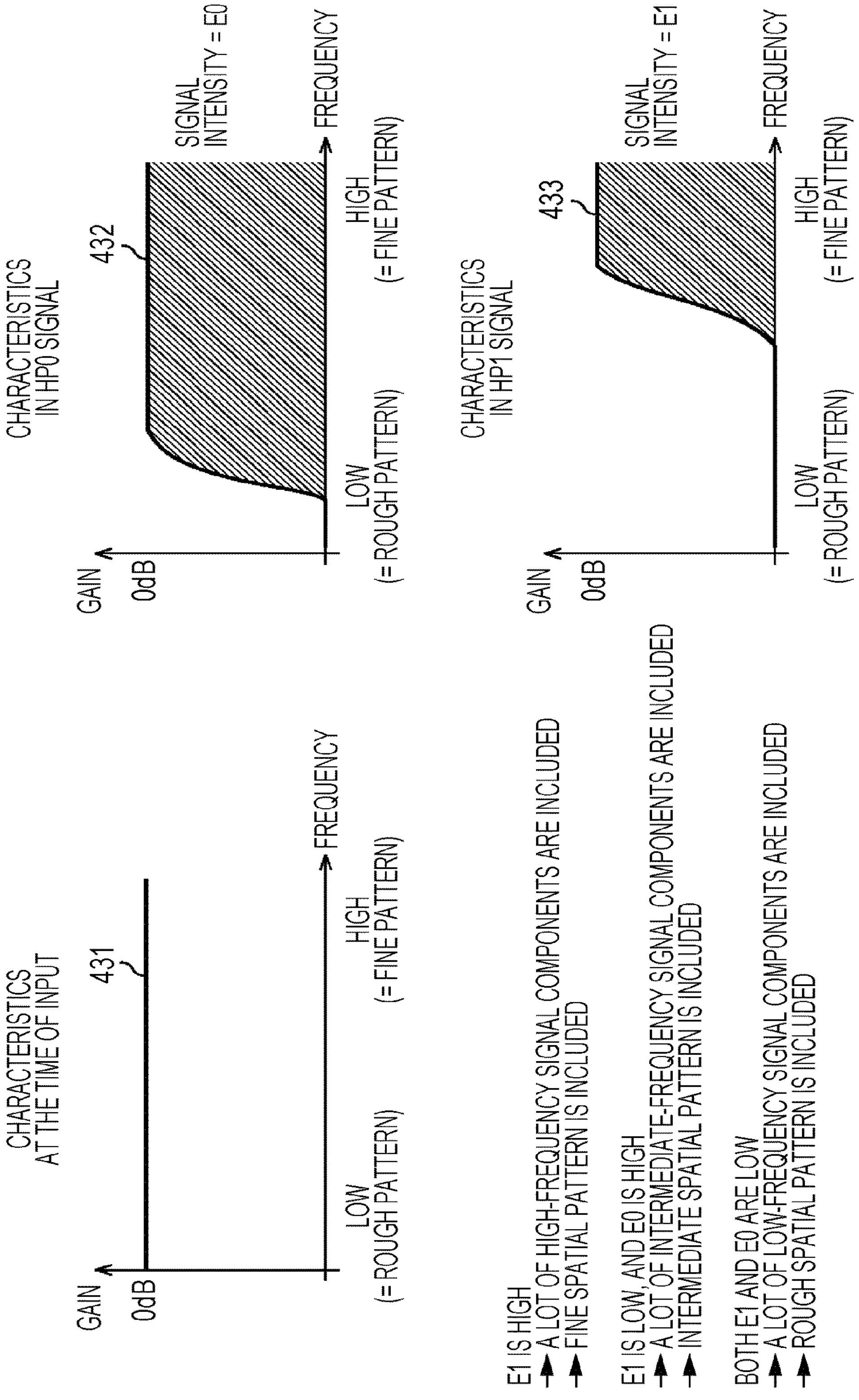
FIG. 30 is a diagram illustrating an example of signal intensity.

For example, as shown in FIG. 30, frequency characteristics (frequency characteristics at the time of the input) of the luminance value L(nl)(p) of the pixel to be processed supplied from the nonlinear conversion section 152 include a range from the low frequency component to the high-frequency component as shown by a straight line 431.

The high-pass signal HP0 having the frequency characteristics as shown by a curved line 432 is obtained from the input signal through processing of the low-pass filter 421 and the arithmetic operation section 423. Similarly, the high-pass signal HP1 having the frequency characteristics as shown by a curved line 433 is obtained from the input signal through processing of the low-pass filter 422 and the arithmetic operation section 424.

The energy calculation section 425 calculates energy (signal intensity E0) equivalent to the area of the portion (portion shown by diagonal lines) under the curved line 432. The energy calculation section 426 calculates energy (signal intensity E1) equivalent to the area of the portion (portion shown by diagonal lines) under the curved line 433.

The determination processing section 428 determines the spatial pattern in accordance with the tendency of the frequency distribution of the energy. For example, as shown in FIG. 30, when the signal intensity E1 is high, the determination processing section 428 determines that there are a lot of high-frequency components, and determines that a lot of fine spatial patterns are included in the image. In addition, when the signal intensity E1 is low and the signal intensity E0 is high, the determination processing section 428 determines that there are a lot of intermediate-frequency components, and determines that a lot of intermediate spatial patterns are included in the image. Further, when the signal intensity E0 and the signal intensity E1 are all low, the determination processing section 428 determines that there are a lot of low-frequency components, and determines that a lot of rough spatial patterns are included in the image.

The tuning parameter providing section 427 previously maintains a threshold Th0 and a threshold Th1, serving as the determination reference of whether the signal intensity is high or low, as a tuning parameter, and appropriately provides these thresholds to the determination processing section 428. The threshold Th0 and the threshold Th1 may be previously determined, and may be appropriately updated.

When determining the spatial pattern included in the image using the threshold Th0 and the threshold Th1 provided from the tuning parameter providing section 427, the determination processing section 428 supplies a result of the determination to the block histogram calculation section 173 and the block integral value calculation section 175.

[Configuration Example of Block Histogram Calculation Section]

Figure 31:
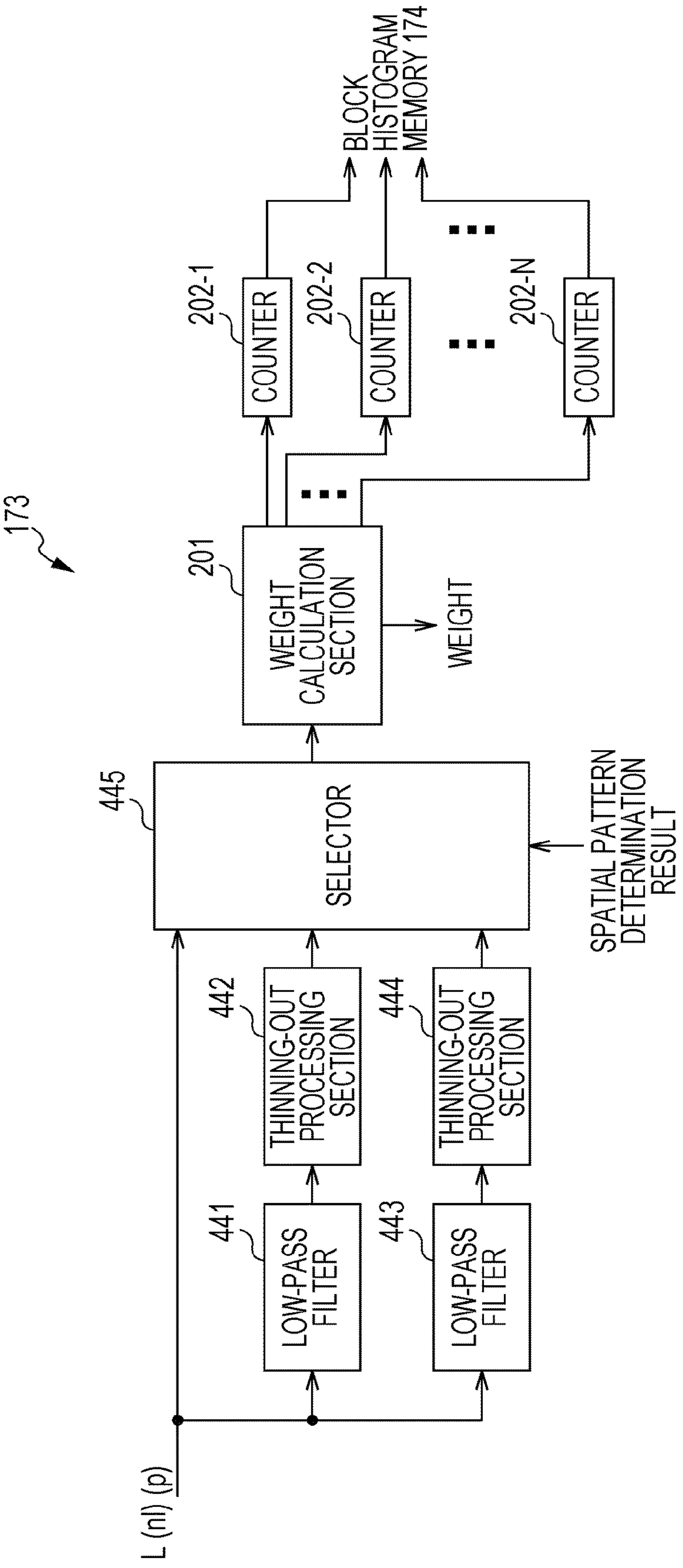
FIG. 31 is a block diagram illustrating a main configuration example of the block histogram calculation section.

FIG. 31 is a block diagram illustrating a main configuration example of the block histogram calculation section 173 in this case.

As shown in FIG. 31, in this case, the block histogram calculation section 173 includes a low-pass filter 441, a decimation processing section 442, a low-pass filter 443, a decimation processing section 444, and a selector 445, in front of the weight calculation section 201.

The low-pass filter 441 and the decimation processing section 442, and the low-pass filter 443 and the decimation processing section 444, respectively, reduce the number of samples in order to absorb bit length increments (in order for the bit length not to increase) caused by the arithmetic operation of the decimal precision, similarly to the low-pass filter 301 and the decimation processing section 302 (FIG. 24A) described in the second embodiment.

That is, the low-pass filter 441 and the low-pass filter 443, respectively, correspond to the low-pass filter 301, and perform the same processing as that of the low-pass filter 301. The decimation processing section 442 and the decimation processing section 444, respectively, correspond to the decimation processing section 302, and perform the same processing as that of the decimation processing section 302.

However, decimation is performed in passes of the low-pass filter 443 and the decimation processing section 444 much more than in passes of the low-pass filter 441 and the decimation processing section 442. That is, the decimation rate is high.

More specifically, the low-pass filter 443 has a pass band narrower than that of the low-pass filter 441, and the decimation processing section 444 has a decimation rate higher than that of the decimation processing section 442.

In addition to these passes, a pass in which decimation is not performed is supplied to the selector 445. That is, three passes of a pass in which decimation is not performed, a pass in which decimation is performed at a low rate, and a pass in which decimation is performed at a high rate are supplied to the selector 445.

The selector 445 selects one pass out of the supplied three passes on the basis of the spatial pattern determination result supplied from the spatial pattern analysis section 401, and supplies the luminance value of the pass to the weight calculation section 201. Similarly to the case of FIG. 24A, the weight calculation section 201 performs calculation or the like of a weight of the supplied luminance value. However, in this case, as shown in the table of FIG. 27, the weight calculation section 201 calculates the weight with decimal precision in accordance with the decimation rate of the supplied luminance value.

That is, although the luminance value is supplied to the selector 445 in a plurality of passes (which may include a pass (in which decimation is not performed) having a decimation rate of 1) for decimating the luminance value at different decimation rates, the number of passes and the decimation rate of each pass (and the decimal precision of the weighting function) are set corresponding to the number of classification of the spatial pattern of the spatial pattern analysis section 401, as shown in the table of FIG. 27.

Therefore, for example, when the spatial pattern analysis section 401 classifies the spatial pattern into four stages or more, the block histogram calculation section 173 also has four or more passes of which the decimation rates are different from each other.

[Configuration Example of Block Integral Value Calculation Section]

Figure 32:
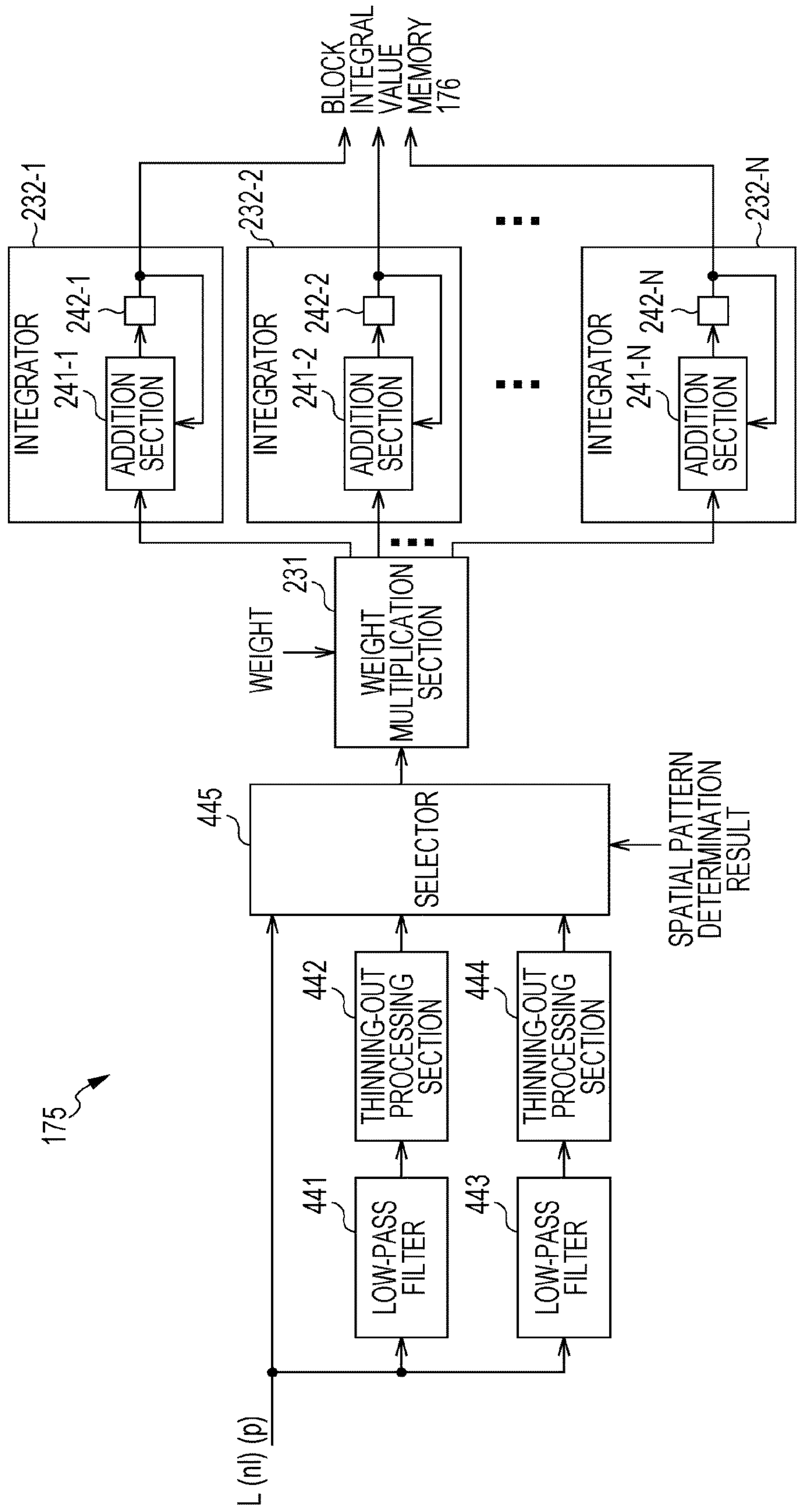
FIG. 32 is a block diagram illustrating a main configuration example of the block integral value calculation section.

FIG. 32 is a block diagram illustrating a main configuration example of the block integral value calculation section 175 in this case.

As shown in FIG. 32, in this case, the block integral value calculation section 175 includes the low-pass filter 441, the decimation processing section 442, the low-pass filter 443, the decimation processing section 444, and the selector 445, in front of the weight multiplication section 231. That is, the block integral value calculation section 175 shares the low-pass filter 441, the decimation processing section 442, the low-pass filter 443, the decimation processing section 444, and the selector 445, with the block histogram calculation section 173.

The weight multiplication section 231 multiplies the luminance value of the pass selected by the selector 445 on the basis of the spatial pattern determination result supplied from the spatial pattern analysis section 401, by a weight calculated in the weight calculation section 201.

That is, the number of passes of the block integral value calculation section 175 and the decimation rate of each pass (and the decimal precision of the weighting function) is also set corresponding to the number of classification of the spatial pattern of the spatial pattern analysis section 401, as shown in the table of FIG. 27, similarly to the case of the block histogram calculation section 173.

Meanwhile, the block integral value calculation section 175 may include the low-pass filter 441, the decimation processing section 442, the low-pass filter 443, the decimation processing section 444, and the selector 445, separately from the configuration included in the block histogram calculation section 173.

In this way, the luminance grayscale correction section 153 can set the decimation rate and the decimal precision in accordance with the contents (spatial pattern) of the input image. Therefore, the luminance grayscale correction section 153 can more appropriately adjust the amount of extension of the bin count precision in the decimal direction, and can suppress unnecessary reduction in edge preserving performance.

That is, the DSP 106 can improve the calculation precision of the bilateral filter while suppressing an increase in the load. Thereby, it is possible to improve quality performance of image signal processing such as, for example, noise reduction (NR processing) or grayscale correction processing.

[Flow of Grayscale Correction Processing]

Reference will be made to flow diagrams of FIGS. 33 and 34 to describe an example of a flow of grayscale correction processing in this case. The flow diagrams correspond to the flow diagrams of FIGS. 19 and 20.

Figure 33:
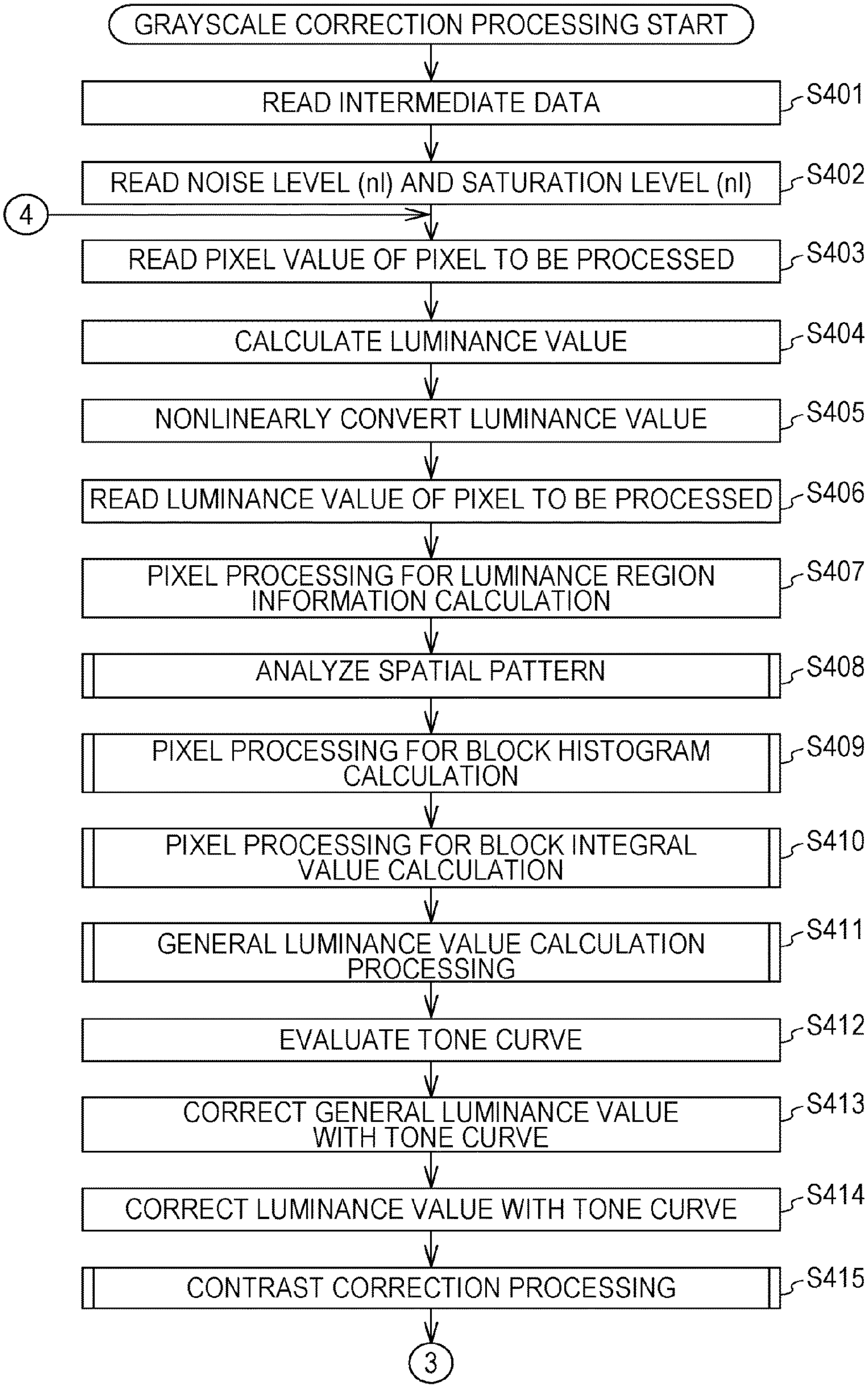
FIG. 33 is a flow diagram illustrating an example of the flow of grayscale correction processing.

When the grayscale correction processing starts, each processing of step S401 to step S407 of FIG. 33 is executed similarly to each processing of step S121 to step S127 of FIG. 19.

In step S408 of FIG. 33, the spatial pattern analysis section 401 analyzes the spatial pattern of the input image.

Each processing of step S409 to step S415 of FIG. 33 is executed similarly to each processing of step S128 to step S134 of FIG. 19.

Figure 34:
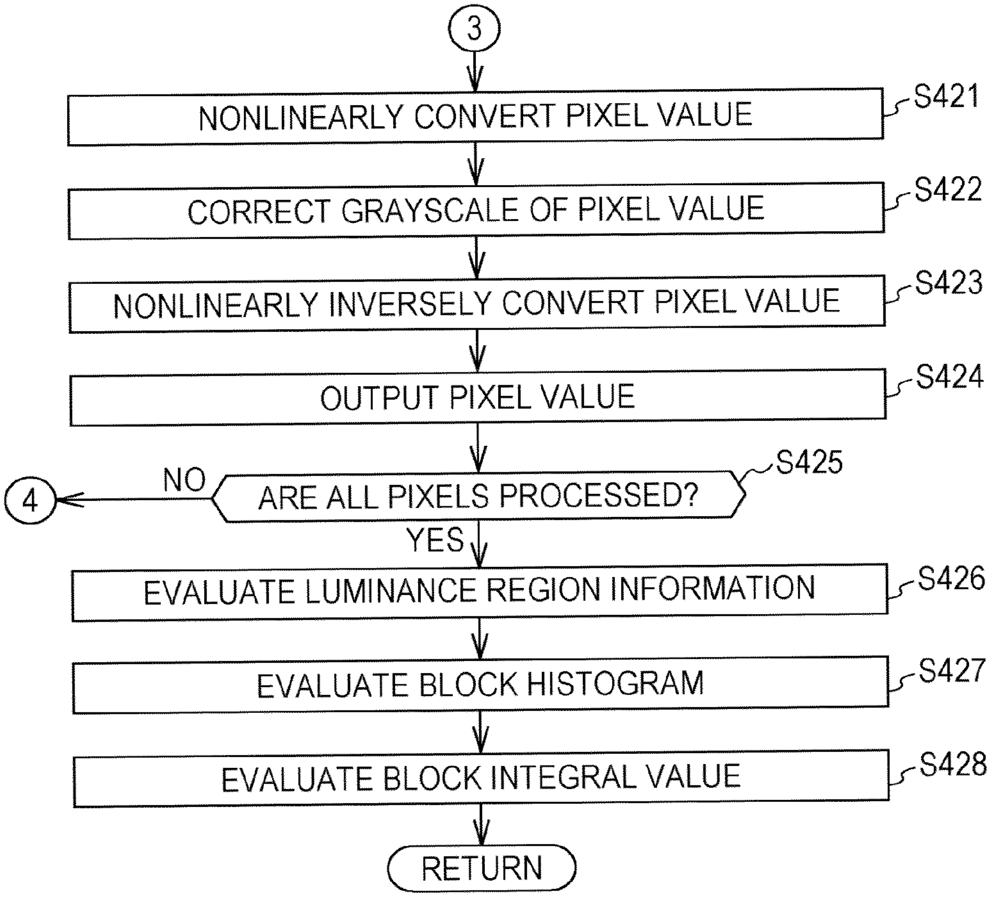
FIG. 34 is a flow diagram continuous with FIG. 33 illustrating an example of the flow of grayscale correction processing.

In addition, each processing of step S421 to step S428 of FIG. 34 is executed similarly to each processing of step S141 to step S148 of FIG. 20.

[Flow of Spatial Pattern Analysis Processing]

Next, reference will be made to a flow diagram of FIG. 35 to describe an example of a flow of spatial pattern analysis processing executed in step S408 of FIG. 33.

When the spatial pattern analysis processing starts, in step S441, the low-pass filter 421 performs low-pass filtering of which the number of taps is relatively large. In step S442, the arithmetic operation section 423 calculates the difference between the input and the filtering result (LP0) of step S441. In step S443, the energy calculation section 425 calculates the energy (signal intensity E0) of the difference value (HP0) calculated in step S442.

In step S444, the low-pass filter 422 performs the low-pass filtering of which the number of taps is relatively small. In step S445, the arithmetic operation section 424 calculates the difference between the input and the filtering result (LP1) of step S444. In step S446, the energy calculation section 426 calculates the energy (signal intensity E1) of the difference value (HP1) calculated in step S445.

In step S447, the determination processing section 428 acquires the thresholds (threshold Th0 and threshold Th1) for each low-pass filter supplied from the tuning parameter providing section 427. In step S448, the determination processing section 428 determines the spatial pattern of the input image from the energy calculated in step S443 and step S445 using the thresholds acquired in step S447.

When processing of step S448 is terminated, the determination processing section 428 terminates spatial pattern determination processing, returns the processing to step S408 of FIG. 33, and executes the processing subsequent to step S409.

[Flow of Spatial Pattern Determination Processing]

Reference will be made to a flow diagram of FIG. 36 to describe an example of a flow of spatial pattern determination processing executed in step S448 of FIG. 35.

When the spatial pattern determination processing starts, in step S461, the determination processing section 428 determines whether the signal intensity E1 is larger than the threshold Th1. When it is determined that the signal intensity E1 is larger than the threshold Th1, the determination processing section 428 advances the processing to step S462, and determines the spatial pattern to be "fine".

In addition, in step S461, when it is determined that the signal intensity E1 is not larger than the threshold Th1, the determination processing section 428 advances the processing to step S463, and determines whether the signal intensity E0 is larger than the threshold Th0. When it is determined that the signal intensity E0 is larger than the threshold Th0, the determination processing section 428 advances the processing to step S464, and determines the spatial pattern to be "intermediate".

Further, in step S463, when it is determined that the signal intensity E0 is not larger than the threshold Th0, the determination processing section 428 advances the processing to step S465, and determines the spatial pattern to be "rough".

Figure 35:
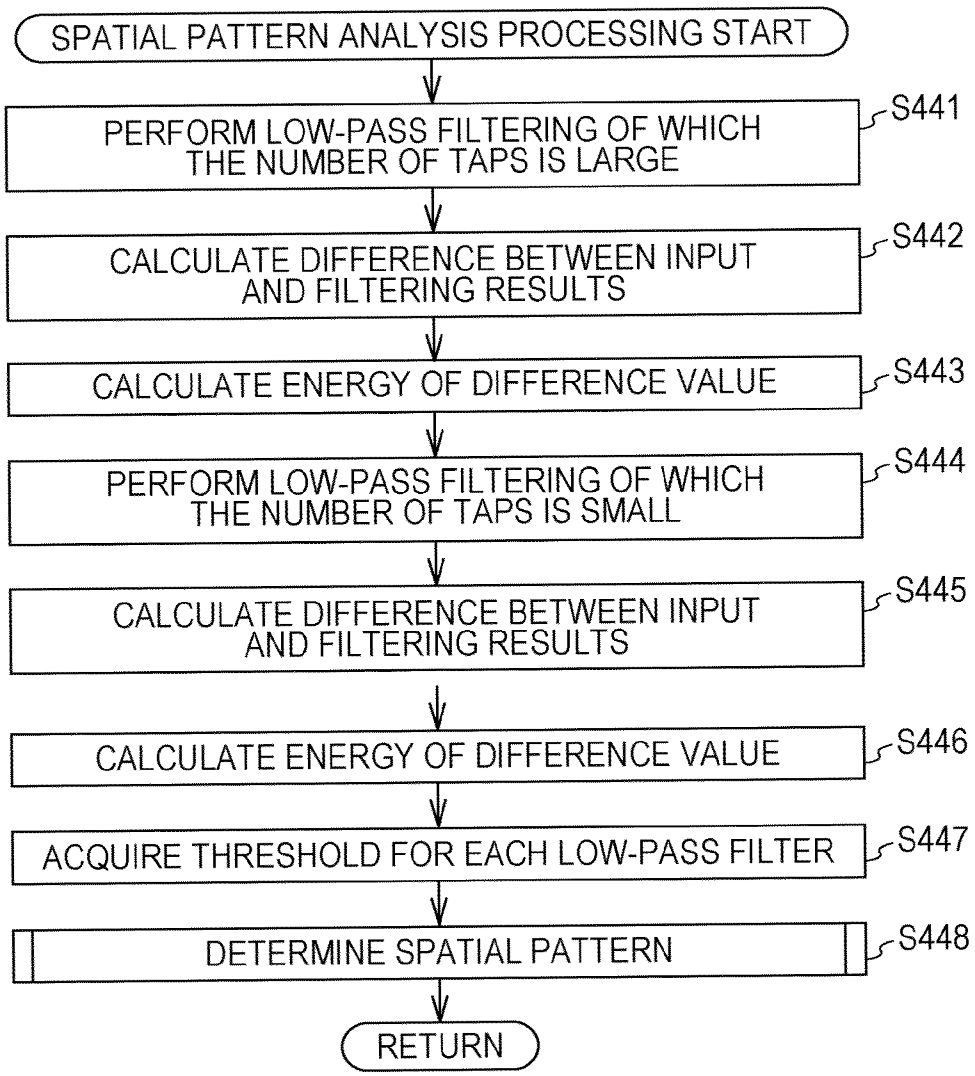
FIG. 35 is a flow diagram illustrating an example of a flow of spatial pattern analysis processing.
Figure 36:
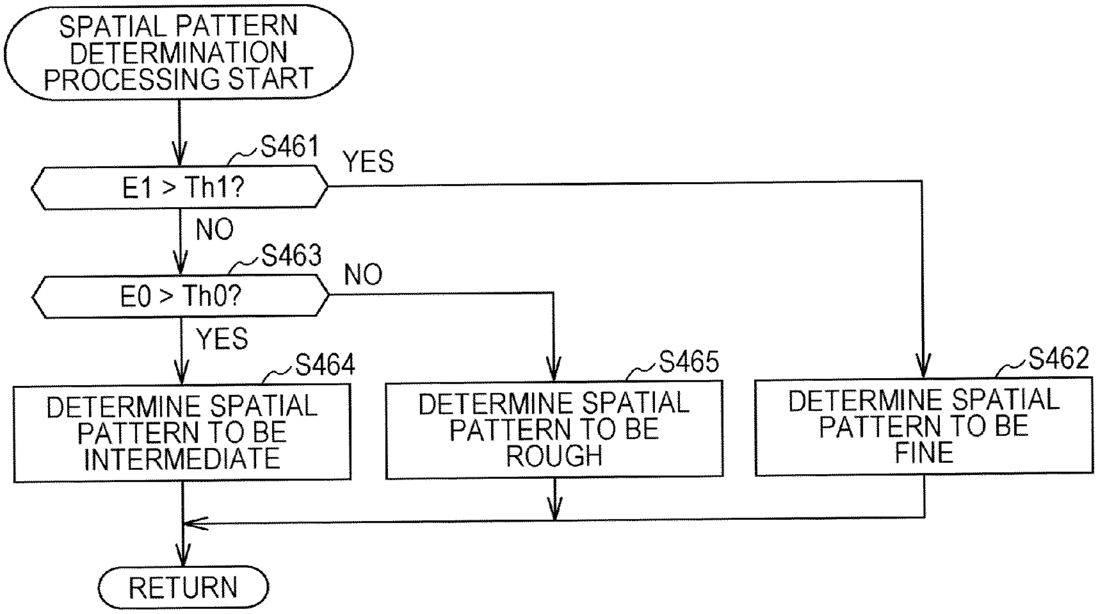
FIG. 36 is a flow diagram illustrating an example of a flow of spatial pattern determination processing.

When the processing of step S462, step S464, or step S465 is terminated, the determination processing section 428 terminates the spatial pattern determination processing, returns the processing to step S448 of FIG. 35, terminates the spatial pattern analysis processing, returns the processing to step S408 of FIG. 33, and executes the processing subsequent to step S409.

[Flow of Pixel Processing for Block Histogram Calculation]

Figure 37:
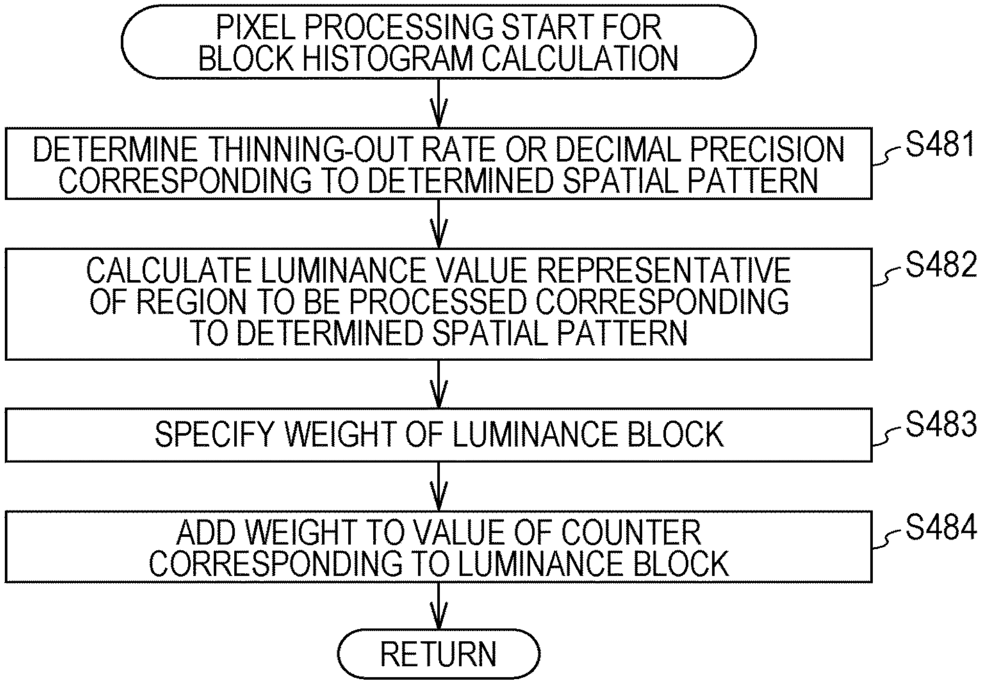
FIG. 37 is a flow diagram illustrating an example of pixel processing for block histogram calculation.

Next, reference will be made to a flow diagram of FIG. 37 to describe an example of a flow of pixel processing for block histogram calculation executed in step S409 of FIG. 33.

When the pixel processing for block histogram calculation starts, in step S481, the selector 445 determines the decimation rate or the decimal precision corresponding to the determination result on the basis of the spatial pattern determination result of the spatial pattern determination processing.

In step S482, the low-pass filter 441 to selector 445 calculates the luminance value representative of the region to be processed which corresponds to the spatial pattern determination result of the spatial pattern determination processing, using the decimation rate determined by the processing of step S481. For example, as described above, the luminance values corresponding to each choice of the spatial pattern determination result are calculated, and from among them, the luminance value corresponding to the spatial pattern determination result is selected.

In step S483, the weight calculation section 201 specifies a weight of the luminance block (bin) corresponding to the luminance value representative of the region to be processed, using the setting of the decimal precision determined in step S481.

In step S484, the counter 202 of the luminance block corresponding to the luminance value representative of the region to be processed adds the weight specified in step S483 to the weight stored by itself, and stores a result of the addition.

When the processing of step S484 is terminated, the counter 202 terminates the pixel processing for block histogram calculation, returns the processing to step S409 of FIG. 33, and executes the processing subsequent to step S410.

[Flow of Pixel Processing for Block Histogram Calculation]

Figure 38:
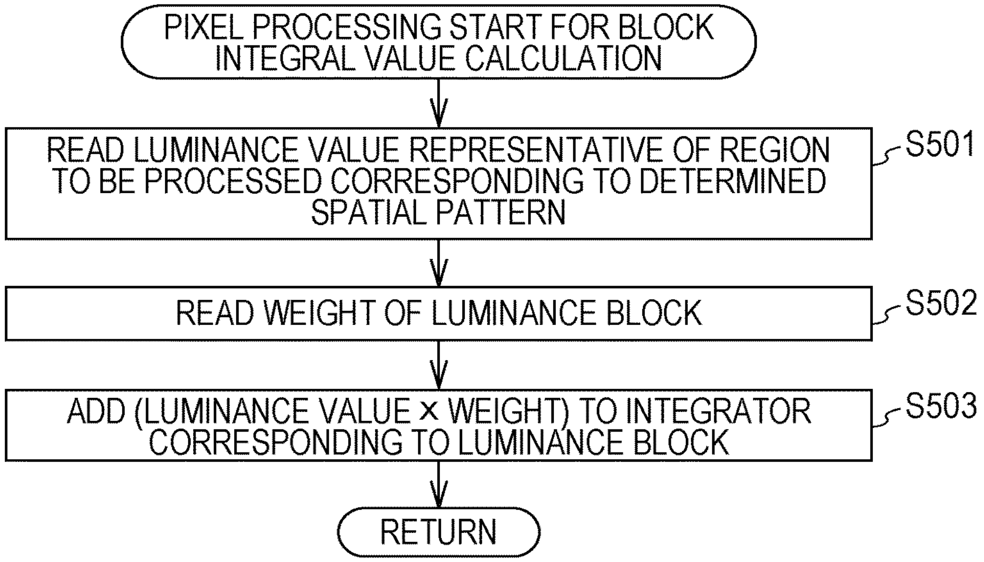
FIG. 38 is a flow diagram illustrating an example of pixel processing for block integral value calculation.

Next, reference will be made to a flow diagram of FIG. 38 to describe an example of a flow of pixel processing for block integral value calculation executed in step S410 of FIG. 33.

When the pixel processing for block integral value calculation starts, in step S501, the weight multiplication section 231 reads the luminance value representative of the region to be processed, corresponding to the spatial pattern determination result of the spatial pattern determination processing, which is generated by the low-pass filter 441 to the selector 445.

In step S502, the weight multiplication section 231 reads a weight of the luminance block, corresponding to the luminance value read in step S501, which is calculated by the weight calculation section 201, and multiplies the luminance value read in step S501 by the weight.

In step S503, the integrator 232 of the luminance block corresponding to the luminance value read in step S501 adds a result of the multiplication calculated in the weight multiplication section 231 to the multiplication result stored by itself, and stores a result of the addition.

When the processing of step S503 is terminated, the integrator 232 terminates the pixel processing for block integral value calculation, returns the processing to step S410 of FIG. 33, and executes the processing subsequent to step S411.

Through each processing as mentioned above, the luminance grayscale correction section 153 can more appropriately adjust the amount of extension of the bin count precision in the decimal direction, and can suppress unnecessary reduction in edge preserving performance. That is, the DSP 106 can improve the calculation precision of the bilateral filter while suppressing an increase in the load. Thereby, it is possible to improve quality performance of image signal processing such as, for example, noise reduction (NR processing) or grayscale correction processing.

4. Fourth Embodiment

Outline of Bilateral Filter

In the third embodiment, the decimation rate and the decimal precision of sampling have been described so as to be uniformly set with respect to the entire input image. However, when there is large variation in fineness of the spatial pattern in the entirety of the input images, it is considered that optimal setting is not able to be performed on all the images. Consequently, the decimation rate and the decimal precision of sampling may be changed for each region of the image.

Figure 39A:
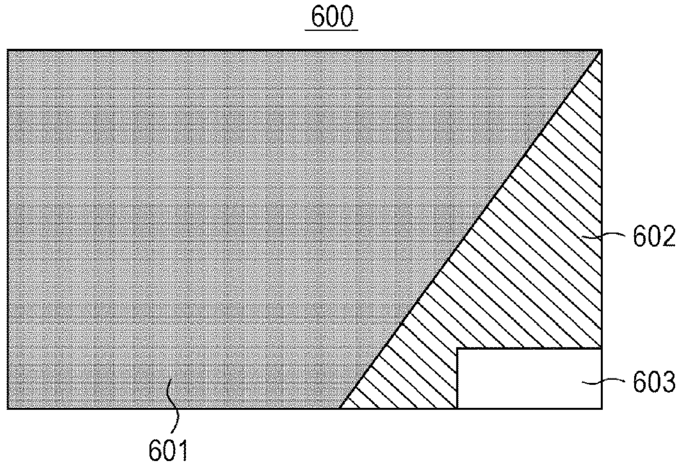
FIGS. 39A and 39B are diagrams illustrating an example in which a histogram for each local part is used.

For example, as shown in FIG. 39A, a case is considered in which a portion 601 having a "fine" spatial pattern, a portion 602 having an "intermediate" spatial pattern, and a portion 603 having a "rough" spatial pattern are included in one image 600.

Figure 39B:
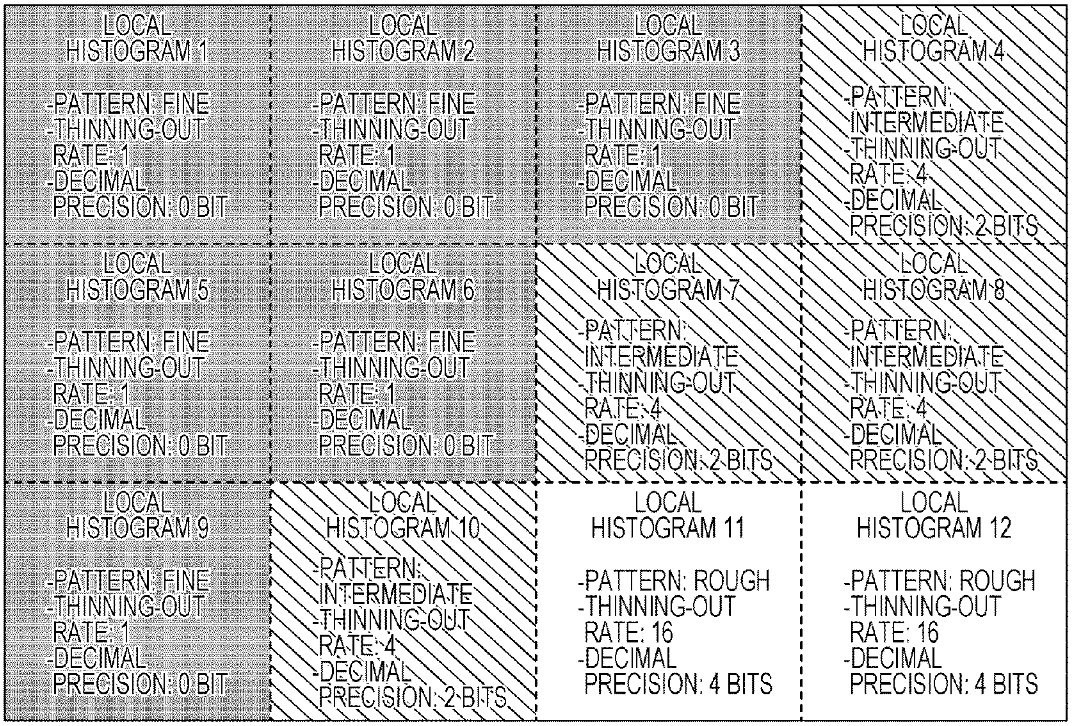

As shown in FIG. 39B, a histogram (local histogram) is evaluated for each region having a predetermined size with respect to such an image, and the decimation rate and the decimal precision are set for each local histogram in accordance with fineness of the internal pattern.

In the example of FIG. 39B, one dotted square indicates a region of the image for calculating one local histogram. Setting of the calculation precision of the local histogram is determined by performing the spatial pattern determination, as described in the third embodiment, in the calculation region of the local histogram.

The size of the region serving as unit for calculating the local histogram is arbitrary, may be previously set, and may be set in accordance with the image. In addition, the shapes or the sizes of each of the regions may be made different from each other. The shapes or the sizes of some regions may be made different from the shapes or the sizes of other regions.

Next, the configurations of each of the processing sections will be described.

In this case, the luminance grayscale correction section 153 is configured in the same manner as the case described in the third embodiment (FIG. 28). In addition, the inside of the spatial pattern analysis section 401 is also configured in the same manner as the case described in the third embodiment (FIG. 29).

However, in this case, the spatial pattern analysis section 401 performs analyses for each predetermined region (in the case of the example of FIG. 39B, region demarcated by the dotted lines), and determines the spatial pattern (referred to as a local spatial pattern).

[Configuration of Block Histogram Calculation Section]

Figure 40:
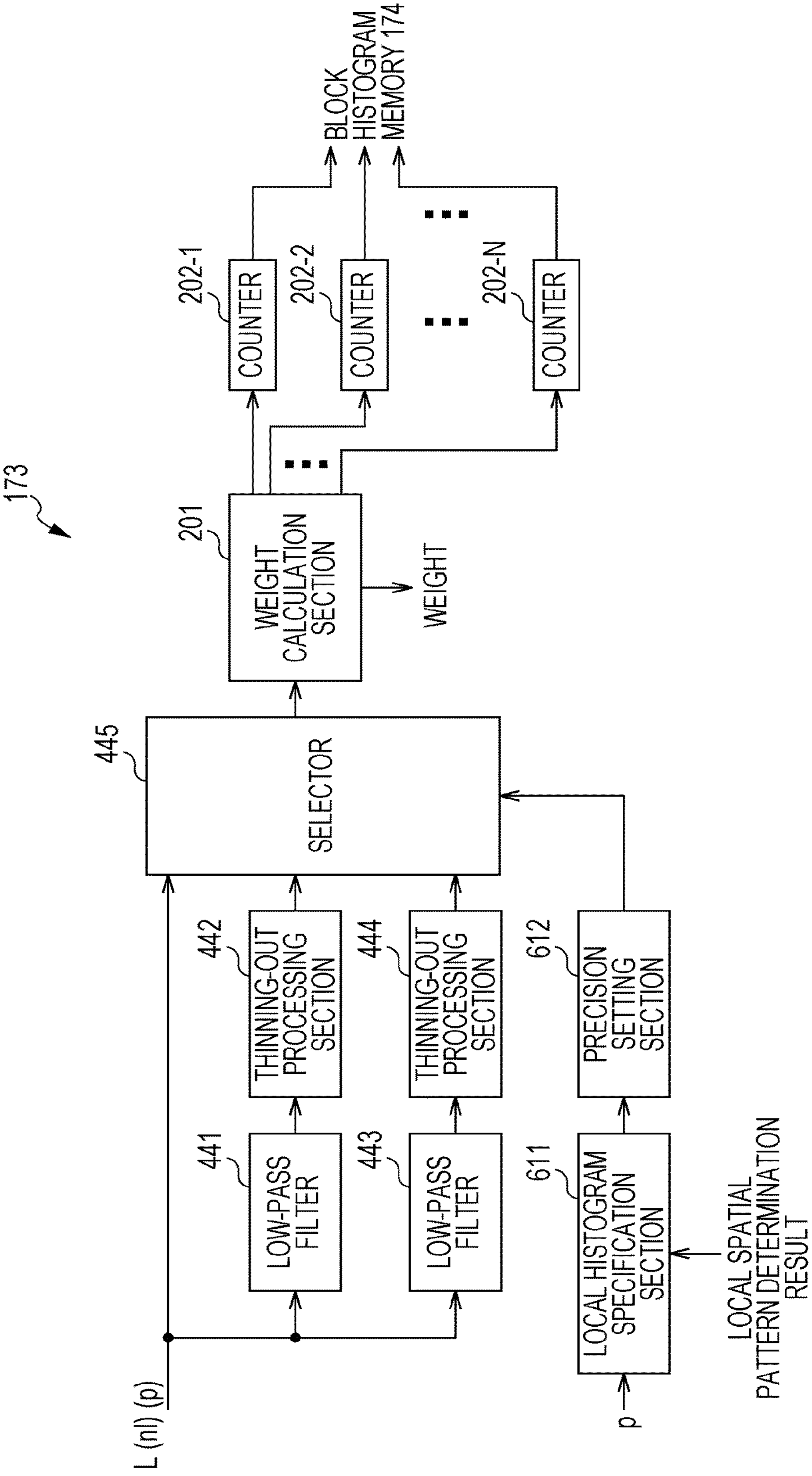
FIG. 40 is a block diagram illustrating a main configuration example of the block histogram calculation section.

FIG. 40 is a block diagram illustrating a main configuration example of the block histogram calculation section 173 in this case. In this case, the block histogram calculation section 173 includes the basically same configuration as that in the case described in the third embodiment (example of FIG. 31), but further includes a local histogram specification section 611 and a precision setting section 612.

The local histogram specification section 611 specifies the local histogram, which is currently calculated, from the local spatial pattern determination result supplied from the spatial pattern analysis section 401 and the coordinate signal p. The precision setting section 612 sets the decimation rate and the decimal precision (and the weighting function according to the decimal precision), corresponding to the local histogram specified by the local histogram specification section 611, in the selector 445 and the weight calculation section 201.

The selector 445 selects a pass of the decimation rate set by the precision setting section 612, and supplies the luminance value of the pass to the weight calculation section 201. The weight calculation section 201 calculates a weight in the decimal precision (and the weighting function according to the decimal precision) set in the precision setting section 612.

[Configuration of Block Integral Value Calculation Section]

Figure 41:
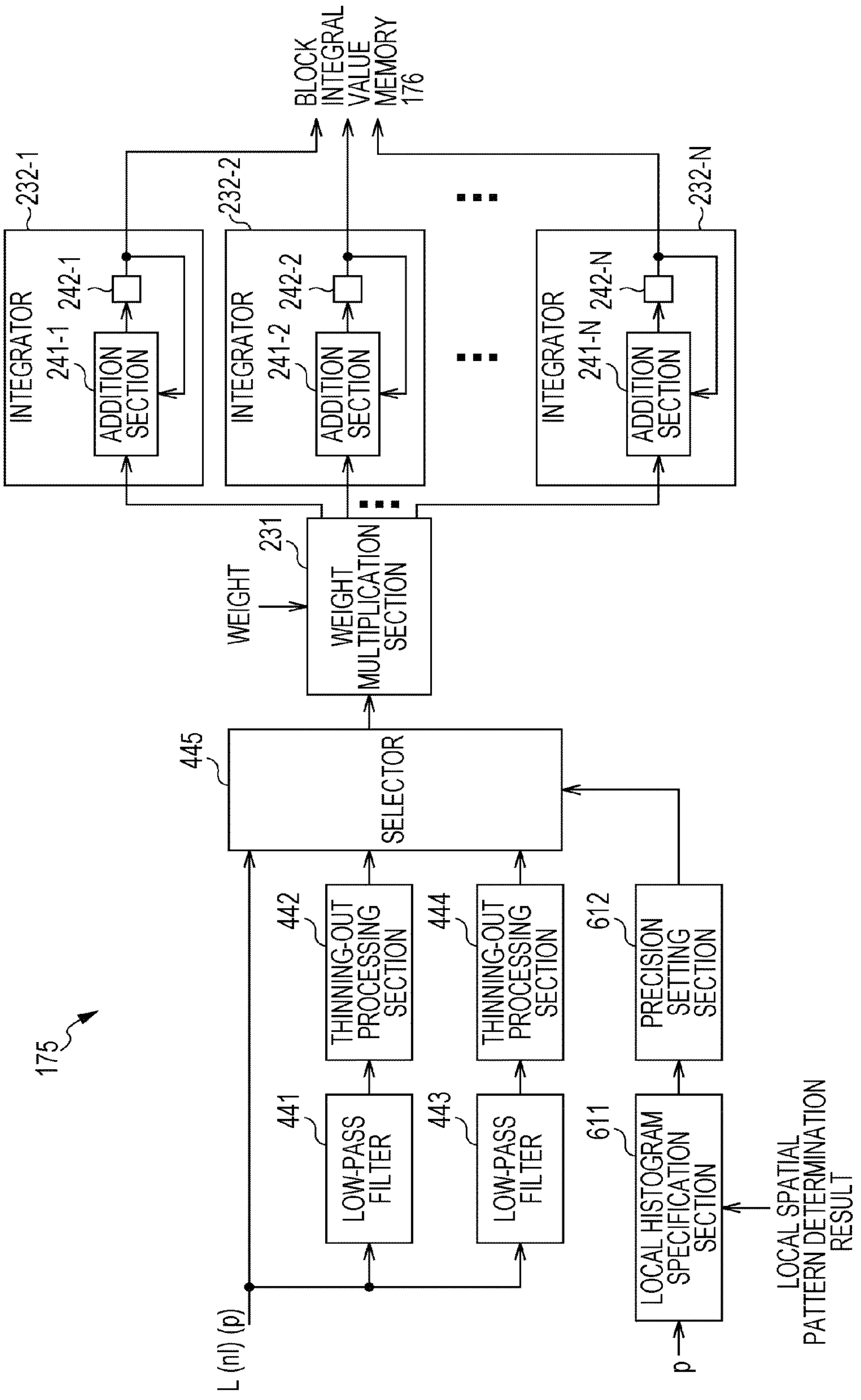
FIG. 41 is a block diagram illustrating a main configuration example of the block integral value calculation section.

FIG. 41 is a block diagram illustrating a main configuration example of the block integral value calculation section 175 in this case. In this case, similarly to the case described in the third embodiment (example of FIG. 32), the block integral value calculation section 175 shares the low-pass filter 441 to the selector 445 with the block histogram calculation section 173.

In this case, the block integral value calculation section 175 further shares the local histogram specification section 611 and the precision setting section 612.

That is, the weight multiplication section 231 multiplies the luminance value, in which decimation is performed at a decimation rate corresponding to the local spatial pattern determination result supplied from the spatial pattern analysis section 401, by the weight calculated by the weight calculation section 201.

In this way, since the decimation rate or the decimal precision of sampling is set in accordance with the spatial pattern determined for each region, the luminance grayscale correction section 153 can set the amount of extension of the bin count precision in the decimal direction to a value according to the contents of the image, and can further suppress unnecessary reduction in edge preserving performance.

That is, the DSP 106 can improve the calculation precision of the bilateral filter while suppressing an increase in the load. Thereby, it is possible to improve quality performance of image signal processing such as, for example, noise reduction (NR processing) or grayscale correction processing.

Next, an example of a flow of processing executed by each of the sections will be described. As mentioned above, the luminance grayscale correction section 153 includes the same spatial pattern analysis section 401 as that in the case of third embodiment, and performs the same processing as that in the case of the third embodiment. Therefore, even in this case, the luminance grayscale correction section 153 performs the grayscale correction processing in the same manner as the case of the third embodiment described with reference to the flow diagrams of FIGS. 33 and 34.

In addition, the spatial pattern analysis section 401 has the same configuration as that in the case of the third embodiment (FIG. 29), and performs the same processing as that in the case of the third embodiment, except to perform an analysis of the spatial pattern for each partial region. That is, the spatial pattern analysis section 401 performs the spatial pattern analysis processing in the same manner as the case of the third embodiment described with reference to the flow diagram of FIG. 35.

[Flow of Pixel Processing for Block Histogram Calculation]

Figure 42:
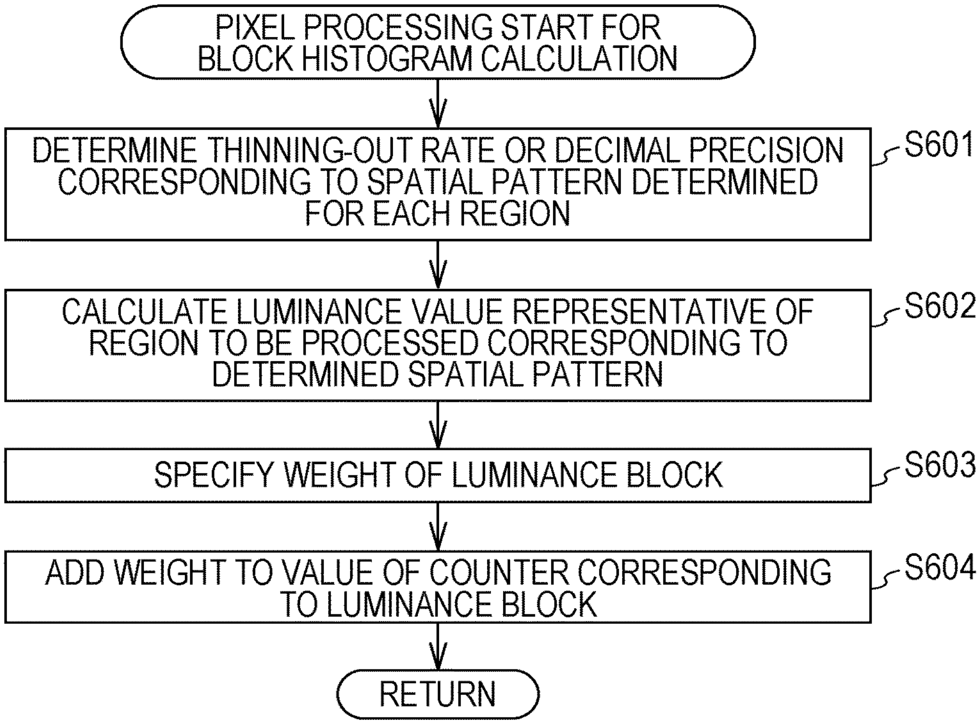
FIG. 42 is a flow diagram illustrating an example of pixel processing for block histogram calculation.

Next, reference will be made to a flow diagram of FIG. 42 to describe an example of a flow of pixel processing for block histogram calculation executed in step S409 of FIG. 33.

When the pixel processing for block histogram calculation starts, in step S601, the local histogram specification section 611 and the precision setting section 612 determines the decimation rate or the decimal precision corresponding to the determination result, for each region in which the spatial pattern determination processing is performed, on the basis of the local spatial pattern determination result calculated for each region.

In step S602, the low-pass filter 441 to selector 445 calculate the luminance value representative of the region to be processed which corresponds to the local spatial pattern determination result, using the decimation rate determined through the processing of step S601. For example, as described above, the luminance values corresponding to each choice of the determination result of the local spatial pattern are calculated, and from among them, the luminance value corresponding to the actual local spatial pattern determination result is selected.

In step S603, the weight calculation section 201 specifies a weight of the luminance block (bin) corresponding to the luminance value representative of the region to be processed, using the setting of the decimal precision determined in step S601.

In step S604, the counter 202 of the luminance block corresponding to the luminance value representative of the region to be processed adds the weight specified in step S603 to the weight stored by itself, and stores a result of the addition.

When the processing of step S604 is terminated, the counter 202 terminates the pixel processing for block histogram calculation, returns the processing to step S409 of FIG. 33, and executes the processing subsequent to step S410.

Meanwhile, the block integral value calculation section 175 can execute the pixel processing for block integral value calculation in the same manner as the case of the third embodiment described with reference to the flow diagram of FIG. 38.

Through the execution of each processing in this way, since the decimation rate or the decimal precision of sampling is set in accordance with the spatial pattern determined for each region, the luminance grayscale correction section 153 can set the amount of extension of the bin count precision in the decimal direction to a value according to the contents of the image, and can further suppress unnecessary reduction in edge preserving performance.

That is, the DSP 106 can improve the calculation precision of the bilateral filter while suppressing an increase in the load. Thereby, it is possible to improve quality performance of image signal processing such as, for example, noise reduction (NR processing) or grayscale correction processing.

Meanwhile, even in the second embodiment to fourth embodiment described above, the addition section 251 as shown in FIG. 11C may be used in place of the block integral value calculation section 175.

5. Fifth Embodiment

Personal Computer

A series of processing described above not only can be executed by hardware, but also can be executed by software. In this case, for example, a personal computer as shown in FIG. 43 may be configured.

Figure 43:
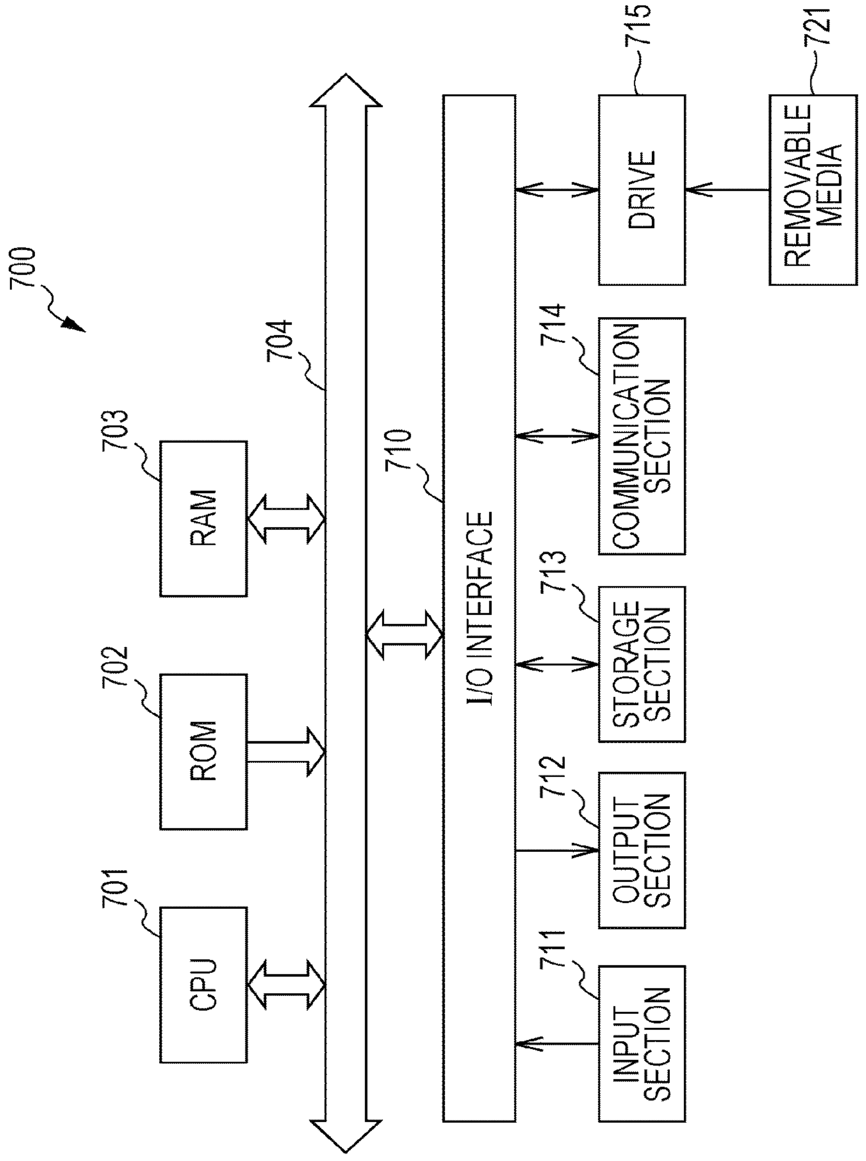
FIG. 43 is a block diagram illustrating a main configuration example of a personal computer to which an embodiment of the present disclosure is applied.

In FIG. 43, a CPU (Central Processing Unit) 701 of a personal computer 700 executes various types of processing in accordance with a program stored in a ROM (Read Only Memory) 702 or a program loaded from a storage section 713 to a RAM (Random Access Memory) 703. Data and the like necessary to execute various types of processing by the CPU 701 are also appropriately stored in the RAM 703.

The CPU 701, the ROM 702, and the RAM 703 are interconnected through a bus 704. An input and output interface 710 is also connected to the bus 704.

An input section 711 such as a keyboard and a mouse, a display such as a CRT (Cathode Ray Tube) or an LCD (Liquid Crystal Display), an output section 712 such as a speaker, a storage section 713 such as a hard disk, and a communication section 714 such as a modem are connected to the input and output interface 710. The communication section 714 performs communication processing through a network including Internet.

In addition, a drive 715 is connected to the input and output interface 710 as necessary, a removable media 721 such as a magnetic disk, an optical disk, a magneto optical disk, or a semiconductor memory is appropriately mounted thereon, and a computer program read out therefrom is installed in the storage section 713 as necessary.

When a series of processing described above is executed by software, a program constituting the software is installed from a network or a recording medium.

For example, as shown in FIG. 43, separately from the device body, the recording medium not only is constituted by the removable media 721 such as a magnetic disk (including a flexible disk), an optical disk (including a CD-ROM (Compact Disc-Read Only Memory) and a DVD (Digital Versatile Disc)), a magneto optical disk (including an MD (Mini Disc)), or a semiconductor memory, having a program recorded thereon, which is distributed in order to deliver the program to a user, but also is constituted by a hard disk and the like included in the ROM 702 or the storage section 713, having a program recorded thereon, which is delivered to a user in the state where it is previously incorporated into the device body.

Meanwhile, the program executed by the computer may be a program on which processing is performed in a time-series manner along the procedure described in the specification, and may be a program on which processing is performed in parallel, or at a necessary timing when a call is performed.

In addition, in the specification, steps in which the program recorded in the recording medium is described include not only processing performed in a time-series manner along the described procedure, but also processing performed in parallel or individually even when it is not necessarily processed in a time-series manner.

In addition, in the specification, the system indicates the entire apparatus constituted by a plurality of devices.

In addition, as described above, the configuration described as one device (or processing section) is divided, and may be configured as a plurality of devices (or processing sections). On the contrary, the configuration described above as a plurality of devices (or processing sections) may be configured as one device (or processing section) collectively. In addition, a configuration other than those described above may be, of course, added to the configuration of each device (or each processing section). Further, when the configurations or operations as the entire system are substantially the same, a portion of the configuration of a certain device (or processing section) may be included in the configuration of another device (or another processing section). That is, the embodiments of the present disclosure are not limited to the above-mentioned embodiments, but various changes or modifications can be made without departing from the scope of the present disclosure.

The present disclosure contains subject matter related to that disclosed in Japanese Priority Patent Application JP 2010-199224 filed in the Japan Patent Office on Sep. 6, 2010, the entire contents of which are hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. An image processing apparatus comprising:

one or more processors operable to:

allocate each pixel of an input image to a plurality of partial regions, wherein each of the plurality of partial regions corresponds to a predetermined range of luminance values;

determine a number of pixels of the input image, allocated to each of the plurality of partial regions, up to a decimal precision of a predetermined number of bits;

determine a characteristic value corresponding to each of the plurality of partial regions; and perform edge-preserving smoothing on the input image by weighting and averaging characteristic values in accordance with a distance in luminance direction, using the number of pixels of the input image allocated to each of the plurality of partial regions and the determined characteristic value.

2. The image processing apparatus according to claim 1, wherein the one or more processors are operable to:

determine a product of a luminance value of each pixel of the input image by corresponding weights of each the plurality of partial regions; and update the characteristic value with the product of the luminance value and the weight corresponding to each pixel of each of the plurality of partial regions.

3. The image processing apparatus according to claim 1, wherein the one or more processors are operable to calculate weights corresponding to each of the plurality of partial regions in accordance with a predetermined weighting function based on the number of pixels of the input image allocated to each of the plurality of partial regions, up to the decimal precision of the predetermined number of bits.

4. The image processing apparatus according to claim 1, wherein the one or more processors are operable to:

decimate pixels of the input image; and determine weights corresponding to each of the plurality of partial regions with respect to the decimated pixels of the input image.

5. The image processing apparatus according to claim 1, wherein the one or more processors are operable to decimate the pixels of the input image at a decimation rate corresponding to the decimal precision of the number of pixels of the input image allocated to each of the plurality of partial regions.

6. The image processing apparatus according to claim 1, wherein the one or more processors are operable to:

determine a spatial pattern representing contents of the input image, decimate the pixels of the input image at a decimation rate in accordance with an analysis result of the determined spatial pattern.

7. The image processing apparatus according to claim 1, wherein the one or more processors are operable to:

determine spatial patterns for each of the plurality of partial regions of the input image; and decimate the pixels of the input image, for each partial region, at a decimation rate in accordance with the analysis result of a corresponding spatial pattern.

8. An image processing method in an image processing apparatus, the image processing method comprising:

allocating each pixel of an input image to a plurality of partial regions, wherein each of the plurality of partial regions corresponds to a predetermined range of luminance value;

determining a number of pixels of the input image, allocated to each of the plurality of partial regions, up to a decimal precision of a predetermined number of bits;

determining a characteristic value corresponding to each of the plurality of partial regions; and performing edge-preserving smoothing on the input image by weighting and averaging characteristic values in accordance with a distance in luminance direction, using the number of pixels of the input image allocated to each of the plurality of partial regions and the determined characteristic value.

9. A non-transitory computer-readable storage medium having stored thereon, a computer program having at least one code section for image processing, the at least one code section being executable by a computer for causing the computer to perform steps comprising:

allocating each pixel of an input image to a plurality of partial regions, wherein each of the plurality of partial regions corresponds to a predetermined range of luminance value;

determining a number of pixels of the input image, allocated to each of the plurality of partial regions, up to a decimal precision of a predetermined number of bits;

determining a characteristic value corresponding to each of the plurality of partial regions; and performing edge-preserving smoothing on the input image by weighting and averaging characteristic values in accordance with a distance in luminance direction, using the number of pixels of the input image allocated to each of the plurality of partial regions and the determined characteristic value.

* * * * *